US012400624B2

(12) United States Patent
Foulke

(10) Patent No.: US 12,400,624 B2
(45) Date of Patent: Aug. 26, 2025

(54) METHODS AND SYSTEMS FOR PRODUCTION OF HANDPANS

(71) Applicant: Colin Foulke, Santa Rosa, CA (US)

(72) Inventor: Colin Foulke, Santa Rosa, CA (US)

( * ) Notice: Subject to any disclaimer, the term of this patent is extended or adjusted under 35 U.S.C. 154(b) by 125 days.

(21) Appl. No.: 18/189,095

(22) Filed: Mar. 23, 2023

(65) Prior Publication Data

US 2023/0306934 A1 Sep. 28, 2023

Related U.S. Application Data

(63) Continuation of application No. PCT/US2021/054205, filed on Oct. 8, 2021.

(60) Provisional application No. 63/089,902, filed on Oct. 9, 2020.

(51) Int. Cl.

| | |
|---|---|
| ***G10D 13/22*** | (2020.01) |
| ***B21D 13/10*** | (2006.01) |
| ***B21D 26/031*** | (2011.01) |
| ***G10D 13/08*** | (2020.01) |
| ***G10D 13/24*** | (2020.01) |

(52) U.S. Cl.

CPC ............. *G10D 13/22* (2020.02); *B21D 13/10* (2013.01); *B21D 26/031* (2013.01); *G10D 13/08* (2013.01); *G10D 13/24* (2020.02)

(58) Field of Classification Search

CPC ........ G10D 13/22; G10D 13/24; G10D 13/10; B21D 13/10; B21D 26/031

See application file for complete search history.

(56) References Cited

U.S. PATENT DOCUMENTS

| | | | | |
|---|---|---|---|---|
| 5,085,068 A * | 2/1992 | Rhoades | ................ | B21D 26/02 72/60 |
| 6,212,772 B1 * | 4/2001 | Whitmyre | .............. | G10D 13/08 84/411 R |
| 7,745,711 B2 * | 6/2010 | Kerns | .................... | G10D 13/08 84/411 R |
| 10,373,594 B1 * | 8/2019 | Doe | ....................... | G10D 13/02 |
| 10,654,087 B2 * | 5/2020 | Wahtuse | ................ | G10D 13/24 |
| 11,727,900 B2 * | 8/2023 | Heubeck | ................ | G10D 13/22 84/410 |
| D1,010,724 S * | 1/2024 | He | ......................... | G10D 13/02 D17/22 |
| 2015/0269921 A1 | 9/2015 | Truchsess et al. | | |

(Continued)

FOREIGN PATENT DOCUMENTS

| | | | |
|---|---|---|---|
| CN | 109848307 A * | 6/2019 | |
| EP | 3992961 A1 * | 5/2022 | ............. G10D 13/08 |

(Continued)

OTHER PUBLICATIONS

PCT/US2021/054205 International Search Report and Written Opinion dated Feb. 28, 2022.

(Continued)

*Primary Examiner* — Robert W Horn
(74) *Attorney, Agent, or Firm* — WILSON SONSINI GOODRICH & ROSATI

(57) ABSTRACT

Disclosed herein are methods for hydroforming a handpan shell. Hydroforming a handpan shell using a mold complementary to the intended shape of the handpan shell can improve the quality and performance of the handpan while reducing the time and cost needed to form features into the handpan that allow musical tones to be produced.

22 Claims, 23 Drawing Sheets

(56) References Cited

U.S. PATENT DOCUMENTS

| | | | | |
|---|---|---|---|---|
| 2020/0001343 | A1 | 1/2020 | Wahtuse | |
| 2020/0246858 | A1 * | 8/2020 | Wahtuse .............. | B21D 26/029 |
| 2023/0306934 | A1 * | 9/2023 | Foulke ................... | B21D 53/00 |

FOREIGN PATENT DOCUMENTS

| | | | | |
|---|---|---|---|---|
| WO | WO-2019064051 | A1 * | 4/2019 | ........... B21D 26/021 |
| WO | WO-2022076841 | A1 | 4/2022 | |

OTHER PUBLICATIONS

EP20210878629.1 Extended European Search Report dated Sep. 25, 2024.
Maloney, Soren E. Acoustics and Manufacture of Caribbean Steelpans. Apollo—University of Cambridge Repository (2010).
PCT/US2021/054205 International Preliminary Report on Patentability dated Mar. 28, 2023.

* cited by examiner 1 mm Thickness, 1008 Cold Rolled Steel

| | |
|---|---|
| C#3 G#3 B3 C#4 D#4 E4 F#4 G#4 | 138.59 Hz, 207.65 Hz, 246.94 Hz, 277.18 Hz, 311.13 Hz, 329.63 Hz, 369.99 Hz, 415.3 H: |
| C#3 G#3 A3 C#4 D#4 E4 F#4 G#4 | 138.59 Hz, 207.65 Hz, 220 Hz, 277.18 Hz, 311.13 Hz, 329.63 Hz, 369.99 Hz, 415.3 Hz |
| C#3 G#3 B3 C#4 D#4 E4 G#4 A4 | 138.59 Hz, 207.65 Hz, 246.94 Hz, 277.18 Hz, 311.13 Hz, 329.63 Hz, 415.3 Hz, 440 Hz |
| D3 A3 C#4 D4 E4 F#4 G4 A4 | 146.83 Hz, 220 Hz, 277.18 Hz, 293.66 Hz, 329.63 Hz, 369.99 Hz, 392 Hz, 440 Hz |
| D3 A3 B3 D4 E4 F#4 G4 A4 | 146.83 Hz, 220 Hz, 246.94 Hz, 293.66 Hz, 329.63 Hz, 369.99 Hz, 392 Hz, 440 Hz |
| D3 A3 C4 D4 E4 F#4 G4 A4 | 146.83 Hz, 220 Hz, 261.63 Hz, 293.66 Hz, 329.63 Hz, 369.99 Hz, 392 Hz, 440 Hz |
| D3 A3 B3 C#4 D4 E4 F#4 A4 | 146.83 Hz, 220 Hz, 246.94 Hz, 277.18 Hz, 293.66 Hz, 329.63 Hz, 369.99 Hz, 440 Hz |
| D3 A3 C4 D4 E4 F4 G4 A4 | 146.83 Hz, 220 Hz, 261.63 Hz, 293.66 Hz, 329.63 Hz, 349.23 Hz, 392 Hz, 440 Hz |
| D3 A3 Bb3 D4 E4 F4 G4 A4 | 146.83 Hz, 220 Hz, 233.08 Hz, 293.66 Hz, 329.63 Hz, 349.23 Hz, 392 Hz, 440 Hz |
| D3 A3 Bb3 D4 E4 F4 A4 C5 | 146.83 Hz, 220 Hz, 233.08 Hz, 293.66 Hz, 329.63 Hz, 349.23 Hz, 440 Hz, 523.25 Hz |
| D3 A3 C4 D4 E4 F4 A4 Bb4 | 146.83 Hz, 220 Hz, 261.63 Hz, 293.66 Hz, 329.63 Hz, 349.23 Hz, 440 Hz, 466.16 Hz |
| D3 A3 C4 D4 E4 F4 A4 C5 | 146.83 Hz, 220 Hz, 261.63 Hz, 293.66 Hz, 329.63 Hz, 349.23 Hz, 440 Hz, 523.25 Hz |
| D3 A3 C4 D4 F4 G4 A4 C5 | 146.83 Hz, 220 Hz, 261.63 Hz, 293.66 Hz, 349.23 Hz, 392 Hz, 440 Hz, 523.25 Hz |
| D3 A3 C4 D4 Eb4 F#4 G4 A4 | 146.83 Hz, 220 Hz, 261.63 Hz, 293.66 Hz, 311.13 Hz, 369.99 Hz, 392 Hz, 440 Hz |
| D3 A3 Bb3 D4 Eb4 F#4 G4 A4 | 146.83 Hz, 220 Hz, 233.08 Hz, 293.66 Hz, 311.13 Hz, 369.99 Hz, 392 Hz, 440 Hz |
| Eb3 Bb3 C4 Eb4 F4 G4 Ab4 Bb4 | 155.56 Hz, 233.08 Hz, 261.63 Hz, 311.13 Hz, 349.23 Hz, 392 Hz, 415.3 Hz, 466.16 Hz |

FIG. 17A 1.00 mm Thickness Stainless Steel 430

| | |
|---|---|
| C3 G3 A3 C4 D4 E4 F4 G4 | 130.81 Hz, 196 Hz, 220 Hz, 261.63 Hz, 293.66 Hz, 329.63 Hz, 349.23 Hz, 392 Hz |
| C#3 G#3 A#3 C#4 D#4 F4 F#4 G#4 | 138.59 Hz, 207.65 Hz, 233.08 Hz, 277.18 Hz, 311.13 Hz, 349.23 Hz, 369.99 Hz, 415.3 Hz |
| C#3 G#3 C4 C#4 D#4 F4 F#4 G#4 | 138.59 Hz, 207.65 Hz, 261.63 Hz, 277.18 Hz, 311.13 Hz, 349.23 Hz, 369.99 Hz, 415.3 Hz |
| C3 G3 B3 C4 D4 E4 F4 G4 | 130.81 Hz, 196 Hz, 246.94 Hz, 261.63 Hz, 293.66 Hz, 329.63 Hz, 349.23 Hz, 392 Hz |
| C#3 G#3 C4 C#4 D#4 F4 F#4 G#4 | 138.59 Hz, 207.65 Hz, 261.63 Hz, 277.18 Hz, 311.13 Hz, 349.23 Hz, 369.99 Hz, 415.3 Hz |
| C#3 G#3 B3 C#4 D#4 E4 F#4 G#4 | 138.59 Hz, 207.65 Hz, 246.94 Hz, 277.18 Hz, 311.13 Hz, 329.63 Hz, 369.99 Hz, 415.3 Hz |
| C#3 G#3 A3 C#4 D#4 E4 F#4 G#4 | 138.59 Hz, 207.65 Hz, 220 Hz, 277.18 Hz, 311.13 Hz, 329.63 Hz, 369.99 Hz, 415.3 Hz |
| C#3 G#3 B3 C#4 D#4 E4 G#4 A4 | 138.59 Hz, 207.65 Hz, 246.94 Hz, 277.18 Hz, 311.13 Hz, 329.63 Hz, 415.3 Hz, 440 Hz |

FIG. 17B 1.15 mm Thickness Stainless Steel 430

| | |
|---|---|
| Eb3 Bb3 C4 D4 Eb4 F4 G4 Bb4 | 155.56 Hz, 233.08 Hz, 261.63 Hz, 293.66 Hz, 311.13 Hz, 349.23 Hz, 392 Hz, 466.16 Hz |
| Eb3 Bb3 B3 Db4 Eb4 F4 Gb4 Bb4 | 155.56 Hz, 233.08 Hz, 246.94 Hz, 277.18 Hz, 311.13 Hz, 349.23 Hz, 369.99 Hz, 466.16 Hz |
| Eb3 Bb3 B3 D4 Eb4 F4 Gb4 Bb4 | 155.56 Hz, 233.08 Hz, 246.94 Hz, 293.66 Hz, 311.13 Hz, 349.23 Hz, 369.99 Hz, 466.16 Hz |

FIG. 17C 1.25 mm Thickness Stainless Steel 430

| | |
|---|---|
| F#3 C#4 D#4 F4 F#4 G#4 A#4 C#5 | 185 Hz, 277.18 Hz, 311.13 Hz, 349.23 Hz, 369.99 Hz, 415.3 Hz, 466.16 Hz, 554.37 Hz |
| F#3 C#4 D4 E4 F#4 G#4 A4 C#5 | 185 Hz, 277.18 Hz, 293.66 Hz, 329.63 Hz, 369.99 Hz, 415.3 Hz, 440 Hz, 554.37 Hz |
| F#3 A3 C#4 E4 F#4 G#4 A4 C#5 | 185 Hz, 220 Hz, 277.18 Hz, 329.63 Hz, 369.99 Hz, 415.3 Hz, 440 Hz, 554.37 Hz |
| F#3 C#4 D4 F4 F#4 G#4 A4 C#5 | 185 Hz, 277.18 Hz, 293.66 Hz, 349.23 Hz, 369.99 Hz, 415.3 Hz, 440 Hz, 554.37 Hz |

FIG. 17D

| Scale Group | Musical Notes of General Scale | Musical Notes of Example Scale | Frequencies of Example Scale |
|---|---|---|---|
| 1A | G#/ G# A C# D F F# G# C# | G#2 G#3 A3 C#4 D4 F4 F#4 G#4 C#5 | 103.825 Hz, 207.65 Hz, 220 Hz, 277.18 Hz, 293.66 Hz, 349.23 Hz, 369.99 Hz, 415.3 Hz, 554.37 Hz |
| 1B | G#/ G# B C# D# E F# G# C# | G#2 G#3 B3 C#4 D#4 E4 F#4 G#4 C#5 | 103.825 Hz, 207.65 Hz, 246.94 Hz, 277.18 Hz, 311.13 Hz, 329.63 Hz, 369.99 Hz, 415.3 Hz, 554.37 Hz |
| 1C | G#/ G# C C# D# F F# G# C# | G#2 G#3 C4 C#4 D#4 F4 F#4 G#4 C#5 | 103.825 Hz, 207.65 Hz, 261.63 Hz, 277.18 Hz, 311.13 Hz, 349.23 Hz, 369.99 Hz, 415.3 Hz, 554.37 Hz |
| 1D | A/ A C D E F G A Bb | A2 A3 C4 D4 E4 F4 G4 A4 Bb4 | 110 Hz, 220 Hz, 261.63 Hz, 293.66 Hz, 329.63 Hz, 349.23 Hz, 392 Hz, 440 Hz, 466.16 Hz |
| 1E | A/ A C D E F G A C | A2 A3 C4 D4 E4 F4 G4 A4 C5 | 110 Hz, 220 Hz, 261.63 Hz, 293.66 Hz, 329.63 Hz, 349.23 Hz, 392 Hz, 440 Hz, 523.25 Hz |
| 1F | A/ A Bb D E F G A C | A2 A3 Bb3 D4 E4 F4 G4 A4 C5 | 110 Hz, 220 Hz, 233.08 Hz, 293.66 Hz, 329.63 Hz, 349.23 Hz, 392 Hz, 440 Hz, 523.25 Hz |
| 1G | A/ A Bb D Eb F# G A Bb | A2 A3 Bb3 D4 Eb4 F#4 G4 A4 Bb5 | 110 Hz, 220 Hz, 233.08 Hz, 293.66 Hz, 311.13 Hz, 369.99 Hz, 392 Hz, 440 Hz, 932.33 Hz |
| 1H | A/ A Bb D Eb F G A Bb | A2 A3 Bb3 D4 Eb4 F4 G4 A4 Bb5 | 110 Hz, 220 Hz, 233.08 Hz, 293.66 Hz, 311.13 Hz, 349.23 Hz, 392 Hz, 440 Hz, 932.33 Hz |
| 1-I | A/ A C D Eb F# G A C | A2 A3 C4 D4 Eb4 F#4 G4 A4 C5 | 110 Hz, 220 Hz, 261.63 Hz, 293.66 Hz, 311.13 Hz, 369.99 Hz, 392 Hz, 440 Hz, 523.25 Hz |
| 1J | A/ A C# D E F# G A C# | A2 A3 C#4 D4 E4 F#4 G4 A4 C#5 | 110 Hz, 220 Hz, 277.18 Hz, 293.66 Hz, 329.63 Hz, 369.99 Hz, 392 Hz, 440 Hz, 554.37 Hz |
| | | | |
| 2A | C#/ G# A C# D F F# G# C# | C#3 G#3 A3 C#4 D4 F4 F#4 G#4 C#5 | 138.59 Hz, 207.65 Hz, 220 Hz, 277.18 Hz, 293.66 Hz, 349.23 Hz, 369.99 Hz, 415.3 Hz, 554.37 Hz |
| 2B | C#/ G# B C# D# E F# G# C# | C#3 G#3 B3 C#4 D#4 E4 F#4 G#4 C#5 | 138.59 Hz, 207.65 Hz, 246.94 Hz, 277.18 Hz, 311.13 Hz, 329.63 Hz, 369.99 Hz, 415.3 Hz, 554.37 Hz |
| 2C | C#/ G# C C# D# F F# G# C# | C#3 G#3 C4 C#4 D#4 F4 F#4 G#4 C#5 | 138.59 Hz, 207.65 Hz, 261.63 Hz, 277.18 Hz, 311.13 Hz, 349.23 Hz, 369.99 Hz, 415.3 Hz, 554.37 Hz |
| 2D | D/ A C D E F G A Bb | D3 A3 C4 D4 E4 F4 G4 A4 Bb4 | 146.83 Hz, 220 Hz, 261.63 Hz, 293.66 Hz, 329.63 Hz, 349.23 Hz, 392 Hz, 440 Hz, 466.16 Hz |
| 2E | D/ A C D E F G A C | D3 A3 C4 D4 E4 F4 G4 A4 C5 | 146.83 Hz, 220 Hz, 261.63 Hz, 293.66 Hz, 329.63 Hz, 349.23 Hz, 392 Hz, 440 Hz, 523.25 Hz |
| 2F | D/ A Bb D E F G A C | D3 A3 Bb3 D4 E4 F4 G4 A4 C5 | 146.83 Hz, 220 Hz, 233.08 Hz, 293.66 Hz, 329.63 Hz, 349.23 Hz, 392 Hz, 440 Hz, 523.25 Hz |
| 2G | D/ A Bb D Eb F# G A C | D3 A3 Bb3 D4 Eb4 F#4 G4 A4 C5 | 146.83 Hz, 220 Hz, 233.08 Hz, 293.66 Hz, 311.13 Hz, 369.99 Hz, 392 Hz, 440 Hz, 523.25 Hz |
| 2H | D/ A Bb D Eb F G A C | D3 A3 Bb3 D4 Eb4 F4 G4 A4 C5 | 146.83 Hz, 220 Hz, 233.08 Hz, 293.66 Hz, 311.13 Hz, 349.23 Hz, 392 Hz, 440 Hz, 523.25 Hz |
| 2-I | D/ A C D Eb F# G A C | D3 A3 C4 D4 Eb4 F#4 G4 A4 C5 | 146.83 Hz, 220 Hz, 261.63 Hz, 293.66 Hz, 311.13 Hz, 369.99 Hz, 392 Hz, 440 Hz, 523.25 Hz |
| 2J | D/ A C# D E F# G A C# | D3 A3 C#4 D4 E4 F#4 G4 A4 C#5 | 146.83 Hz, 220 Hz, 277.18 Hz, 293.66 Hz, 329.63 Hz, 369.99 Hz, 392 Hz, 440 Hz, 554.37 Hz |
| 2K | Eb/ Bb Db Eb F Gb Ab Bb Db | Eb3 Bb3 Db4 Eb4 F4 Gb4 Ab4 Bb4 Db5 | 155.56 Hz, 233.08 Hz, 277.18 Hz, 311.13 Hz, 349.23 Hz, 369.99 Hz, 415.3 Hz, 466.16 Hz, 554.37 Hz |

FIG. 18

| Scale Group | Musical Notes of General Scale | Musical Notes of Example Scale | Frequencies of Example Scale |
|---|---|---|---|
| 3A | Eb/ Ab Bb Db Eb F Gb Ab Bb | Eb3 Ab3 Bb3 Db4 Eb4 F4 Gb4 Ab4 Bb4 | 155.56 Hz, 207.65 Hz, 233.08 Hz, 277.18 Hz, 311.13 Hz, 349.23 Hz, 369.99 Hz, 415.3 Hz, 466.16 H |
| 3B | Eb/ Ab Bb Db Eb Gb Ab Bb Db | Eb3 Ab3 Bb3 Db4 Eb4 Gb4 Ab4 Bb4 Db5 | 155.56 Hz, 207.65 Hz, 233.08 Hz, 277.18 Hz, 311.13 Hz, 369.99 Hz, 415.3 Hz, 466.16 Hz, 554.37 H |
| 3C | Eb/ Bb B Db Eb F Gb Ab Bb | Eb3 Bb3 B3 Db4 Eb4 F4 Gb4 Ab4 Bb4 | 155.56 Hz, 233.08 Hz, 246.94 Hz, 277.18 Hz, 311.13 Hz, 349.23 Hz, 369.99 Hz, 415.3 Hz, 466.16 H |
| 3D | Eb/ Bb B D Eb F Gb Ab Bb | Eb3 Bb3 B3 D4 Eb4 F4 Gb4 Ab4 Bb4 | 155.56 Hz, 233.08 Hz, 246.94 Hz, 293.66 Hz, 311.13 Hz, 349.23 Hz, 369.99 Hz, 415.3 Hz, 466.16 H |
| 3E | Eb/ Bb B Db Eb E G Ab Bb | Eb3 Bb3 B3 Db4 Eb4 E4 G4 Ab4 Bb4 | 155.56 Hz, 233.08 Hz, 246.94 Hz, 277.18 Hz, 311.13 Hz, 329.63 Hz, 392 Hz, 415.3 Hz, 466.16 Hz |
| 3F | Eb/ Bb B Db Eb F Gb Bb Db | Eb3 Bb3 B3 Db4 Eb4 F4 Gb4 Bb4 Db5 | 155.56 Hz, 233.08 Hz, 246.94 Hz, 277.18 Hz, 311.13 Hz, 349.23 Hz, 369.99 Hz, 466.16 Hz, 554.37 |
| 3G | Eb/ Ab Bb B Eb F Gb Ab Bb | Eb3 Ab3 Bb3 B3 Eb4 F4 Gb4 Ab4 Bb4 | 155.56 Hz, 207.65 Hz, 233.08 Hz, 246.94 Hz, 311.13 Hz, 349.23 Hz, 369.99 Hz, 415.3 Hz, 466.16 H |
| 3H | F/ Bb C Db F G Ab Bb C | F3 Bb3 C4 Db4 F4 G4 Ab4 Bb4 C5 | 174.61 Hz, 233.08 Hz, 261.63 Hz, 277.18 Hz, 349.23 Hz, 392 Hz, 415.3 Hz, 466.16 Hz, 523.25 Hz |
| 3-I | F/ Bb C Db F Gb Ab Bb C | F3 Bb3 C4 Db4 F4 Gb4 Ab4 Bb4 C5 | 174.61 Hz, 233.08 Hz, 261.63 Hz, 277.18 Hz, 349.23 Hz, 369.99 Hz, 415.3 Hz, 466.16 Hz, 523.25 H |
| 3J | F/ Bb C Eb F G Ab Bb C | F3 Bb3 C4 Eb4 F4 G4 Ab4 Bb4 C5 | 174.61 Hz, 233.08 Hz, 261.63 Hz, 311.13 Hz, 349.23 Hz, 392 Hz, 415.3 Hz, 466.16 Hz, 523.25 Hz |
| 3K | F/ Bb C E F G A Bb C | F3 Bb3 C4 E4 F4 G4 A4 Bb4 C5 | 174.61 Hz, 233.08 Hz, 261.63 Hz, 329.63 Hz, 349.23 Hz, 392 Hz, 440 Hz, 466.16 Hz, 523.25 Hz |
| | | | |
| 4A | Eb/ Ab Bb C D Eb F G Bb | Eb3 Ab3 Bb3 C4 D4 Eb4 F4 G4 Bb4 | 155.56 Hz, 207.65 Hz, 233.08 Hz, 261.63 Hz, 293.66 Hz, 311.13 Hz, 349.23 Hz, 392 Hz, 466.16 Hz |
| 4B | F/ A C D E F G A C | F3 A3 C4 D4 E4 F4 G4 A4 C5 | 174.61 Hz, 220 Hz, 261.63 Hz, 293.66 Hz, 329.63 Hz, 349.23 Hz, 392 Hz, 440 Hz, 523.25 Hz |
| 4C | F/ A Bb C E F A Bb C | F3 A3 Bb3 C4 E4 F4 A4 Bb4 C5 | 174.61 Hz, 220 Hz, 233.08 Hz, 261.63 Hz, 329.63 Hz, 349.23 Hz, 440 Hz, 466.16 Hz, 523.25 Hz |
| 4D | F/ Bb B D Eb F Gb Ab Bb | F3 Bb3 B3 D4 Eb4 F4 Gb4 Ab4 Bb4 | 174.61 Hz, 233.08 Hz, 246.94 Hz, 293.66 Hz, 311.13 Hz, 349.23 Hz, 369.99 Hz, 415.3 Hz, 466.16 H |
| 4E | F/ Bb B Db Eb F Gb Ab Bb | F3 Bb3 B3 Db4 Eb4 F4 Gb4 Ab4 Bb4 | 174.61 Hz, 233.08 Hz, 246.94 Hz, 277.18 Hz, 311.13 Hz, 349.23 Hz, 369.99 Hz, 415.3 Hz, 466.16 H |
| 4F | F/ Bb C Db Eb F Gb Ab Bb | F3 Bb3 C4 Db4 Eb4 F4 Gb4 Ab4 Bb4 | 174.61 Hz, 233.08 Hz, 261.63 Hz, 277.18 Hz, 311.13 Hz, 349.23 Hz, 369.99 Hz, 415.3 Hz, 466.16 H |
| 4G | F/ Bb C Db Eb F G Ab Bb | F3 Bb3 C4 Db4 Eb4 F4 G4 Ab4 Bb4 | 174.61 Hz, 233.08 Hz, 261.63 Hz, 277.18 Hz, 311.13 Hz, 349.23 Hz, 392 Hz, 415.3 Hz, 466.16 Hz |
| 4H | F/ Bb C D Eb F G Ab Bb | F3 Bb3 C4 D4 Eb4 F4 G4 Ab4 Bb4 | 174.61 Hz, 233.08 Hz, 261.63 Hz, 293.66 Hz, 311.13 Hz, 349.23 Hz, 392 Hz, 415.3 Hz, 466.16 Hz |
| 4-I | F/ Bb C Db E F G Ab Bb | F3 Bb3 C4 Db4 E4 F4 G4 Ab4 Bb4 | 174.61 Hz, 233.08 Hz, 261.63 Hz, 277.18 Hz, 329.63 Hz, 349.23 Hz, 392 Hz, 415.3 Hz, 466.16 Hz |
| 4J | F/ Bb C D E F G A C | F3 Bb3 C4 D4 E4 F4 G4 A4 C5 | 174.61 Hz, 233.08 Hz, 261.63 Hz, 293.66 Hz, 329.63 Hz, 349.23 Hz, 392 Hz, 440 Hz, 523.25 Hz |
| 4K | F/ Bb C Db E F G Ab C | F3 Bb3 C4 Db4 E4 F4 G4 Ab4 C5 | 174.61 Hz, 233.08 Hz, 261.63 Hz, 277.18 Hz, 329.63 Hz, 349.23 Hz, 392 Hz, 415.3 Hz, 523.25 Hz |

FIG. 18 (cont.)

| Scale Group | Musical Notes of General Scale | Musical Notes of Example Scale | Frequencies of Example Scale |
|---|---|---|---|
| 5A | F/ Bb C Db Eb F G Ab C | F3 Bb3 C4 Db4 Eb4 F4 G4 Ab4 C5 | 174.61 Hz, 233.08 Hz, 261.63 Hz, 277.18 Hz, 311.13 Hz, 349.23 Hz, 392 Hz, 415.3 Hz, 523.25 Hz |
| 5B | F/ Bb C Db Eb F Gb Bb C | F3 Bb3 C4 Db4 Eb4 F4 Gb4 Bb4 C5 | 174.61 Hz, 233.08 Hz, 261.63 Hz, 277.18 Hz, 311.13 Hz, 349.23 Hz, 369.99 Hz, 466.16 Hz, 523.25 H |
| 5C | F/ Ab C Db Eb F G Ab C | F3 Ab3 C4 Db4 Eb4 F4 G4 Ab4 C5 | 174.61 Hz, 207.65 Hz, 261.63 Hz, 277.18 Hz, 311.13 Hz, 349.23 Hz, 392 Hz, 415.3 Hz, 523.25 Hz |
| 5D | F/ Ab C D Eb F G Ab C | F3 Ab3 C4 D4 Eb4 F4 G4 Ab4 C5 | 174.61 Hz, 207.65 Hz, 261.63 Hz, 293.66 Hz, 311.13 Hz, 349.23 Hz, 392 Hz, 415.3 Hz, 523.25 Hz |
| 5E | F/ Ab C Db E F G Ab C | F3 Ab3 C4 Db4 E4 F4 G4 Ab4 C5 | 174.61 Hz, 207.65 Hz, 261.63 Hz, 277.18 Hz, 329.63 Hz, 349.23 Hz, 392 Hz, 415.3 Hz, 523.25 Hz |
| 5F | F#/ G# A C# E F# G# A C# | F#3 G#3 A3 C#4 E4 F#4 G#4 A4 C#5 | 185 Hz, 207.65 Hz, 220 Hz, 277.18 Hz, 329.63 Hz, 369.99 Hz, 415.3 Hz, 440 Hz, 554.37 Hz |
| 5G | F#/ A# C# D# F F# G# A# C# | F#3 A#3 C#4 D#4 F4 F#4 G#4 A#4 C#5 | 185 Hz, 233.08 Hz, 277.18 Hz, 311.13 Hz, 349.23 Hz, 369.99 Hz, 415.3 Hz, 466.16 Hz, 554.37 Hz |
| 5H | F#/ A C# D E F# G# A C# | F#3 A3 C#4 D4 E4 F#4 G#4 A4 C#5 | 185 Hz, 220 Hz, 277.18 Hz, 293.66 Hz, 329.63 Hz, 369.99 Hz, 415.3 Hz, 440 Hz, 554.37 Hz |
| 5-I | F#/ A C# D# E F# G# A C# | F#3 A3 C#4 D#4 E4 F#4 G#4 A4 C#5 | 185 Hz, 220 Hz, 277.18 Hz, 311.13 Hz, 329.63 Hz, 369.99 Hz, 415.3 Hz, 440 Hz, 554.37 Hz |
| 5J | F#/ A C# D F F# G# A C# | F#3 A3 C#4 D4 F4 F#4 G#4 A4 C#5 | 185 Hz, 220 Hz, 277.18 Hz, 293.66 Hz, 349.23 Hz, 369.99 Hz, 415.3 Hz, 440 Hz, 554.37 Hz |
| | | | |
| 6 | F#/ G# A# C# D# F F# A# C# | F#3 G#3 A#3 C#4 D#4 F4 F#4 A#4 C#5 | 185 Hz, 207.65 Hz, 233.08 Hz, 277.18 Hz, 311.13 Hz, 349.23 Hz, 369.99 Hz, 466.16 Hz, 554.37 Hz |

FIG. 18 (cont.)

METHODS AND SYSTEMS FOR PRODUCTION OF HANDPANS

CROSS-REFERENCE TO RELATED APPLICATIONS

The present patent application is a continuation application of International Patent Application No. PCT/US2021/054205 filed Oct. 8, 2021, which claims the benefit of U.S. Provisional Patent Application No. 63/089,902, entitled "Methods and Systems for Production of Handpans," filed on Oct. 9, 2020, each of which is incorporated herein by reference in its entirety for all purposes.

BACKGROUND

A handpan is a parabolic musical instrument capable of emitting musical tones when struck with the hands. Typically, a handpan is fabricated by manually forming a first sheet of steel into a top shell and a second sheet of steel into a bottom shell and joining the top shell to the bottom shell to form a hollow chamber between the top and bottom shell used to amplify the musical tones created when the handpan is played.

The manual process of forming metal into the desired shapes for creation of desired musical tones is extremely time- and labor-intensive. Fabrication of handpans requires significant physical strength and endurance, excluding some individuals from practicing the art. In many cases, repeated manual fabrication can lead to an artisan developing overuse and repetitive motion injuries. A handpan can take from several weeks to months to fabricate by hand, which increases both the lag between the placing of an order and the receipt of the finished handpan and the total cost of the handpan to consumers. In many cases, the consumer cost of handpans produced using existing methods and systems is prohibitively high for all but the most committed musicians. Handpans are also very difficult to tune, often requiring a highly skilled musician to manually shape the surfaces of the handpan to achieve the desired tone combinations and scales.

New methods and systems are needed to reduce the cost, time, and skill required to produce a handpan, to enable scaling in production of handpans.

SUMMARY

The present disclosure provides a fast and reproducible method for hydroforming a handpan with minimal manual labor. The quality, performance and appearance of the handpans of the present disclosure are highly consistent and reproducible. Additionally, handpans produced according to the subject methods exhibit superior hardness compared to handpans produced by other methods, which may improve the durability, tuneability, timbre, and other physical and musical qualities of the instruments at a lower production cost.

In certain aspects, the present disclosure provides a method for forming a top shell of a handpan, comprising: (a) providing a mold having a mold shape complementary to an intended shape of the top shell of the handpan; (b) providing a plate in proximity to the mold; (c) applying a pressurized fluid to a surface of the plate, thereby causing the plate to deform into the mold, until the plate has deformed into the intended shape, thereby forming the top shell of the handpan; and (d) removing the top shell of the handpan from the mold. Also provided herein is a method for forming a handpan, comprising joining a top shell formed according to a method described herein to a bottom shell, thereby forming the handpan. The bottom shell may comprise a port. In some embodiments, the method further comprises, prior to the joining, forming the port using a lathe or hydraulic press. In some embodiments, the method further comprises, prior to the joining, forming a bottom shell of a handpan, comprising: (a2) providing a mold having a mold shape complementary to an intended shape of the bottom shell of the handpan; (b2) providing a plate in proximity to the mold; (c2) applying a pressurized fluid to a surface of the plate, thereby causing the plate to deform into the mold, until the plate has deformed into the intended shape, thereby forming the bottom shell of the handpan; (d2) removing the bottom shell of the handpan from the mold; and (e2) cutting a hole in the bottom shell, optionally with a drill, lathe or laser. The intended shape may comprise one or more members selected from the group consisting of: dimples, domes, notes, and logos. The intended shape may comprise one or more members selected from the group consisting of: dimples, domes, notes, logos, and ports. The plate may comprise a metal or metal alloy, such as titanium, steel, bronze, brass, or zinc, optionally wherein the steel comprises 0.02 to 0.2% carbon. In some embodiments, the plate comprises one or more members selected from the group consisting of 1008 cold rolled steel, 1018 cold rolled steel, and stainless steel 430. In some embodiments, the plate comprises one or more members selected from the group consisting of 18-gauge steel, 19-gauge steel, and 20-gauge steel. The thickness of the plate is optionally between 0.8 mm and 1.3 mm.

In practicing any of the subject methods, the pressurized fluid may comprise water, such as at least 95% w/w water. In some embodiments, the pressurized fluid has a pressure within a range from 20 bars to 4,000 bars, such as 20 bars to 225 bars. The intended shape may have a diameter within a range from 40 centimeters (cm) to 60 cm, such as 48 cm to 55 cm. In some embodiments, the top shell has a depth within a range from 10 cm to 15 cm. In some embodiments, the top shell comprises a hardness within a range from 300 megapascals (MPa) to 500 MPa. Optionally, the maximum hardness of the top shell is at least 450 MPa. The minimum hardness of the top shell may be at least 300 MPa. In some embodiments, the bottom shell comprises a hardness within a range from 300 megapascals (MPa) to 500 MPa. Optionally, the maximum hardness of the bottom shell is at least 450 MPa. The minimum hardness of the bottom shell may be at least 300 MPa. In some embodiments, the handpan comprises seven to ten notes.

A method of the present disclosure may further comprise performing (a)-(d) in less than ten minutes, such as less than two minutes. In some embodiments, the method further comprises repeating (b) to (d) at least five times within one hour, such as at least 50 times within one hour. A method of the present disclosure may further comprise performing (a2)-(d2) in less than ten minutes, such as less than two minutes. In some embodiments, the method further comprises repeating (b2) to (d2) at least five times within one hour, such as at least 50 times within one hour. In some embodiments, the method further comprises trimming the top shell, optionally with a laser. In some embodiments, the method further comprises trimming the bottom shell, optionally with a laser. The method may further comprise nitriding the top shell, optionally wherein the nitriding is gas nitriding. The maximum hardness of the top shell after the nitriding may be at least 700 MPa. In some embodiments, the minimum hardness of the top shell after the nitriding is at least 550 MPa. The method may further comprise nitriding the bottom shell, optionally wherein the nitriding is gas nitriding. The maximum hardness of the bottom shell after the nitriding may be at least 700 MPa. In some embodiments, the minimum hardness of the bottom shell after the nitriding is at least 550 MPa. In some embodiments, the method further comprises tuning one or more notes on the top shell after removing the top shell from the mold or after nitriding the top shell.

In certain aspects, the present disclosure provides a handpan comprising a top shell and a bottom shell, wherein the top shell comprises a hardness within a range from 300 MPa to 900 MPa. In some embodiments, the maximum hardness of the top shell is at least 450 MPa. The minimum hardness of the top shell may be at least 300 MPa. In some embodiments, the bottom shell comprises a hardness within a range from 260 MPa to 420 MPa, optionally wherein the minimum hardness of the bottom shell is less than 300 MPa. The bottom shell may comprise a hardness within a range from 300 MPa to 900 MPa. In some embodiments, the maximum hardness of the bottom shell is at least 450 MPa. The minimum hardness of the bottom shell may be at least 300 MPa.

The top shell of a handpan of the present disclosure may comprise a first metal or first metal alloy and the bottom shell of the handpan may comprise a second metal or second metal alloy, wherein the first metal or first metal alloy is the same or different than as the second metal or second metal alloy. In some embodiments, a surface of the top shell or the bottom shell comprises nitride. In some embodiments, the surface of the top shell comprises nitride and the maximum hardness of the top shell is at least 700 MPa, optionally wherein the minimum hardness of the top shell is at least 550 MPa. In some embodiments, the surface of the bottom shell comprises nitride and the bottom shell comprises a hardness within a range from 400 MPa to 700 MPa, optionally wherein the minimum hardness of the bottom shell is less than 650 MPa. In some embodiments, the surface of the bottom shell comprises nitride and the maximum hardness of the bottom shell is at least 700 MPa, optionally wherein the minimum hardness of the bottom shell is at least 550 MPa.

The surface of the top shell of a handpan of the present disclosure may be free from tooling marks. In some embodiments, the handpan comprises titanium, steel, bronze, brass, or zinc, such as steel, optionally wherein the steel comprises 0.02 to 0.2% carbon. In some embodiments, the thickness of the top shell of the handpan is between 0.7 mm and 1.3 mm. In some embodiments, the handpan has a diameter within a range from 40 cm to 60 cm, such as 48 cm to 55 cm. The top shell may have a depth within a range from 10 cm to 15 cm. In some embodiments, the handpan comprises seven to ten notes.

In certain aspects, the present disclosure provides a top shell of a handpan 100 comprising a hardness within a range from 300 MPa to 500 MPa, optionally wherein the maximum hardness of the top shell is at least 450 MPa. In certain aspects, the present disclosure provides a nitride-hardened top shell of a handpan comprising a hardness within a range of 550 MPa to 900 MPa, optionally wherein the maximum hardness of the top shell is at least 700 MPa. The top shell may be formed using a method described herein. In some embodiments, the surface of the top shell is free from tooling marks. The top shell may comprise titanium, steel, bronze, brass, or zinc, such as steel, optionally wherein the steel comprises 0.02 to 0.2% carbon. The thickness of the top shell may be between 0.7 mm and 1.3 mm. In some embodiments, the top shell has a diameter within a range from 40 cm to 60 cm, such as 48 cm to 55 cm. The top shell may have a depth within a range from 10 cm to 15 cm. In some embodiments, the top shell comprises seven to ten notes.

In certain aspects, the present disclosure provides a mold for a top shell of a handpan, comprising one or more members selected from the group consisting of: dimples, domes, notes, and logos. The surface of the mold may comprise nitride. In some embodiments, the mold comprises breathing holes. In some embodiments, the mold is complementary to a top shell of a handpan having a diameter within a range from 40 cm to 60 cm, such as 48 cm to 55 cm. In some embodiments, the mold is complementary to a top shell of a handpan having a depth within a range from 10 cm to 15 cm. The mold may be complementary to a top shell of a handpan comprising seven to ten notes.

In certain aspects, the present disclosure provides a bottom shell of a handpan 100 comprising a hardness within a range from 300 MPa to 500 MPa, optionally wherein the maximum hardness of the bottom shell is at least 450 MPa. In certain aspects, the present disclosure provides a nitride-hardened bottom shell of a handpan comprising a hardness within a range of 550 MPa to 900 MPa, optionally wherein the maximum hardness of the bottom shell is at least 700 MPa. The bottom shell may be formed using a method described herein. In some embodiments, the surface of the bottom shell is free from tooling marks. The bottom shell may comprise titanium, steel, bronze, brass, or zinc, such as steel, optionally wherein the steel comprises 0.02% to 0.2% carbon. The thickness of the bottom shell may be between 0.7 mm and 1.3 mm. In some embodiments, the bottom shell has a diameter within a range from 40 cm to 60 cm, such as 48 cm to 55 cm. The bottom shell may have a depth within a range from 10 cm to 15 cm. In some embodiments, the bottom shell comprises a port.

In certain aspects, the present disclosure provides a mold for a bottom shell of a handpan, comprising one or more members selected from the group consisting of: ports and logos. The surface of the mold may comprise nitride. In some embodiments, the mold comprises breathing holes. In some embodiments, the mold is complementary to a bottom shell of a handpan having a diameter within a range from 40 cm to 60 cm, such as 48 cm to 55 cm. In some embodiments, the mold is complementary to a bottom shell of a handpan having a depth within a range from 10 cm to 15 cm. The mold may be complementary to a bottom shell of a handpan comprising a port.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 17A shows a table of examples of musical scales easily achieved in a handpan from a single handpan mold using 1.00 mm thick 1008 cold rolled steel, according to embodiments herein.

FIG. 17B shows a table of examples of musical scales easily achieved in a handpan from the handpan mold of FIG. 17A, using 1.00 mm thick stainless steel 430, according to embodiments herein.

FIG. 17C shows a table of examples of musical scales easily achieved in a handpan from the handpan mold of FIG. 17A, using 1.15 mm thick stainless steel 430, according to embodiments herein.

FIG. 17D shows a table of examples of musical scales easily achieved in a handpan from the handpan mold of FIG. 17A, using 1.25 mm thick stainless steel 430, according to embodiments herein.

FIG. 18 shows a table of examples of musical scales easily achieved in a handpan using 1.00 mm thick 1008 cold rolled steel using a single handpan mold, according to embodiments herein.

DETAILED DESCRIPTION

Figure 1A:
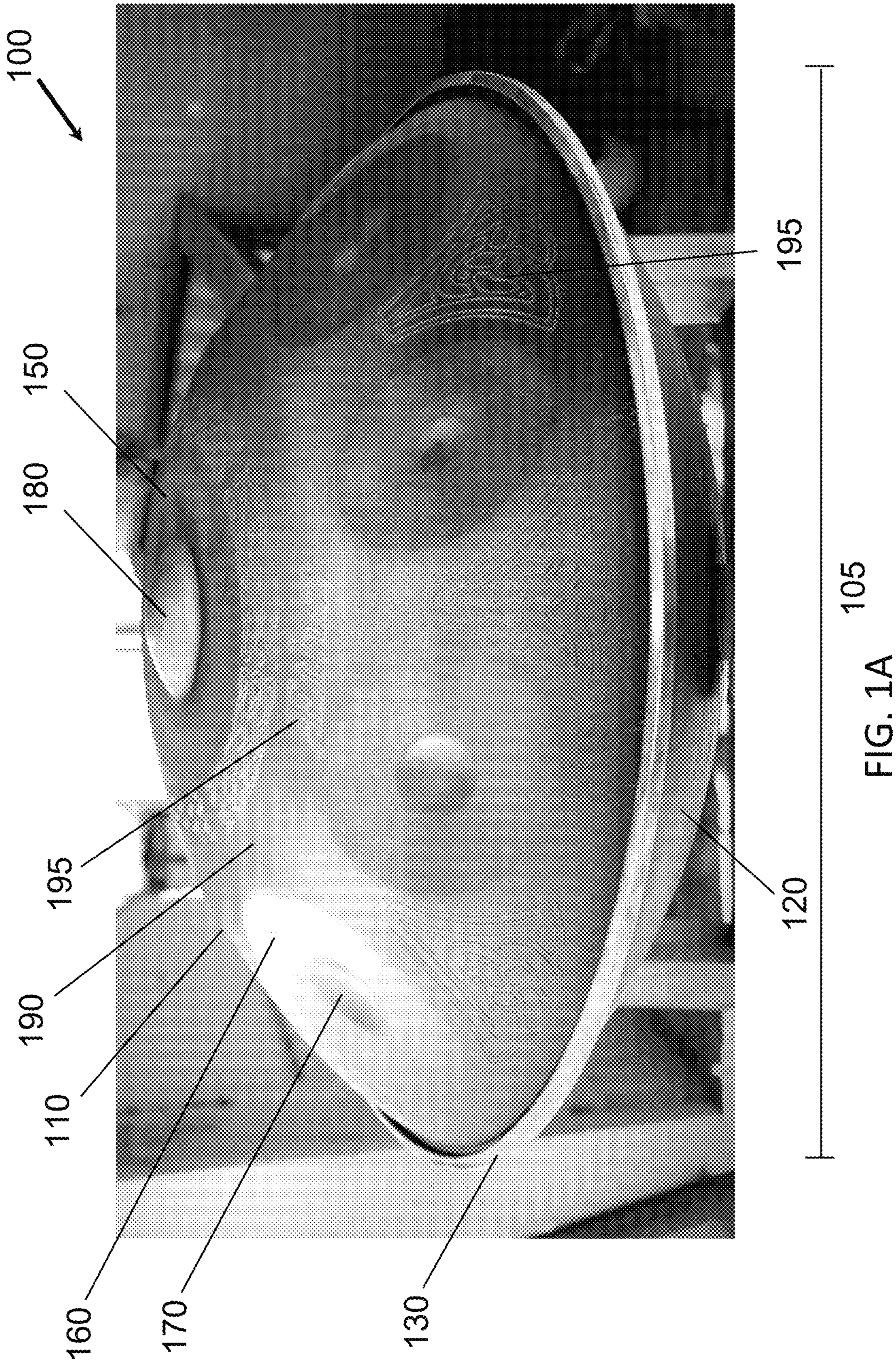
FIG. 1A shows a handpan, according to embodiments herein.

Provided herein are handpan instruments and systems and methods of producing handpan instruments. A handpan 100 typically comprises a top shell 110 and a bottom shell 120. As described herein, a hydroforming process can be used to form (e.g., "sink") the rough shape of a handpan shell (e.g., top shell 110 and/or bottom shell 120) rather than time- and labor-intensive manual methods making use of hammers, such as pneumatic air hammers and/or sledge hammers. As further described herein, hydroforming a handpan shell (e.g., top shell 110 and/or bottom shell 120) with a system comprising a mold 200 can significantly decrease the time, cost, and skill required to produce a handpan 100. Hydroforming handpans using methods disclosed herein (e.g., hydroforming with a mold 200) can also significantly improve the precision and accuracy of the sizes and shapes of the handpan shells and/or features (e.g., intonation features) of the shells (e.g., relative to a desired target value or shape). For example, methods described herein (e.g., hydroforming with a mold 200) can reduce the tolerance of a dimension or shape of a handpan shell or portion thereof described herein to less than 10%, less than 5%, less than 4%, less than 3%, less than 2%, or less than 1%. In many cases, average variation in a given dimension of a handpan 100 or a portion thereof is less than 0.5%.

Figure 1B:
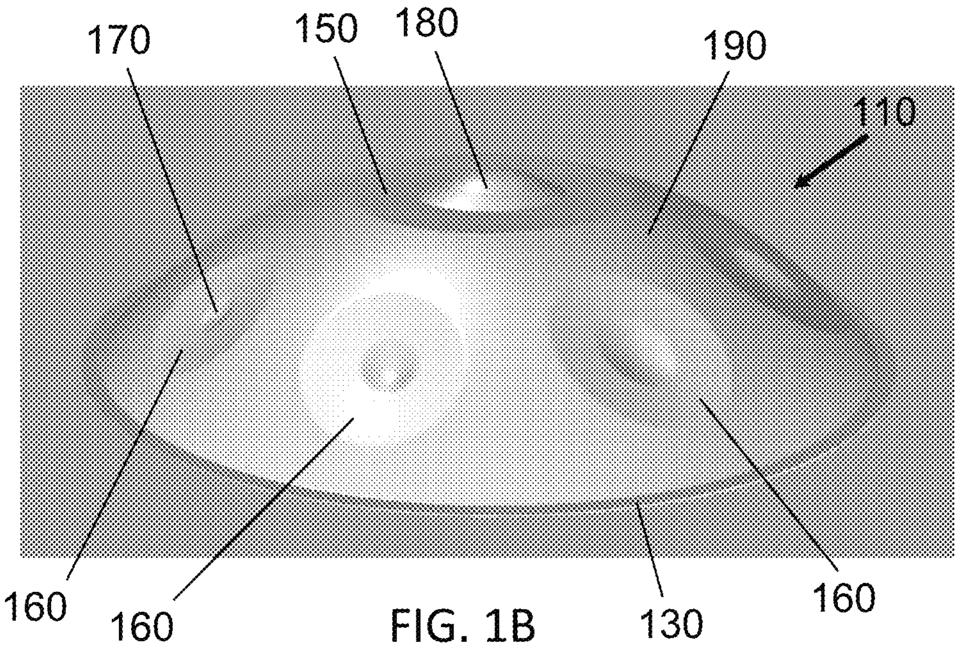
FIG. 1B shows a schematic of a top shell of a handpan, according to embodiments herein.
Figure 1C:
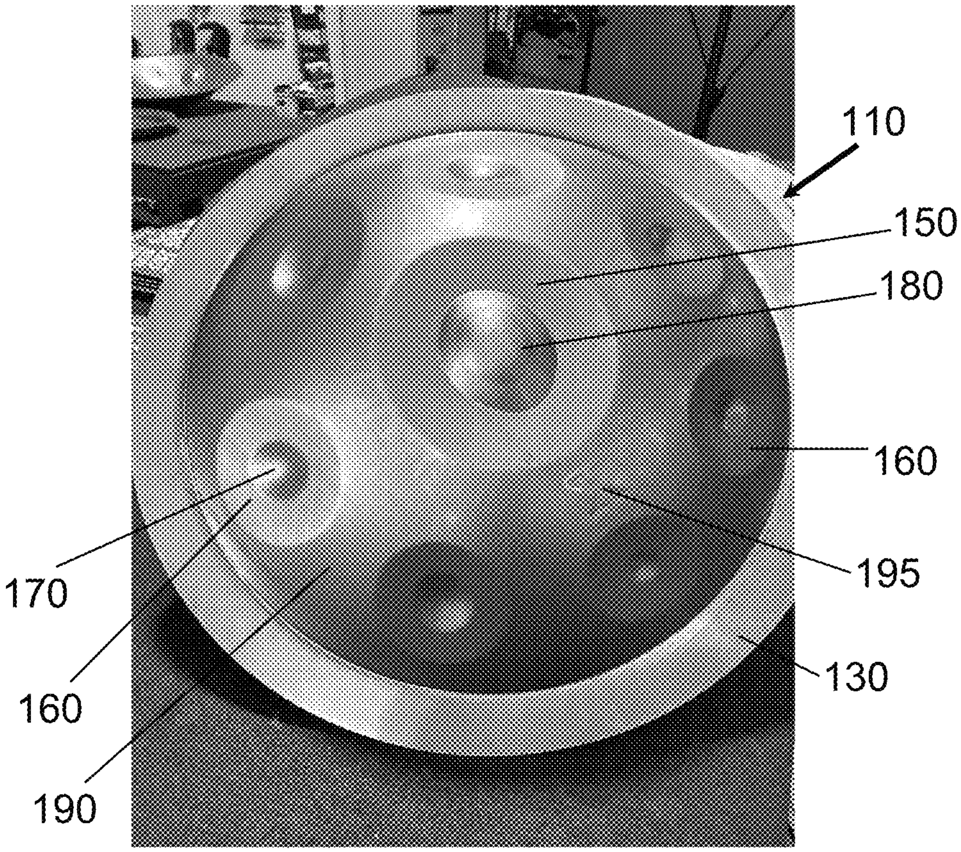
FIG. 1C shows a photograph of a top shell of a handpan, according to embodiments herein.
Figure 1D:
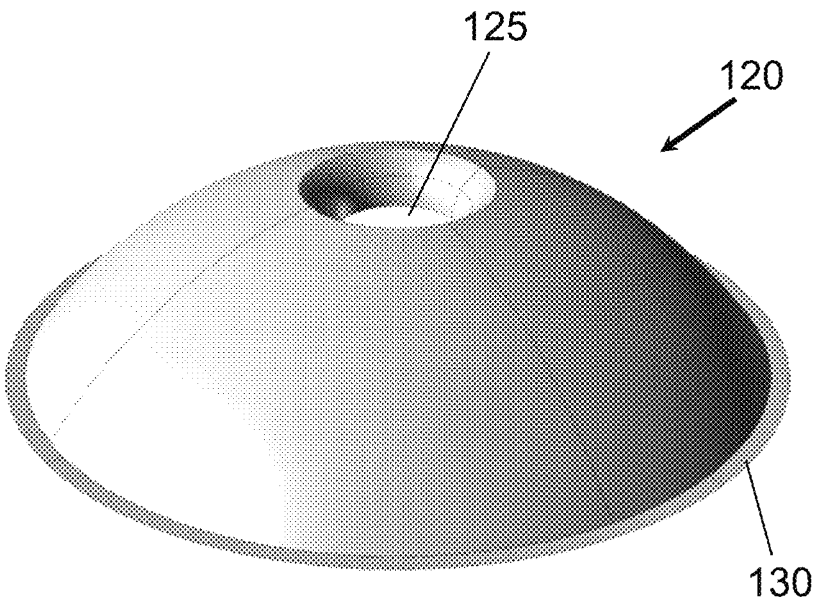
FIG. 1D shows a schematic of a bottom shell of a handpan, according to embodiments herein.
Figure 1E:
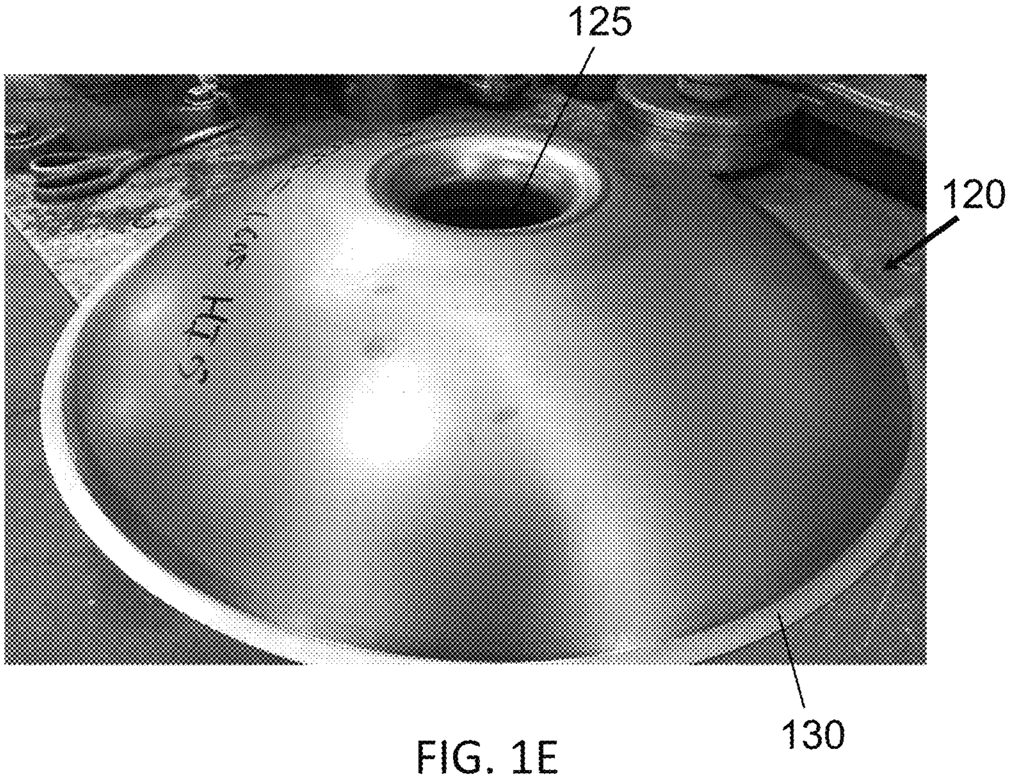
FIG. 1E shows a photograph of a bottom shell of a handpan, according to embodiments herein.

In general, a handpan 100 is a single-walled, hollow-bodied musical instrument (e.g., as shown in FIG. 1A) that produces musical tones when a portion of the shell of the handpan 100 is struck or otherwise caused to vibrate. The hollow body of the handpan 100 can be formed by joining two approximately bowl-shaped pieces of metal, called the top shell 110 (e.g., as shown in FIG. 1B and FIG. 1C) and the bottom shell 120 (e.g., as shown in FIG. 1D and FIG. 1E) at their rims 130 (e.g., the rim 130 of the top shell 110 and the rim 130 of the bottom shell 120). The size and shape of the handpan 100, as well as the location and method of striking the shell of the handpan 100, determines the musical qualities (e.g., pitch, timbre, and loudness) of the sounds produced by the handpan 100.

Methods of Fabrication

Provided herein are methods for fabrication of handpans 100 using hydroforming. In many cases, fabrication of handpans 100 described herein can comprise the use of a mold 200, e.g., to improve the speed and reproducibility of handpan 100 fabrication while reducing the cost and technical difficulty associated with handpan 100 fabrication compared to existing technologies. In some cases, improvements to speed, reproducibility, cost, and ease of use can result from processes of molded hydroforming disclosed herein and can allow an artisan to form intonation features in the shell of the handpan 100 during initial formation (e.g., "sinking") of the shell, e.g., as opposed to requiring an additional series of steps to manually form the intonation features after the blank shell has been formed or "sunk." In many cases, a plurality of intonation features can be formed simultaneously in a handpan shell (e.g., a top shell) using the methods and systems disclosed herein. In many cases, a handpan shell produced by hydroforming with a mold 200 can be free from tooling marks.

For example, most existing technologies first require the sinking of a shell (e.g., a top shell 110), then sequential and manual introduction of intonation features into the shell (e.g., formation of dimples 170 onto the shell followed by formation of notes (e.g., note fields 160), and then the logo 195). Using the methods and systems disclosed herein, a shell (e.g., a top shell 110) comprising one or more features (e.g., intonation features and/or logos or decorative embellishments 195) can be formed via a reduced number of steps and in less time (e.g., one minute or less) by hydroforming the shell into a mold 200 comprising the one or more features (e.g., intonation features and/or logos or decorative embellishments 195).

Figure 12:
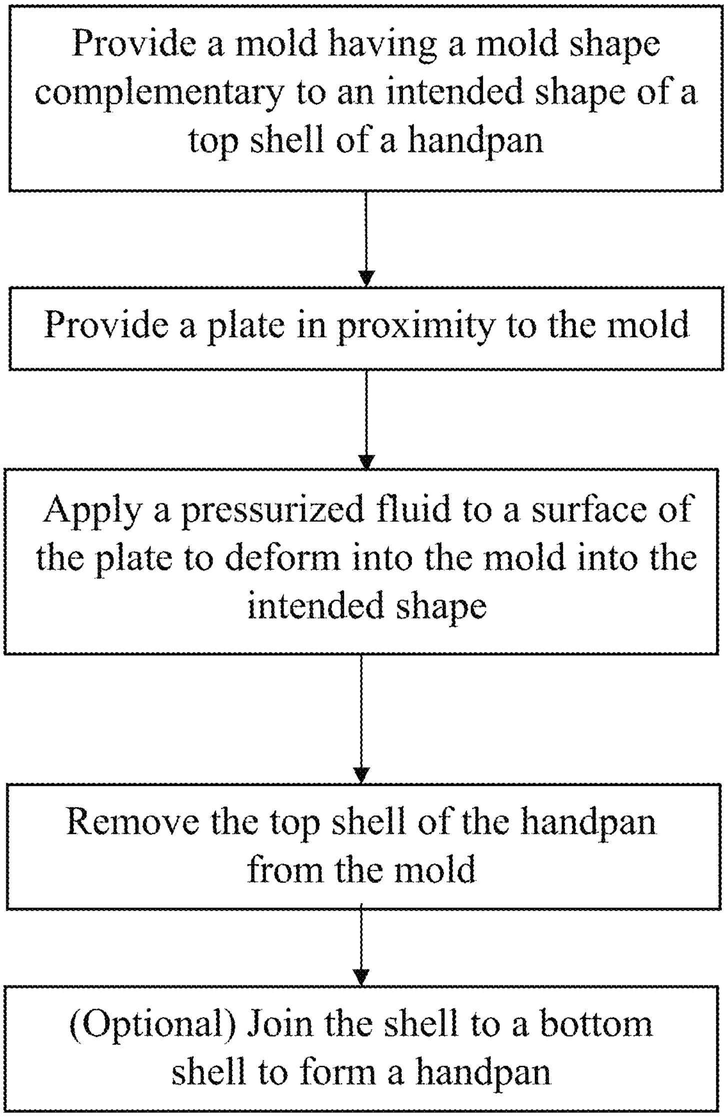
FIG. 12 shows a process for forming a top shell of a handpan, according to embodiments herein.

In some cases, a handpan 100 can be formed by a process comprising (i) hydroforming a top shell 110 into a first mold 200 comprising a first set of one or more features (e.g., intonation features and/or logos or decorative embellishments 195), (ii) adjusting the features of the hydroformed top shell 110 (e.g., to achieve the desired set of musical features, for example by reshaping the molded intonation features of the top shell 110), (iii) providing a bottom shell 120 comprising one or more features (e.g., a port 125), (iv) optionally adjusting the one or more features of the bottom shell 120 (e.g., to achieve a desired shape and/or musical quality), and (v) joining the top shell 110 to the bottom shell 120 (e.g., by applying an adhesive to the rim 130 of the bottom shell 120 and pressing the rim 130 of the top shell 110 onto the rim 130 of the bottom shell 120 to form the hollow body of the handpan 100). A similar or identical hydroforming method can be employed for the formation of both the top shell 110 and the bottom shell 120 of a handpan 100. An example of a method of fabricating a handpan 100 using a mold, in accordance with embodiments herein, is shown in FIG. 12. In some cases, a handpan 100 of the present disclosure comprises a top shell 110 formed using a hydroforming method described herein and a bottom shell 120, optionally wherein the bottom shell 120 is formed by one or more of hydroforming, hammering, pressing, spinning or rolling.

Figure 2:
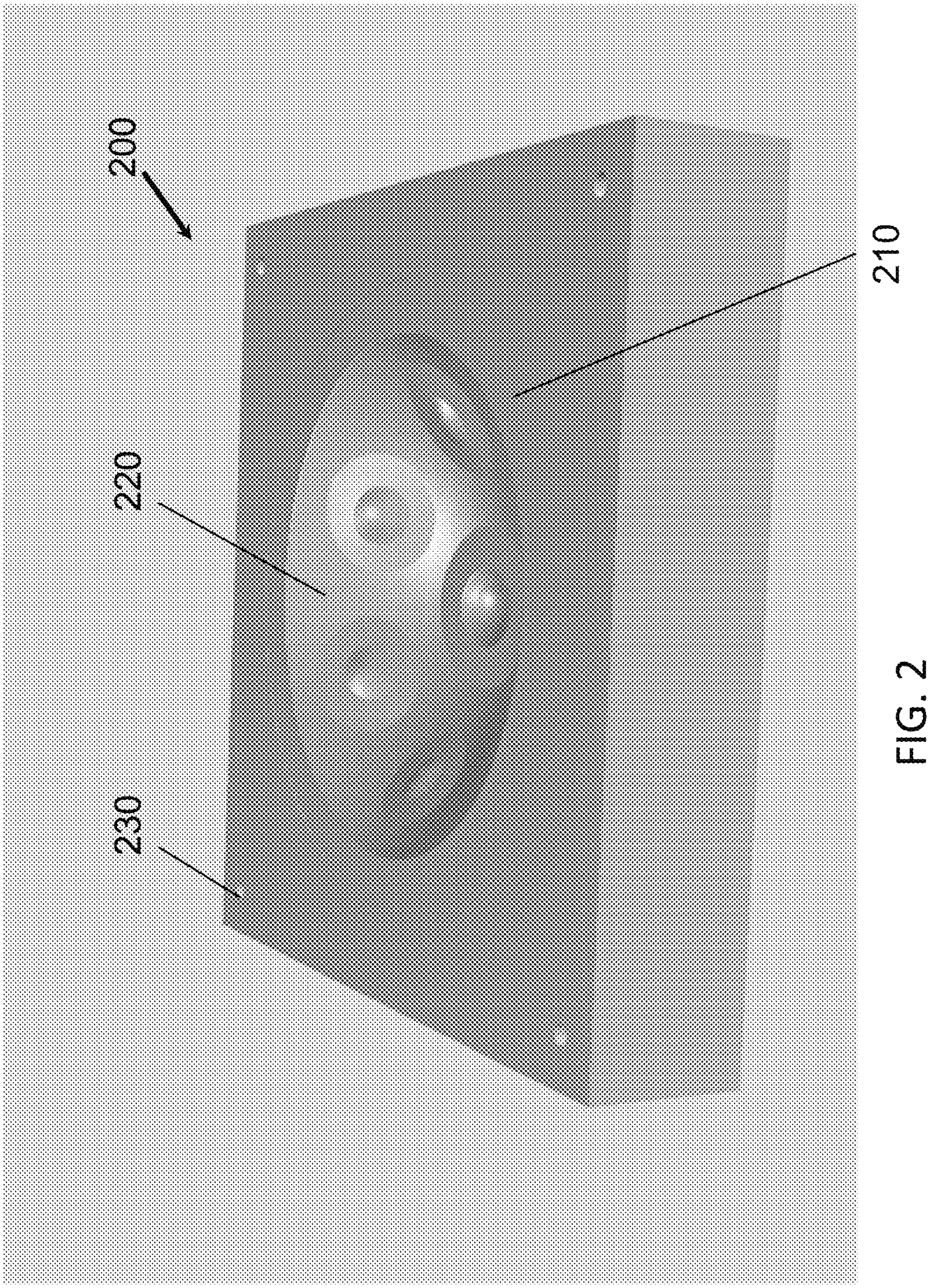
FIG. 2 illustrates a perspective view of a hydroforming mold, according to embodiments herein.
Figure 3A:
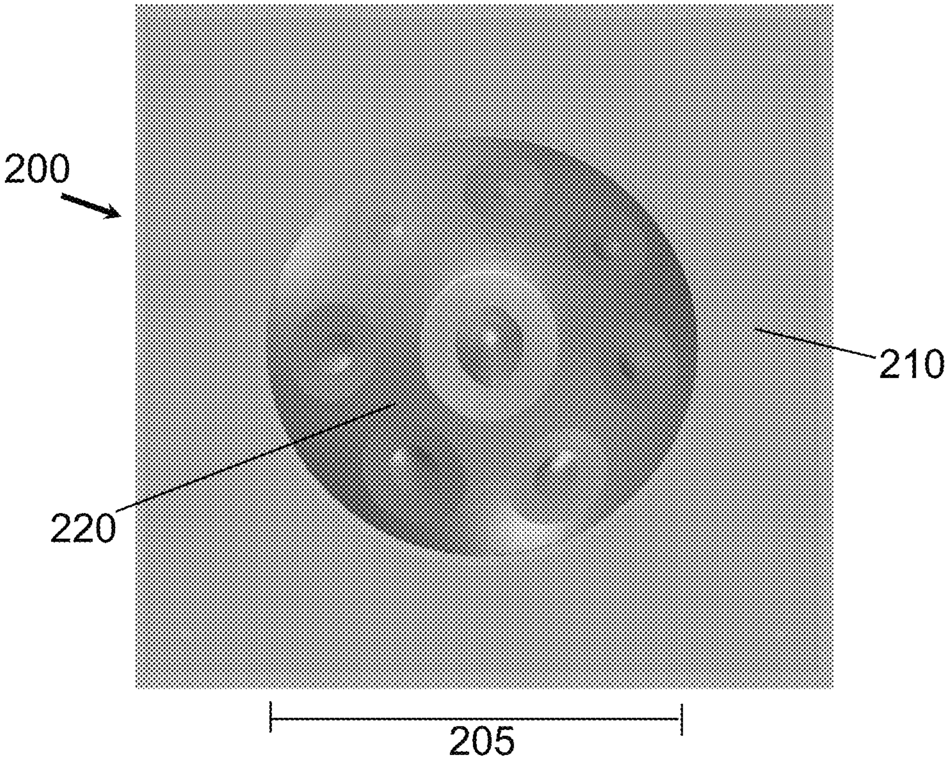
FIG. 3A is a schematic of a top view of a hydroforming mold, according to embodiments herein.

Hydroforming a handpan shell, such as a top shell 110 of a handpan 100, may comprise providing a handpan mold 200, as described herein. As shown in FIG. 2 and FIG. 3A, the mold 200 can comprise a shape 220 complementary to an intended shape of a shell of a handpan 100 (e.g., a top shell 110 of the handpan 100). The complementary shape 220 of the mold 200 may be either concave or convex. In many cases, an intended shape of a shell (e.g., top shell 110) of a handpan 100 can comprise one or more features, such as one or more dimples 170, one or more domes 180, one or more notes (e.g., 150 or 160), one or more logos 195 and/or one or more ports 125. As described herein, molds 200 can be created and used to produce a desired quantity and arrangement of features in the hydroformed shell. For example, a mold 200 can be generally bowl shaped and can comprise protrusions in the inverted shape of desired features, such as flat areas to produce note fields 160, raised areas to produce dimples and inpexes 170, and recesses to produce domes and apexes 180. Alternatively, a mold 200 can be generally an inverted bowl shape and can comprise protrusions in the shape of desired features, such as flat areas to produce note fields 160, recesses to produce dimples and inpexes 170, and raised areas to produce domes and apexes 180.

Hydroforming methods disclosed herein may comprise providing a plate (e.g., a metal sheet selected from thicknesses and metal types described herein) in proximity to the mold 200. The plate can be placed in proximity to the mold 200, for example, by clamping the plate between a pair of ring clamps. In some cases, one of the ring clamps used to secure the metal sheet can comprise a mold 200, the mold 200 comprising one or more features to be formed in the shell created from the metal sheet during hydroforming.

In many cases, a gasket is clamped between the ring clamps, e.g., to reduce leakage. In some cases, the gasket comprises a bead of handpan sealant glue (e.g., which is allowed to dry before clamping of the metal sheet between the ring clamps). In some cases, the clamping system is secured with a series of bolts (e.g., bolts having a diameter of approximately 1.5 inches (3.81 cm), and a length of 6 inches (15.24 cm)), which can be tightened in a star pattern or approximation thereof to ensure equal loading of the system. In many cases, establishing the clamping pressure allows forces within the clamped system to equalize before a forming force is added to deform the metal.

In many embodiments, a fluid (e.g., a fluid comprising at least 90% water, such as at least 95% water) is introduced under pressure into the clamped system to establish a forming pressure. The forming pressure can be established by introducing pressurized water to the clamped system via high pressure lines and a fluid pressurization source (e.g., a pressure washer). In many cases, a forming pressure is less than 4,000 bar, less than 3,000 bar, less than 2,000 bar, less than 1,000 bar, less than 500 bar, or less than 100 bar, such as less than 500 bar. In some embodiments, the fluid is pressurized to 20 bar to 4,000 bar. In some embodiments, the fluid is pressurized to 20 bar to 50 bar, 20 bar to 100 bar, 20 bar to 150 bar, 20 bar to 200 bar, 20 bar to 225 bar, 20 bar to 250 bar, 20 bar to 300 bar, 20 bar to 400 bar, 20 bar to 500 bar, 20 bar to 1,000 bar, 20 bar to 2,000 bar, 20 bar to 3,000 bar, 20 bar to 4,000 bar, 50 bar to 100 bar, 50 bar to 150 bar, 50 bar to 200 bar, 50 bar to 225 bar, 50 bar to 250 bar, 50 bar to 300 bar, 50 bar to 400 bar, 50 bar to 500 bar, 50 bar to 1,000 bar, 50 bar to 2,000 bar, 50 bar to 3,000 bar, 50 bar to 4,000 bar, 100 bar to 150 bar, 100 bar to 200 bar, 100 bar to 225 bar, 100 bar to 250 bar, 100 bar to 300 bar, 100 bar to 400 bar, 100 bar to 500 bar, 100 bar to 1,000 bar, 100 bar to 2,000 bar, 100 bar to 3,000 bar, 100 bar to 4,000 bar, 150 bar to 200 bar, 150 bar to 225 bar, 150 bar to 250 bar, 150 bar to 300 bar, 150 bar to 400 bar, 150 bar to 500 bar, 150 bar to 1,000 bar, 150 bar to 2,000 bar, 150 bar to 3,000 bar, 150 bar to 4,000 bar, 200 bar to 225 bar, 200 bar to 250 bar, 200 bar to 300 bar, 200 bar to 400 bar, 200 bar to 500 bar, 200 bar to 1,000 bar, 200 bar to 2,000 bar, 200 bar to 3,000 bar, 200 bar to 4,000 bar, 225 bar to 500 bar, 225 bar to 1,000 bar, 225 bar to 2,000 bar, 225 bar to 3,000 bar, 225 bar to 4,000 bar, 500 bar to 1,000 bar, 500 bar to 2,000 bar, 500 bar to 3,000 bar, 500 bar to 4,000 bar, 1,000 bar to 2,000 bar, 1,000 bar to 3,000 bar, 1,000 bar to 4,000 bar, 2,000 bar to 3,000 bar, 2,000 bar to 4,000 bar, or 3,000 bar to 4,000 bar, such as 20 bar to 225 bar. In some embodiments, the fluid is pressurized to about 20 bar, 50 bar, 100 bar, 150 bar, 200 bar, 225 bar, 250 bar, 300 bar, 400 bar, 500 bar, 1,000 bar, 2,000 bar, 3,000 bar, or about 4,000 bar. In some embodiments, the fluid is pressurized to at least 20 bar, 50 bar, 100 bar, 150 bar, 200 bar, 225 bar, 250 bar, 300 bar, 400 bar, 500 bar, 1,000 bar, 2,000 bar, 3,000 bar, or at least 4,000 bar, such as at least 20 bar. In some embodiments, the fluid is pressurized to at most 50 bar, 100 bar, 150 bar, 200 bar, 225 bar, 250 bar, 300 bar, 400 bar, 500 bar, 1,000 bar, 2,000 bar, 3,000 bar, or 4,000 bar, such as at most 225 bar. In some cases, air is purged from the system after the fluid is introduced to the system and prior to introduction of the forming pressure.

Methods and systems disclosed herein achieve a high degree of contact between the plate used to form a handpan shell and the mold 200 in which the handpan shell is formed (e.g., during hydroforming). A plate can be in contact with at least 90%, at least 95%, at least 96%, at least 97%, at least 98%, at least 99%, or at least 99.5% of the mold 200 or a portion of the mold's (e.g., substantially convex or concave) shaped surface (e.g., the portion of the mold 200 comprising a shape 220 complementary to one or more intonation feature, for example, that is out-of-plane with a deck 210 of the mold 200. In many cases, the plate is in contact with 100% of the mold's shaped surface 220 (e.g., the portion of the mold 200 comprising a shape complementary to one or more intonation feature, for example, that is out-of-plane with the deck 210 of the mold 200).

After hydroforming the handpan shell (e.g., the handpan top shell 110 or handpan bottom shell 120) in the mold 200, the handpan shell (e.g., the handpan top shell 110 or handpan bottom shell 120) can be removed from the mold 200. A handpan shell can be subject to deformation (e.g., due to material relaxation) after the pressure used to hydroform the handpan shell has been released. In some cases, a handpan shell can experience a deformation (e.g., linear deformation) of no more than 0.1 mm, no more than 0.2 mm, no more than 0.3 mm, no more than 0.4 mm, no more than 0.5 mm, no more than 0.6 mm, no more than 0.7 mm, no more than 0.8 mm, no more than 0.9 mm, no more than 1.0 mm, no more than 1.5 mm, or no more than 2.0 mm. A method of hydroforming a handpan shell can comprise a step for trimming the shell (e.g., the top shell 110 and/or the bottom shell 120), for example, to remove excess material. Optionally, the trimming is performed using a laser.

A method of forming a top shell 110 of a handpan 100 can comprise the steps of (a) providing a mold 200 having a mold shape 220 complementary to an intended shape of the top shell 110 of the handpan 100; (b) providing a plate (e.g., a metal plate) in proximity to the mold 200; (c) applying a pressurized fluid to a surface of the plate, thereby causing the plate to deform into the mold 200, until the plate has deformed into the intended shape (e.g., thereby forming the top shell 110 of the handpan 100); and, optionally, (d) removing the top shell 110 of the handpan 100 from the mold 200 (FIG. 12).

A method of forming a bottom shell 120 of a handpan 100 can comprise the steps of (a2) providing a mold 200 having a mold shape 220 complementary to an intended shape of the bottom shell 120 of the handpan 100; (b2) providing a plate (e.g., a metal plate) in proximity to the mold 200; (c2) applying a pressurized fluid to a surface of the plate, thereby causing the plate to deform into the mold 200, until the plate has deformed into the intended shape (e.g., thereby forming the bottom shell 120 of the handpan 100); (d2) removing the bottom shell 120 of the handpan 100 from the mold 200; and (e2) opening the port 125, optionally with a drill, lathe or laser.

A surface of the top shell 110 or the bottom shell 120 of a handpan 100 can comprise nitride, according to some embodiments. In some cases, methods of hydroforming a handpan shell (e.g., a top shell 110 and/or a bottom shell 120) can comprise subjecting the shell to a process for hardening the surface of the hydroformed shell (e.g., nitriding, carburizing, or austenitizing). In some cases, the process used for nitriding is gas nitriding.

In some cases, molded hydroforming of a handpan shell (e.g., steps (a) through (d)) can be completed in less than 1 day, less than 12 hours, less than 6 hours, less than 1 hour, less than 30 minutes, less than 15 minutes, less than 10 minutes, less than 9 minutes, less than 8 minutes, less than 7 minutes, less than 6 minutes, less than 5 minutes, less than 4 minutes, less than 3 minutes, less than 2 minutes, or less than 1 minute, to yield the handpan shell (e.g., top shell 110) having a plurality of intonation features. In some cases, the aforementioned process or a portion thereof (e.g., steps (b) to (d)) can be completed at least 5 times, at least 10 times, at least 15 times, at least 20 times, at least 25 times, at least 30 times, at least 40 times, at least 50 times, or at least 60 times within one hour.

In some cases, molded hydroforming of a handpan shell (e.g., steps (a2) through (d2)) can be completed in less than 1 day, less than 12 hours, less than 6 hours, less than 1 hour, less than 30 minutes, less than 15 minutes, less than 10 minutes, less than 9 minutes, less than 8 minutes, less than 7 minutes, less than 6 minutes, less than 5 minutes, less than 4 minutes, less than 3 minutes, less than 2 minutes, or less than 1 minute, to yield the handpan shell (e.g., top shell 110) having a plurality of intonation features. In some cases, the aforementioned process or a portion thereof (e.g., steps (b2) to (d2)) can be completed at least 5 times, at least 10 times, at least 15 times, at least 20 times, at least 25 times, at least 30 times, at least 40 times, at least 50 times, or at least 60 times within one hour.

In many embodiments, a handpan shell can be hydroformed in a mold 200 at room temperature. In some cases, the temperature of the process can be increased or decreased.

In some cases, fabricating a handpan shell by hydroforming with a mold 200 comprises tuning the intonation features of the shell after removing the shell from the mold 200. For example, a method disclosed herein can comprise tuning one or more notes (e.g., notes 150 and/or 160) of top shell 110 after removing the top shell from the mold 200 or after nitriding the top shell 110. In some cases, the notes on a handpan 100 are tuned to a musical scale. In some cases, a single mold 200 can be used to tune a handpan shell to one of a plurality of scales. For example, a handpan shell formed from 19-gauge 1008 cold rolled steel and having a 19⅞ inch diameter comprising 7 notes or 8 notes and a central note 150 can be tuned, for example, to scales that include those shown in Table 1.

TABLE 1

Exemplary Scales and Corresponding Frequencies Easily Achieved with a Single Handpan Hydroforming Mold

| Musical Notes of Scale | Frequencies of Scale |
|---|---|
| D3/A3, C4, D4, E4, F4, G4, A4 | 146.832 Hz/220 Hz, 261.626 Hz, 293.665 Hz, 311.127 Hz, 349.228 Hz, 391.995 Hz, 440 Hz |
| D3/A3, C#4, D4, E4, F#4, G4, A4 | 146.832 Hz/220 Hz, 271.18 Hz, 293.665 Hz, 311.127 Hz, 369.99 Hz, 391.995 Hz, 440 Hz |
| D3/A3, C4, D4, Eb4, F#4, G4, A4 | 146.832 Hz/220 Hz, 261.626 Hz, 293.665 Hz, 311.127 Hz, 369.99 Hz, 391.995 Hz, 440 Hz |
| Eb3/Bb3, Db4, Eb4, F4, Gb4, Ab4, Bb4 | 155.563 Hz/233.08 Hz, 271.18 Hz, 311.127 Hz, 349.228 Hz, 369.99 Hz, 440 Hz, 466.16 Hz |

TABLE 1-continued

| Exemplary Scales and Corresponding Frequencies Easily Achieved with a Single Handpan Hydroforming Mold | |
|---|---|
| Musical Notes of Scale | Frequencies of Scale |
| Eb3/Bb3, D4, Eb4, F4, G4, Ab4, Bb4 | 155.563 Hz/233.08 Hz, 293.665 Hz, 311.127 Hz, 349.228 Hz, 391.995 Hz, 440 Hz, 466.16 Hz |
| D3/A3, C4, D4, E4, F4, G4, A4, C5 | 146.832 Hz/220 Hz, 261.626 Hz, 293.665 Hz, 311.127 Hz, 349.228 Hz, 391.995 Hz, 523.251 Hz |
| D3/A3, Bb3, C4, D4, E4, F4, G4, A4 | 146.832 Hz/220 Hz, 233.08 Hz, 261.626 Hz, 293.665 Hz, 311.127 Hz, 349.228 Hz, 391.995 Hz, 440 Hz |

In some cases, a mold can be used to manufacture a handpan having a plurality of intonation features shaped to produce a plurality of the musical notes of a musical scale listed in Table 1, Table 2, or Table 3 (Table 2 is reproduced in FIG. 17A, FIG. 171B, FIG. 17C, and FIG. 17D, and Table 3 is reproduced in FIG. 18). Using the molded hydroforming process, it is possible to achieve any 7, 8, 9, or 10 note scales ranging from B2 (e.g., 123.47 Hz) up to F5 (739.99 Hz), for example, by varying the diameter of the handpan shell, the material used, the thickness of the material of the handpan (e.g., the initial thickness of a plate before a handpan hydroforming process), and/or the shape of the intonation features.

For example, Table 2 shows examples of different musical scales easily achieved in a handpan comprising 7 note fields arranged in a note ring (listed as the second, third, fourth, fifth, sixth, seventh, and eighth notes in each row of Table 2 and separated from one another by commas) and, optionally, one central note (listed as the first note in each row of Table 2 and separated from the other notes by a diagonal slash symbol ("/")), e.g., simply by changing the material of the handpan shell or the thickness of the material used to form the handpan shell. Sixteen examples of musical scales easily achieved using 1.00 mm thick 1008 cold rolled steel are listed first in Table 2, followed by eight examples of musical scales easily achieved using 1.00 mm thick stainless steel 430 hydroformed on the same handpan mold as the 1.00 mm thick 1008 cold rolled steel handpans. This illustrates that methods and systems described herein can increase the number and/or variety of musical scales that can be achieved using a single handpan mold, which can reduce the cost and complexity of manufacturing handpans, e.g., by reducing the number of molds that must be purchased to achieve the same range of musical scales in handpans and/or reducing the amount of preparation and/or resources needed to switch out a first mold capable of producing a first set of musical scales for a second mold that can be used to achieve a second set of musical scales. Also shown in Table 2 are examples of different musical scales easily achieved in a handpan comprising 7 note fields arranged in a note ring and, optionally, one central note, simply by changing the thickness of the material used to form the handpan shell. Eight examples of musical scales easily achieved using 1.00 mm thick stainless steel 430, three examples of musical scales easily achieved using 1.15 mm thick stainless steel 430, and four examples of musical scales easily achieved using 1.25 mm thick stainless steel 430, all of which can be hydroformed on the same handpan mold (e.g., wherein, in some embodiments, the handpan mold lacks a feature capable of forming a central note in a shell), are listed in Table 2. This further illustrates methods and systems for increasing the variety of musical scales easily achieved using a single handpan mold, as described herein, which can reduce the cost and complexity of manufacturing handpans. Altering the thickness of the material to achieve different (e.g., additional) musical scales in handpans created from a single mold and a single material in this manner can yield similar results using other materials (e.g., 0.90 mm thick 1008 cold rolled steel, 0.95 mm thick 1008 cold rolled steel, 1.00 mm thick 1008 cold rolled steel, 1.05 mm thick 1008 cold rolled steel, 1.10 mm thick 1008 cold rolled steel, 1.15 mm thick 1008 cold rolled steel, or 1.25 mm thick 1008 cold rolled steel).

TABLE 2

| Effects of Material and Material Thickness on Frequencies Easily Achieved with a Single Handpan Hydroforming Mold | |
|---|---|
| Musical Notes of Example Scale | Frequencies of Example Scale |
| 1.00 mm 1008 Cold Rolled Steel | |
| C#3/G#3, B3, C#4, D#4, E4, F#4, G#4 | 138.59 Hz/207.65 Hz, 246.94 Hz, 277.18 Hz, 311.13 Hz, 329.63 Hz, 369.99 Hz, 415.3 Hz |
| C#3/G#3, A3, C#4, D#4, E4, F#4, G#4 | 138.59 Hz/207.65 Hz, 220 Hz, 277.18 Hz, 311.13 Hz, 329.63 Hz, 369.99 Hz, 415.3 Hz |
| C#3/G#3, B3, C#4, D#4, E4, G#4, A4 | 138.59 Hz/207.65 Hz, 246.94 Hz, 277.18 Hz, 311.13 Hz, 329.63 Hz, 415.30 Hz, 440 Hz |
| D3/A3, C#4,D4, E4, F#4, G4, A4 | 146.83 Hz/220 Hz, 277.18 Hz, 293.66 Hz, 329.63 Hz, 369.99 Hz, 392 Hz, 440 Hz |
| D3/A3, B3, D4, E4, F#4, G4, A4 | 146.83 Hz/220 Hz, 246.94 Hz, 293.66 Hz, 329.63 Hz, 369.99 Hz, 392 Hz, 440 Hz |
| D3/A3, C4, D4, E4, F#4, G4, A4 | 146.83 Hz/220 Hz, 261.63 Hz, 293.66 Hz, 329.63 Hz, 369.99 Hz, 392 Hz, 440 Hz |
| D3/A3, B3, C#4, D4, E4, F#4, A4 | 146.83 Hz/220 Hz, 246.94 Hz, 277.18 Hz, 293.66 Hz, 329.63 Hz, 369.99 Hz, 440 Hz |
| D3/A3, C4, D4, E4, F4, G4, A4 | 146.83 Hz/220 Hz, 261.63 Hz, 293.66 Hz, 329.63 Hz, 349.23 Hz, 392 Hz, 440 Hz |

TABLE 2-continued

Effects of Material and Material Thickness on Frequencies Easily Achieved with a Single Handpan Hydroforming Mold

| Musical Notes of Example Scale | Frequencies of Example Scale |
|---|---|
| D3/A3, Bb3, D4, E4, F4, G4, A4 | 146.83 Hz/220 Hz, 233.08 Hz, 293.66 Hz, 329.63 Hz, 349.23 Hz, 392 Hz, 440 Hz |
| D3/A3, Bb3, D4, E4, F4, A4, C5 | 146.83 Hz/220 Hz, 233.08 Hz, 293.66 Hz, 329.63 Hz, 349.23 Hz, 440 Hz, 523.25 Hz |
| D3/A3, C4, D4, E4, F4, A4, Bb4 | 146.83 Hz/220 Hz, 261.63 Hz, 293.66 Hz, 329.63 Hz, 349.23 Hz, 440 Hz, 466.16 Hz |
| D3/A3, C4, D4, E4, F4, A4, C5 | 146.83 Hz/220 Hz, 261.63 Hz, 293.66 Hz, 329.63 Hz, 349.23 Hz, 440 Hz, 523.25 Hz |
| D3/A3, C4, D4, F4, G4, A4, C5 | 146.83 Hz/220 Hz, 261.63 Hz, 293.66 Hz, 349.23 Hz, 392 Hz, 440 Hz, 523.25 Hz |
| D3/A3, C4, D4, Eb4, F#4, G4, A4 | 146.83 Hz/220 Hz, 261.63 Hz, 293.66 Hz, 311.13 Hz, 369.99 Hz, 392 Hz, 440 Hz |
| D3/A3, Bb3, D4, Eb4, F#4, G4, A4 | 146.83 Hz/220 Hz, 233.08 Hz, 293.66 Hz, 311.13 Hz, 369.99 Hz, 392 Hz, 440 Hz |
| Eb3/Bb3, C4, Eb4, F4, G4, Ab4, Bb4 | 155.56 Hz/233.08 Hz, 261.63 Hz, 311.13 Hz, 349.23 Hz, 392 Hz, 415.30 Hz, 466.16 Hz |
| | 1.00 mm Thickness Stainless Steel 430 |
| C3/G3, A3, C4, D4, E4, F4, G4 | 130.81 Hz/196 Hz, 220 Hz, 261.63 Hz, 293.66 Hz, 329.63 Hz, 349.23 Hz, 392 Hz |
| C#3/G#3, A#3, C#4, D#4, F4, F#4, G#4 | 138.59 Hz/207.65 Hz, 233.08 Hz, 277.18 Hz, 311.13 Hz, 349.23 Hz, 369.99 Hz, 415.30 Hz |
| C#3/G#3, C4, C#4, D#4, F4, F#4, G#4 | 138.59 Hz/207.65 Hz, 261.63 Hz, 277.18 Hz, 311.13 Hz, 349.23 Hz, 369.99 Hz, 415.30 Hz |
| C3/G3, B3, C4, D4, E4, F4, G4 | 130.81 Hz/196 Hz, 246.94 Hz, 261.63 Hz, 293.66 Hz, 329.63 Hz, 349.23 Hz, 392 Hz |
| C#3/G#3, C4, C#4, D#4, F4, F#4, G#4 | 138.59 Hz/207.65 Hz, 261.63 Hz, 277.18 Hz, 311.13 Hz, 349.23 Hz, 369.99 Hz, 415.30 Hz |
| C#3/G#3, B3, C#4, D#4, E4, F#4, G#4 | 138.59 Hz/207.65 Hz, 246.94 Hz, 277.18 Hz, 311.13 Hz, 329.63 Hz, 369.99 Hz, 415.30 Hz |
| C#3/G#3, A3, C#4, D#4, E4, F#4, G#4 | 138.59 Hz/207.65 Hz, 220 Hz, 277.18 Hz, 311.13 Hz, 329.63 Hz, 369.99 Hz, 415.30 Hz |
| C#3/G#3, B3, C#4, D#4, E4, G#4, A4 | 138.59 Hz/207.65 Hz, 246.94 Hz, 277.18 Hz, 311.13 Hz, 329.63 Hz, 415.30 Hz, 440 Hz |
| | 1.15 mm Thickness Stainless Steel 430 |
| Eb3/Bb3, C4, D4, Eb4, F4, G4, Bb4 | 155.56 Hz/233.08 Hz, 261.63 Hz, 293.66 Hz, 311.13 Hz, 349.23 Hz, 392 Hz, 466.16 Hz |
| Eb3/Bb3, B3, Db4, Eb4, F4, Gb4, Bb4 | 155.56 Hz/233.08 Hz, 246.94 Hz, 277.18 Hz, 311.13 Hz, 349.23 Hz, 369.99 Hz, 466.16 Hz |
| Eb3/Bb3, B3, D4, Eb4, F4, Gb4, Bb4 | 155.56 Hz/233.08 Hz, 246.94 Hz, 293.66 Hz, 311.13 Hz, 349.23 Hz, 369.99 Hz, 466.16 Hz |
| | 1.25 mm Thickness Stainless Steel 430 |
| F#3/C#4, D#4, F4, F#4, G#4, A#4, C#5 | 185 Hz/277.18 Hz, 311.13 Hz, 349.23 Hz, 369.99 Hz, 415.30 Hz, 466.16 Hz, 554.37 Hz |
| F#3/C#4, D4, E4, F#4, G#4, A4, C#5 | 185 Hz/277.18 Hz, 293.66 Hz, 329.63 Hz, 369.99 Hz, 415.30 Hz, 440 Hz, 554.37 Hz |
| F#3/A3, C#4, E4, F#4, G#4, A4, C#5 | 185 Hz/220 Hz, 277.18 Hz, 329.63 Hz, 369.99 Hz, 415.30 Hz, 440 Hz, 554.37 Hz |
| F#3/C#4, D4, F4, F#4, G#4, A4, C#5 | 185 Hz/277.18 Hz, 293.66 Hz, 349.23 Hz, 369.99 Hz, 415.30 Hz, 440 Hz, 554.37 Hz |

In some cases, a handpan mold can comprise one or more features (e.g., a plurality of features) shaped to produce a handpan or portion thereof (e.g., handpan shell) having one or more notes (e.g., note fields), wherein the one or more notes are shaped to produce one or more musical notes of a scale listed in Table 1, Table 2, or Table 3. For example, a handpan comprising 8 notes (e.g., in a note ring of the handpan), optionally including one or more additional notes (e.g., a central note and/or one or more additional notes, for example, which may be outside of a note ring), can be formed in any of the musical scales listed in Table 3 using methods and systems disclosed herein (e.g., using 1008 cold-rolled steel having a thickness of 1.00 mm). In some embodiments, a handpan can be formed using methods and/or systems disclosed herein to include the final 8 musical notes of any scale group listed in Table 3, for example, wherein the handpan comprises 8 note fields in a note ring of the handpan shaped to produce the final 8 musical notes (e.g., which are separated by commas in Table 3) of a scale group listed in Table 3. Optionally, the handpan can also comprise one or more additional notes not in the note ring, e.g., a central note shaped to produce the first musical note listed in the same scale group listed in Table 3 (e.g., which is shown in Table 3 as separated from the other notes of the scale group by a diagonal slash symbol ("/")) as the notes in the note ring.

For example, a handpan mold can comprise a plurality of features (e.g., arranged in a note ring), wherein the features are shaped such that a handpan top shell produced from the mold will comprise intonation features (e.g., arranged in a note ring) according to some or all of the second, third, fourth, fifth, sixth, seventh, and eighth musical notes listed in a scale group of Table 3 (e.g., Scale Group 1D of Table 3, in which the second, third, fourth, fifth, sixth, seventh, and eighth musical notes A3, C4, D4, E4, F4, G4, A4, and Bb4). The handpan mold can also comprise a feature (e.g., positioned on the handpan mold as a central note) shaped such that the handpan top shell produced from the mold will comprise an intonation feature (e.g., positioned on the handpan shell as a central note) according to the first musical note listed in a scale group of Table 3 (e.g., the same scale group as the notes of the note ring, for example, musical note A2 in scale 1D of Table 3).

TABLE 3

Additional Scales and Corresponding Frequencies Easily Achieved with a Single Handpan Hydroforming Mold

| Scale Group | Musical Notes of General Scale | Musical Notes of Example Scale | Frequencies of Example Scale |
|---|---|---|---|
| 1A | G#/G#, A, C#, D, F, F#, G#, C# | G#2/G#3, A3, C#4, D4, F4, F#4, G#4, C#5 | 103.825 Hz/207.65 Hz, 220 Hz, 277.18 Hz, 293.66 Hz, 349.23 Hz, 369.99 Hz, 415.30 Hz, 554.37 Hz |
| 1B | G#/G#, B, C#, D#, E, F#, G#, C# | G#2/G#3, B3, C#4, D#4, E4, F#4, G#4, C#5 | 103.825 Hz/207.65 Hz, 246.94 Hz, 277.18 Hz, 311.13 Hz, 329.63 Hz, 369.99 Hz, 415.30 Hz, 554.37 Hz |
| 1C | G#/G#, C, C#, D#, F, F#, G#, C# | G#2/G#3, C4, C#4, D#4, F4, F#4, G#4, C#5 | 103.825 Hz/207.65 Hz, 261.63 Hz, 277.18 Hz, 311.13 Hz, 349.23 Hz, 369.99 Hz, 415.30 Hz, 554.37 Hz |
| 1D | A/A, C, D, E, F, G, A, Bb | A2/A3, C4, D4, E4, F4, G4, A4, Bb4 | 110 Hz/220 Hz, 261.63 Hz, 293.66 Hz, 329.63 Hz, 349.23 Hz, 392 Hz, 440 Hz, 466.16 Hz |
| 1E | A/A, C, D, E, F, G, A, C | A2/A3, C4, D4, E4, F4, G4, A4, C5 | 110 Hz/220 Hz, 261.63 Hz, 293.66 Hz, 329.63 Hz, 349.23 Hz, 392 Hz, 440 Hz, 523.25 Hz |
| 1F | A/A, Bb, D, E, F, G, A, C | A2/A3, Bb3, D4, E4, F4, G4, A4, C5 | 110 Hz/220 Hz, 233.08 Hz, 293.66 Hz, 329.63 Hz, 349.23 Hz, 392 Hz, 440 Hz, 523.25 Hz |
| 1G | A/A, Bb, D, Eb, F#, G, A, Bb | A2/A3, Bb3, D4, Eb4, F#4, G4, A4, Bb5 | 110 Hz/220 Hz, 233.08 Hz, 293.66 Hz, 311.13 Hz, 369.99 Hz, 392 Hz, 440 Hz, 932.33 Hz |
| 1H | A/A, Bb, D, Eb, F, G, A, Bb | A2/A3, Bb3, D4, Eb4, F4, G4, A4, Bb5 | 110 Hz/220 Hz, 233.08 Hz, 293.66 Hz, 311.13 Hz, 349.23 Hz, 392 Hz, 440 Hz, 932.33 Hz |
| 1-I | A/, A, C, D, Eb, F#, G, A, C | A2/, A3, C4, D4, Eb4, F#4, G4, A4, C5 | 110 Hz/220 Hz, 261.63 Hz, 293.66 Hz, 311.13 Hz, 369.99 Hz, 392 Hz, 440 Hz, 523.25 Hz |
| 1J | A/, A, C#, D, E, F#, G, A, C# | A2/, A3, C#4, D4, E4, F#4, G4, A4, C#5 | 110 Hz/220 Hz, 277.18 Hz, 293.66 Hz, 329.63 Hz, 369.99 Hz, 392 Hz, 440 Hz, 554.37 Hz |
| 2A | C#/G#, A, C#, D, F, F#, G#, C# | C#3/G#3, A3, C#4, D4, F4, F#4, G#4, C#5 | 138.59 Hz/207.65 Hz, 220 Hz, 277.18 Hz, 293.66 Hz, 349.23 Hz, 369.99 Hz, 415.3 Hz, 554.37 Hz |
| 2B | C#/G#, B, C#, D#, E, F#, G#, C# | C#3/G#3, B3, C#4, D#4, E4, F#4, G#4, C#5 | 138.59 Hz/207.65 Hz, 246.94 Hz, 277.18 Hz, 311.13 Hz, 329.63 Hz, 369.99 Hz, 415.3 Hz, 554.37 Hz |
| 2C | C#/G#, C, C#, D#, F, F#, G#, C# | C#3/G#3, C4, C#4, D#4, F4, F#4, G#4, C#5 | 138.59 Hz/207.65 Hz, 261.63 Hz, 277.18 Hz, 311.13 Hz, 349.23 Hz, 369.99 Hz, 415.3 Hz, 554.37 Hz |
| 2D | D/A, C, D, E, F, G, A, Bb | D3/A3, C4, D4, E4, F4, G4, A4, Bb4 | 146.83 Hz/220 Hz, 261.63 Hz, 293.66 Hz, 329.63 Hz, 349.23 Hz, 392 Hz, 440 Hz, 466.16 Hz |
| 2E | D/A, C, D, E, F, G, A, C | D3/A3, C4, D4, E4, F4, G4, A4, C5 | 146.83 Hz/220 Hz, 261.63 Hz, 293.66 Hz, 329.23 Hz, 349.23 Hz, 392 Hz, 440 Hz, 523.25 Hz |
| 2F | D/A, Bb, D, E, F, G, A, C | D3/A3, Bb3, D4, E4, F4, G4, A4, C5 | 146.83 Hz/220 Hz, 233.08 Hz, 293.66 Hz, 329.63 Hz, 349.23 Hz, 392 Hz, 440 Hz, 523.25 Hz |
| 2G | D/A, Bb, D, Eb, F#, G, A, C | D3/A3, Bb3, D4,Eb4, F#4, G4, A4, C5 | 146.83 Hz/220 Hz, 233.08 Hz, 293.66 Hz, 311.13 Hz, 369.99 Hz, 392 Hz, 440 Hz, 523.25 Hz |
| 2H | D/A, Bb, D, Eb, F, G, A, C | D3/A3, Bb3, D4, Eb4, F4, G4, A4, C5 | 146.83 Hz/220 Hz, 233.08 Hz, 293.66 Hz, 311.13 Hz, 349.23 Hz, 392 Hz, 440 Hz, 523.25 Hz |
| 2-I | D/A, C, D, Eb, F#, G, A, C | D3/A3, C4, D4, Eb4, F#4, G4, A4, C5 | 146.83 Hz/220 Hz, 261.63 Hz, 293.66 Hz, 311.13 Hz, 369.99 Hz, 392 Hz, 440 Hz, 523.25 Hz |
| 2J | D/A, C, D, E, F#, G, A, C# | D3/A3, C#4, D4, E4, F#4, G4, A4, C#5 | 146.83 Hz/220 Hz, 277.18 Hz, 293.66 Hz, 329.63 Hz, 369.99 Hz, 392 Hz, 440 Hz, 554.37 Hz |
| 2K | Eb/Bb, Db, Eb, F, Gb, Ab, Bb, Db | Eb3/Bb3, Db4, Eb4, F4, Gb4, Ab4, Bb4, Db5 | 155.56 Hz/233.08 Hz, 277.18 Hz, 311.13 Hz, 349.23 Hz, 369.99 Hz, 415.30 Hz, 466.16 Hz, 554.37 Hz |
| 3A | Eb/Ab , Bb , Db , Eb, F, Gb, Ab, Bb | Eb3/Ab3, Bb3, Db4, Eb4, F4, Gb4, Ab4, Bb4 | 155.56 Hz/207.65 Hz, 233.08 Hz, 277.18 Hz, 311.13 Hz, 349.23 Hz, 369.99 Hz, 415.30 Hz, 466.16 Hz |

TABLE 3-continued

Additional Scales and Corresponding Frequencies Easily Achieved with a Single Handpan Hydroforming Mold

| Scale Group | Musical Notes of General Scale | Musical Notes of Example Scale | Frequencies of Example Scale |
|---|---|---|---|
| 3B | Eb/Ab, Bb, Db, Eb, Gb, Ab, Bb, Db | Eb3/Ab3, Bb3, Db4, Eb4, Gb4, Ab4, Bb4, Db5 | 155.56 Hz/207.65 Hz, 233.08 Hz, 277.18 Hz, 311.13 Hz, 349.23 Hz, 369.99 Hz, 415.30 Hz, 466.16 Hz |
| 3C | Eb/Bb, B, Db, Eb, F, Gb, Ab, Bb | Eb3/Bb3, B3, Db4, Eb4, F4, Gb4, Ab4, Bb4 | 155.56 Hz/233.08 Hz, 246.94 Hz, 277.18 Hz, 311.13 Hz, 349.23 Hz, 369.99 Hz, 415.30 Hz, 466.16 Hz |
| 3D | Eb/Bb, B, D, Eb, F, Gb, Ab, Bb | Eb3/Bb3, B3, D4, Eb4, F4, Gb4, Ab4, Bb4 | 155.56 Hz/233.08 Hz, 246.94 Hz, 293.66 Hz, 311.13 Hz, 349.23 Hz, 369.99 Hz, 415.30 Hz, 466.16 Hz |
| 3E | Eb/Bb, B, Db, Eb, E, G, Ab, Bb | Eb3/Bb3, B3, Db4, Eb4, E4, G4, Ab4, Bb4 | 155.56 Hz/233.08 Hz, 246.94 Hz, 277.18 Hz, 311.13 Hz, 329.63 Hz, 392 Hz, 415.30 Hz, 466.16 Hz |
| 3F | Eb/Bb, B, Db, Eb, F, Gb, Bb, Db | Eb3/Bb3, B3, Db4, Eb4, F4, Gb4, Bb4, Db5 | 155.56 Hz/233.08 Hz, 246.94 Hz, 277.18 Hz, 311.13 Hz, 349.23 Hz, 369.99 Hz, 466.16 Hz, 554.37 Hz |
| 3G | Eb/Ab, Bb, B, Eb, F, Gb, Ab, Bb | Eb3/Ab3, Bb3, B3, Eb4, F4, Gb4, Ab4, Bb4 | 155.56 Hz/207.65 Hz, 233.08 Hz, 246.94 Hz, 311.13 Hz, 349.23 Hz, 369.99 Hz, 415.30 Hz, 466.16 Hz |
| 3H | F/Bb, C, Db, F, G, Ab, Bb, C | F3/Bb3, C4, Db4, F4, G4, Ab4, Bb4, C5 | 174.61 Hz/233.08 Hz, 261.63 Hz, 277.18 Hz, 349.23 Hz, 392 Hz, 415.30 Hz, 466.16 Hz, 523.25 Hz |
| 3-I | F/Bb, C, Db, F, Gb, Ab, Bb, C | F3/Bb3, C4, Db4, F4, Gb4, Ab4, Bb4, C5 | 174.61 Hz/233.08 Hz, 261.63 Hz, 277.18 Hz, 349.23 Hz, 369.99 Hz, 415.30 Hz, 466.16 Hz, 523.25 Hz |
| 3J | F/Bb, C, Eb, F, G, Ab, Bb, C | F3/Bb3, C4, Eb4, F4, G4, Ab4, Bb4, C5 | 174.61 Hz/233.08 Hz, 261.63 Hz, 311.13 Hz, 349.23 Hz, 392 Hz, 415.30 Hz, 466.16 Hz, 523.25 Hz |
| 3K | F/Bb, C, E, F, G, A, Bb, C | F3/Bb3, C4, E4, F4,G4, A4, Bb4, C5 | 174.61 Hz/233.08 Hz, 261.63 Hz, 329.63 Hz, 349.23 Hz, 392 Hz, 440 Hz, 466.16 Hz, 523.25 Hz |
| 4A | Eb/Ab, Bb, C, D, Eb, F, G, Bb | Eb3/Ab3, Bb3, C4,D4, Eb4, F4, G4, Bb4 | 155.56 Hz/207.65 Hz, 233.08 Hz, 261.63 Hz, 293.66 Hz, 311.13 Hz, 349.23 Hz, 392 Hz, 466.16 Hz |
| 4B | F/A, C, D, E, F, G, A, C | F3/A3, C4, D4, E4, F4, G4, A4, C5 | 174.61 Hz/220 Hz, 261.63 Hz, 293.66 Hz, 329.63 Hz, 349.23 Hz, 392 Hz, 440 Hz, 523.25 Hz |
| 4C | F/A, Bb, C, E, F, A, Bb, C | F3/A3, Bb3, C4, E4, F4, A4, Bb4, C5 | 174.61 Hz/220 Hz, 233.08 Hz, 261.63 Hz, 329.63 Hz, 349.23 Hz, 440 Hz, 466.16 Hz, 523.25 Hz |
| 4D | F/Bb, B, D, Eb, F, Gb, Ab, Bb | F3/Bb3, B3, D4, Eb4, F4, Gb4, Ab4, Bb4 | 174.61 Hz/233.08 Hz, 246.94 Hz, 293.66 Hz, 311.13 Hz, 349.23 Hz, 369.99 Hz, 415.30 Hz, 466.16 Hz |
| 4E | F/Bb, B, Db, Eb, F, Gb, Ab, Bb | F3/Bb3, B3, Db4, Eb4, F4, Gb4, Ab4, Bb4 | 174.61 Hz/233.08 Hz, 246.94 Hz, 277.18 Hz, 311.13 Hz, 349.23 Hz, 369.99 Hz, 415.30 Hz, 466.16 Hz |
| 4F | F/Bb, C, Db, Eb, F, Gb, Ab, Bb | F3/Bb3, C4, Db4, Eb4, F4, Gb4, Ab, Bb4 | 174.61 Hz/233.08 Hz, 261.63 Hz, 277.18 Hz, 311.13 Hz, 349.23 Hz, 369.99 Hz, 415.30 Hz, 466.16 Hz |
| 4G | F/Bb, C, Db, Eb, F, G, Ab, Bb | F3/Bb3, C4, Db4, Eb4, F4, G4, Ab4, Bb4 | 174.61 Hz/233.08 Hz, 261.63 Hz, 277.18 Hz, 311.13 Hz, 349.23 Hz, 392 Hz, 415.3 Hz, 466.16 Hz |
| 4H | F/Bb, C, D, Eb, F, G, Ab, Bb | F3/Bb3, C4, D4, Eb4, F4, G4, Ab4, Bb4 | 174.61 Hz/233.08 Hz, 261.63 Hz, 293.66 Hz, 311.13 Hz, 349.23 Hz, 392 Hz, 415.3 Hz, 466.16 Hz |
| 4-I | F/Bb, C, Db, E, F, G, Ab, Bb | F3/Bb3, C4, Db4, E4, F4, G4, Ab4, Bb4 | 174.61 Hz/233.08 Hz, 261.63 Hz, 277.18 Hz, 329.63 Hz, 349.23 Hz, 392 Hz, 415.3 Hz, 466.16 Hz |
| 4J | F/Bb, C, D, E, F, G, A, C | F3/Bb3, C4, D4, E4, F4, G4, A4, C5 | 174.61 Hz/233.08 Hz, 261.63 Hz, 293.66 Hz, 329.63 Hz, 349.23 Hz, 392 Hz, 440 Hz, 523.25 Hz |
| 4K | F/Bb, C, Db, E, F, G, Ab, C | F3/Bb3, C4, Db4, E4, F4, G4, Ab4, C5 | 174.61 Hz/233.08 Hz, 261.63 Hz, 277.18 Hz, 329.63 Hz, 349.23 Hz, 392 Hz, 415.30 Hz, 523.25 Hz |
| 5A | F/Bb, C, Db, Eb, F, G, Ab, C | F3/Bb3, C4, Db4, Eb4, F4, G4, Ab4, C5 | 174.61 Hz/233.08 Hz, 261.63 Hz, 277.18 Hz, 311.13 Hz, 349.23 Hz, 392 Hz, 415.30 Hz, 523.25 Hz |
| 5B | F/Bb, C, Db, Eb, F, Gb, Bb, C | F3/Bb3, C4, Db4, Eb4, F4, Gb4, Bb4, C5 | 174.61 Hz/233.08 Hz, 261.63 Hz, 277.18 Hz, 311.13 Hz, 349.23 Hz, 369.99 Hz, 466.16 Hz, 523.25 Hz |
| 5C | F/Ab, C, Db, Eb, F, G, Ab, C | F3/Ab3, C4, Db4, Eb4, F4, G4, Ab4, C5 | 174.61 Hz/207.65 Hz, 261.63 Hz, 277.18 Hz, 311.13 Hz, 349.23 Hz, 392 Hz, 415.30 Hz, 523.25 Hz |

TABLE 3-continued

Additional Scales and Corresponding Frequencies Easily Achieved with a Single Handpan Hydroforming Mold

| Scale Group | Musical Notes of General Scale | Musical Notes of Example Scale | Frequencies of Example Scale |
|---|---|---|---|
| 5D | F/Ab, C, D, Eb, F, G, Ab, C | F3/Ab3, C4, D4, Eb4, F4, G4, Ab4, C5 | 174.61 Hz/207.65 Hz, 261.63 Hz, 293.66 Hz, 311.13 Hz, 349.23 Hz, 392 Hz, 415.30 Hz, 523.25 Hz |
| 5E | F/Ab, C, Db, E, F, G, Ab, C | F3/Ab3, C4, Db4, E4, F4, G4, Ab4, C5 | 174.61 Hz/207.65 Hz, 261.63 Hz, 277.18 Hz, 329.63 Hz, 349.23 Hz, 392 Hz, 415.30 Hz, 523.25 Hz |
| 5F | F#/G#, A, C#, E, F#, G#, A, C# | F#3/G#3, A3, C#4, E4, F#4, G#4, A4, C#5 | 185 Hz/207.65 Hz, 220 Hz, 277.18 Hz, 329.63 Hz, 369.99 Hz, 415.30 Hz, 440 Hz, 554.37 Hz |
| 5G | F#/A#, C#, D#, F, F#, G#, A#, C# | F#3/A#3, C#4, D#4, F4, F#4, G#4, A#4, C#5 | 185 Hz/233.08 Hz, 277.18 Hz, 311.13 Hz, 349.23 Hz, 369.99 Hz, 415.30 Hz, 466.16 Hz, 554.37 Hz |
| 5H | F#/A, C#, D, E, F#, G#, A, C# | F#3/A3, C#4, D4, E4, F#4, G#4, A4, C#5 | 185 Hz/220 Hz, 277.18 Hz, 293.66 Hz, 329.63 Hz, 369.99 Hz, 415.30 Hz, 440 Hz, 554.37 Hz |
| 5-I | F#/A, C#, D#, E, F#, G#, A, C# | F#3/A3, C#4, D#4, E4, F#4, G#4, A4, C#5 | 185 Hz/220 Hz, 277.18 Hz, 311.13 Hz, 329.63 Hz, 369.99 Hz, 415.30 Hz, 440 Hz, 554.37 Hz |
| 5J | F#/A, C#, D, F, F#, G#, A, C# | F#3/A3, C#4, D4, F4, F#4, G#4, A4, C#5 | 185 Hz/220 Hz, 277.18 Hz, 293.66 Hz, 349.23 Hz, 369.99 Hz, 415.30 Hz, 440 Hz, 554.37 Hz |
| 6 | F#/G#, A#, C#, D#, F, F#, A#, C# | F#3/G#3, A#3, C#4, D#4, F4, F#4, A#4, C#5 | 185 Hz, 207.65 Hz, 233.08 Hz, 277.18 Hz, 311.13 Hz, 349.23 Hz, 349.23 Hz, 466.16 Hz, 554.37 Hz |

In some cases, one or more intonation features of a handpan produced from a mold (e.g., using a method or system described herein) can be tuned up 1 musical half-step, 2 musical half-steps, or more than 2 musical half-steps or can be tuned down 1 musical half-step, 2 musical half-steps, or more than 2 musical half-steps (e.g., manually tuned, for example, using an air hammer, mallet, or similar technique) after the handpan shell has been hydroformed using the mold. In doing so, the range and variety of musical scales for handpans created with a given handpan mold can be greatly increased. For instance, a handpan mold comprising features shaped to produce a first set of intonation features in a first handpan shell created therefrom (e.g., a set of intonation features that are shaped to produce the musical notes of scale group 5A of Table 3) can also be used to produce a handpan shell comprising a second set of intonation features in a second handpan shell created from the same mold, for instance, by manually tuning one or more intonation features of the second handpan shell after hydroforming (e.g., wherein the final set of intonation features of the second handpan shell after manual tuning are shaped to produce the musical notes of scale group 5B of Table 3, which comprises the same musical notes of group 5A except for the third-to-last and second-to-last notes listed in Table 3 (Gb and Bb, respectively, in group 5B), which may be tuned one half-step down and two half-steps up, respectively, from the shapes of the intonation features produced from hydroforming the shell in the mold). As such, some embodiments of the present disclosure do not require a different handpan mold be used to produce handpans shaped to produce each individual desired musical scale. Rather, in some cases, one or more intonation features of a handpan shell produced using methods and system described herein can be adjusted after hydroforming (e.g., via manual tuning) to produce a different set of musical notes or a different musical scale, which can reduce production costs and technical complexity associated with switching from a first production run (e.g., which may involve the use of a first mold to produce a handpan shell capable of producing a first set of musical notes) to another production run (e.g., which may involve the use of a different, second mold to produce a handpan shell capable of producing a second set of musical notes).

In some cases, the features of a handpan mold can be shaped to produce intonation features in a hydroformed handpan shell that do not correspond to a cohesive musical scale (e.g., the cohesive scales shown in Table 1, Table 2, or Table 3). For instance, features of a handpan mold may be shaped to produce intonation features in a hydroformed handpan shell that are convenient to be manually tuned into one or more final musical scales, in some embodiments. For example, a handpan mold may comprise features shaped to produce intonation features in a handpan shell that correspond to a "nonsense" scale (e.g., wherein the hydroformed handpan shell comprises 8 intonation features positioned in a note ring and shaped to produce the musical notes: A3, B3, C♯4, D♯4, F4, G4, Ab4, and B4). Such a "nonsense" scale can be tuned (e.g., by manual tuning one or more of the intonation features of the handpan shell after hydroforming the shell using the mold) to a first musical scale (e.g., comprising the musical notes A3, C4, D4, Eb4, F♯4, G4, A4, and C5, which are each within two half-steps of the "nonsense" scale musical notes), a second musical scale (e.g., comprising the musical notes A3, Bb3, C4, E4, F4, A4, Bb4, and C5, which are each within two half-steps of the "nonsense" scale musical notes), or optionally one or more additional musical scales. In some cases, this can preserve benefits of reduced effort to tune the handpan (e.g., relative to non-hydroformed shells) while avoiding the need to utilize individual molds to produce handpans having each desired musical scale.

Figure 13:
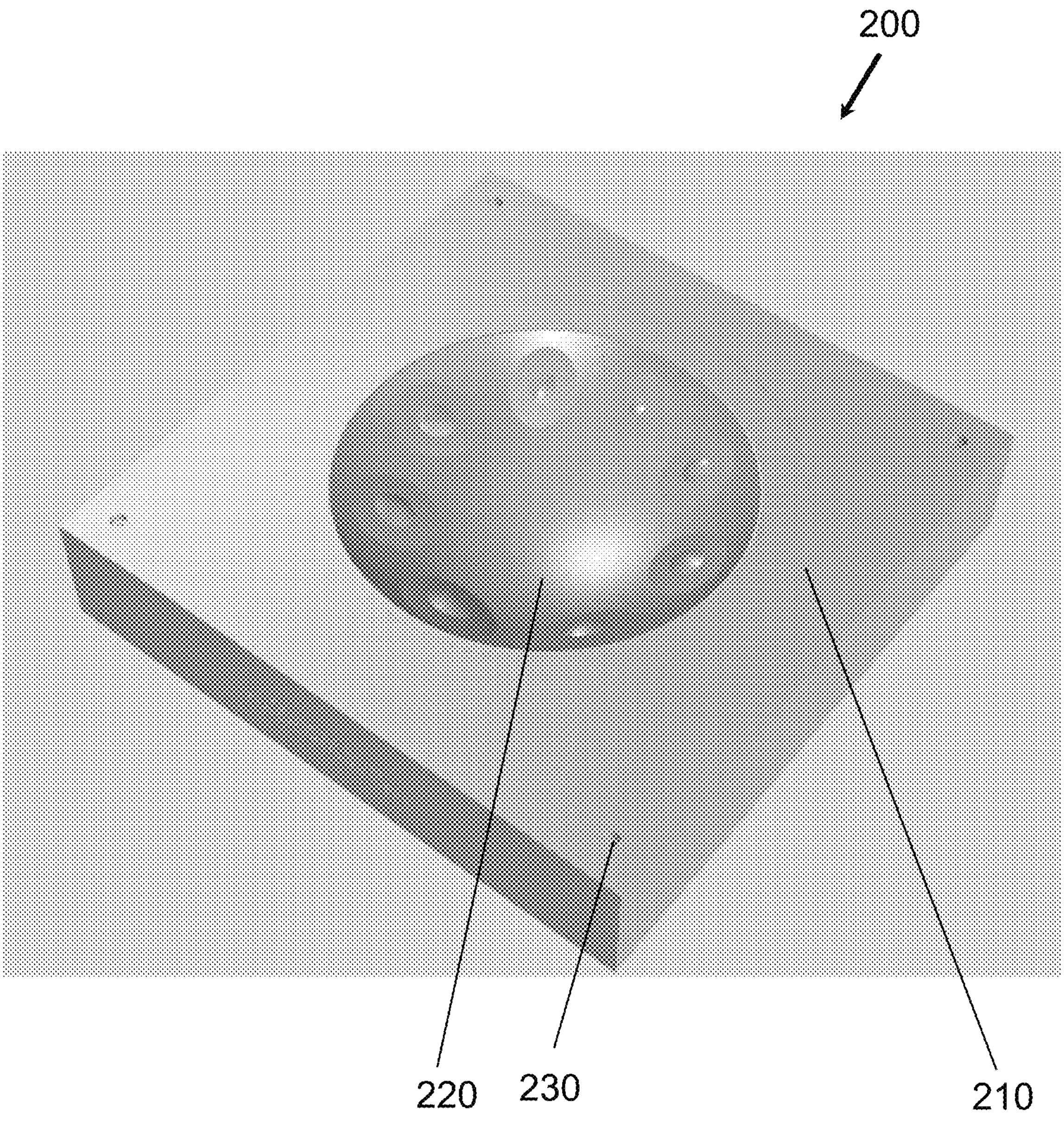
FIG. 13 shows a schematic of a handpan mold comprising eight notes in a note ring and lacking a central note, according to embodiments herein.
Figure 14:
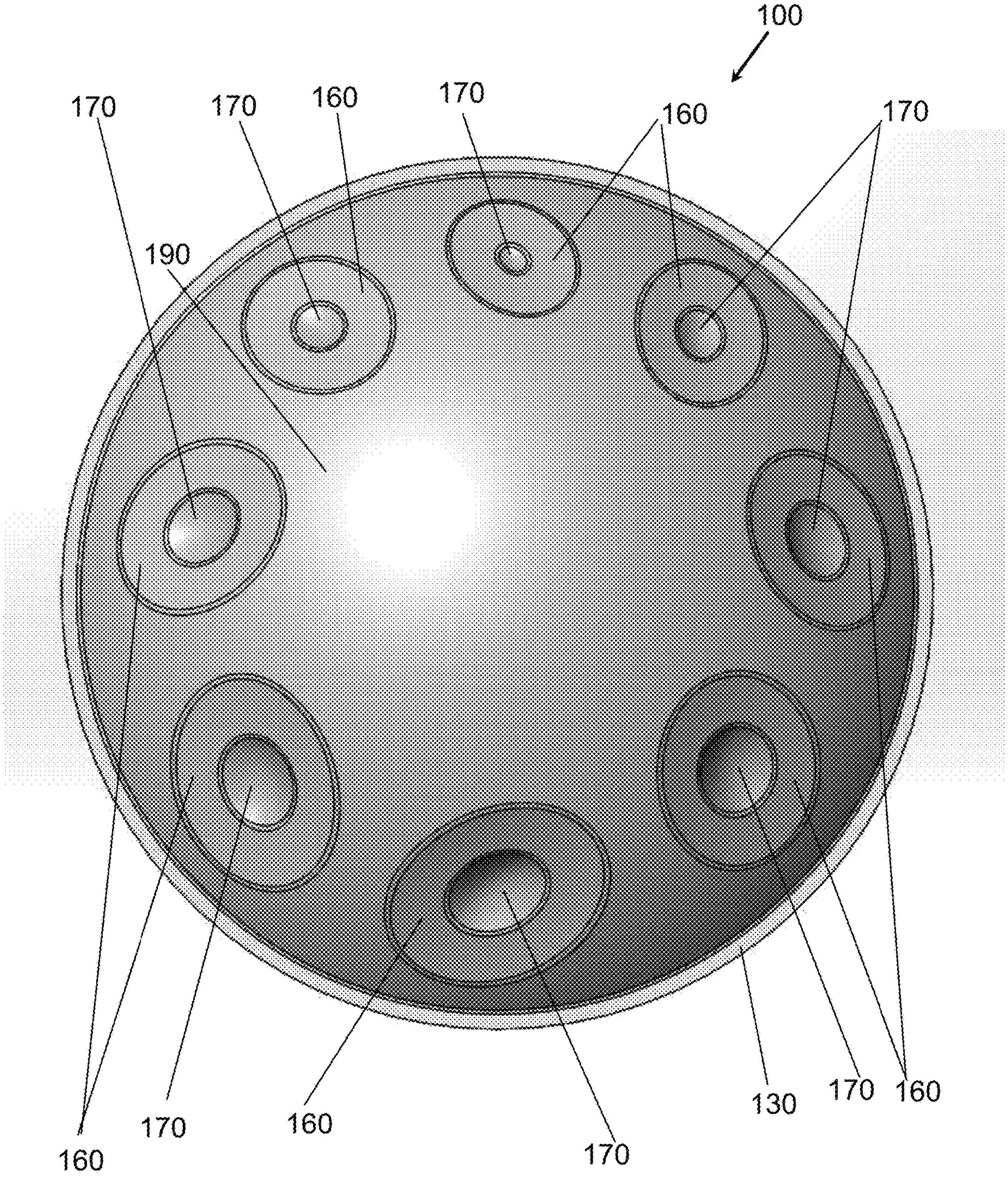
FIG. 14 shows a schematic of a top shell of a handpan comprising eight notes in a note ring and lacking a central note, according to embodiments herein.

In some cases, the set of musical scales easily achieved in a handpan (e.g., by manual tuning after hydroforming) can depend on the musical note that the central note of the handpan is shaped to produce, which can serve as a root note for a musical scale or family of related musical scales. In some cases, including a feature in a handpan mold shaped to form a central note (and, optionally a dome, e.g., concentric with the central note) can save time and effort needed to form the central note (and, optionally, an associated dome) after hydroforming. In some cases, handpan molds lacking a feature capable of forming a central note in a handpan shell (e.g., during hydroforming) can offer advantages as well. For example, providing and/or utilizing a handpan mold 200 lacking a feature capable of forming a central note in a handpan shell (e.g., during hydroforming), for example as shown in FIG. 13, can increase the breadth of musical scales conveniently achieved in handpans produced from the mold. In some cases, a handpan shell produced from a mold lacking a feature capable of forming a central note in the handpan shell can be further deformed (e.g., manually "worked," for instance, using an air hammer) after hydroforming to include a preferred central note. Since the central note can serve as a root note or defining note of a musical scale of a handpan and since additional note fields (e.g., one or more note fields of a note ring of the handpan) can be adjusted with relatively minor effort (e.g., by manually tuning, for instance up or down one or two half-note steps) to conform to a variety of musical scale structures, molds lacking a feature capable of forming a central note can be useful in producing handpan shells with "flexible" musical scales. In some cases, a practitioner can produce one or more handpan shells lacking a central note (e.g., as shown in FIG. 14) from a single mold (e.g., such as the one shown in FIG. 13) using hydroforming methods described herein and select individual central note shapes for subsequent addition to each of the produced handpan shells, for instance to bestow a different central note on each of produced handpan shells, thereby allowing a single handpan mold to produce a wider variety of musical scales (e.g., based on which central note(s) are selected) while still reducing overall time and effort required to form the handpan shell. Before, during, or after addition of the central note (e.g., and after hydroforming), other note fields of the handpan can be tuned (e.g., in accordance with the selected central note) to form the complete musical scale in the handpan.

Figure 15:
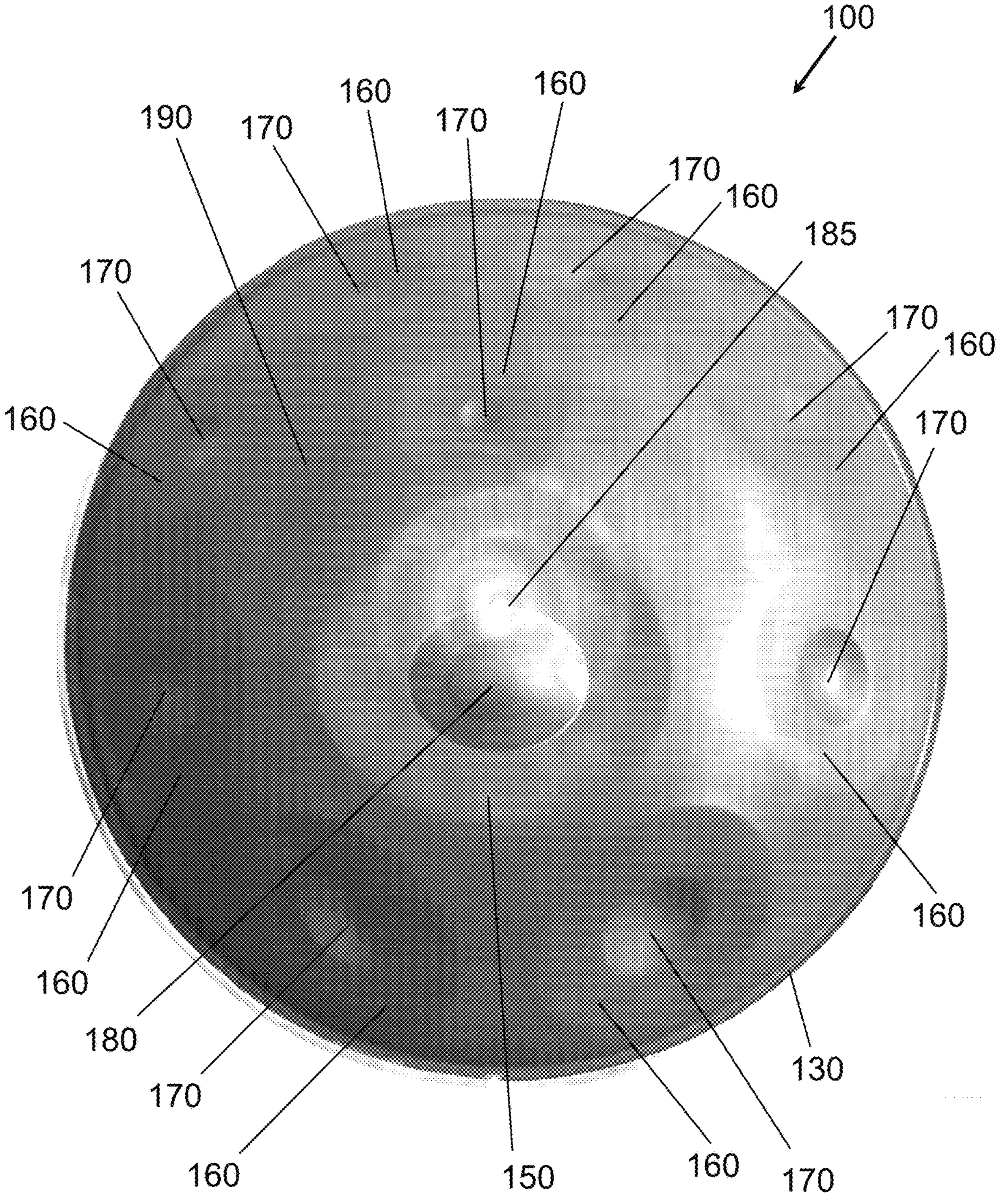
FIG. 15 shows an image of a top shell of a handpan comprising eight notes in note ring and a central note, according to embodiments herein.
Figure 16:
FIG. 16 shows an image of a top shell of a handpan comprising eight notes in note ring and a central note, according to embodiments herein.

For example, a handpan mold with features shaped to form a note ring having eight note fields: A3, B3, C♯4, D♯4, F4, G4, Ab4, and B4 and lacking feature(s) capable of forming a central note in the handpan shell can be used to produce a wide variety of musical scales in a plurality of handpan shells formed from the mold. For instance, D3 may be chosen as a central note for a first handpan shell of a plurality of handpan shells produced from the handpan mold, e.g., to create a D minor scale in the handpan shell. Tuning adjustments can be made to this first A3, B3, C♯4, D♯4, F4, G4, Ab4, B4 handpan shell to complete a preferred musical scale, for instance, wherein the B3 note is tuned to C4, the C♯4 note is tuned to D4, the D♯4 note is tuned to E4, the Ab4 note is tuned to A4, and the B4 note is tuned to C5 (e.g., to form the scale D3/A3, C4, D4, E4, F4, G4, A4, C5). A second handpan shell hydroformed from the same mold may have an A2 central note added after hydroforming, e.g., to create an A minor scale. Tuning adjustments can be made to this second A3, B3, C♯4, D♯4, F4, G4, Ab4, B4 handpan shell to complete a preferred musical scale, for instance, wherein the B3 note is tuned to C4, the C♯4 note is tuned to D4, the D♯4 note is tuned to E4, the Ab4 note is tuned to A4, and the B4 note is tuned to C5 (e.g., to form the scale A2/A3, C4, D4, E4, F4, G4, A4, C5). A third handpan shell hydroformed from the same mold may have an F3 central note added after hydroforming, e.g., to create an F major scale. Tuning adjustments can be made to this third A3, B3, C♯4, D♯4, F4, G4, Ab4, B4 handpan shell to complete a preferred musical scale, for instance, wherein the A3 note is tuned to Bb3, the B3 note is tuned to C4, the B4 note is tuned to C5 (e.g., to form the scale F3/Bb3, C4, db4, Eb4, F4, G4, Ab4, C5,). In some cases, the choice may be made after fabrication of the initial hydroformed handpan shell to include one or more additional note fields other than those of the note ring and the central note. In such cases, it may be advantageous or necessary that the central note be disposed on the handpan shell in off-center position, for example to ensure sufficient space for the one or more additional note fields between the central note and the note fields of the note ring (e.g., as shown in FIG. 15 and FIG. 16). A fourth handpan shell hydroformed from the same mold may have an F3 central note added after hydroforming, e.g., to create an F minor scale, in addition to an additional Eb5 high note. Tuning adjustments can be made to this fourth A3, B3, C♯4, D♯4, F4, G4, Ab4, B4 handpan shell to complete a preferred musical scale, for instance, wherein the A3 note is tuned to Bb3, the B3 note is tuned to C4, the B4 note is tuned to C5, and an additional Eb5 note is added to the interstitial (e.g., interstitial space) of the shell (e.g., to form the scale F3/Bb3, C4, db4, Eb4, F4, G4, Ab4, C5, Eb5, for instance wherein the central note is positioned off-center to make space for the Eb5 note field on the interstitial). A fifth handpan shell may be hydroformed from the same mold and selected to have an F3 central note added after hydroforming, e.g., to create an F minor scale, in addition to two additional notes (e.g., wherein the central note is positioned off-center and the two additional notes are positioned on the interstitial, for example, as shown in FIG. 16). Tuning adjustments can be made to this fifth A3, B3, C♯4, D♯4, F4, G4, Ab4, B4 handpan shell to complete a preferred musical scale, for instance, wherein the A3 note is tuned to Bb3, the B3 note is tuned to C4, the B4 note is tuned to C5, and additional Eb5 and F5 note fields may be added to the interstitial of the shell (e.g., to form the scale F3/Bb3, C4, db4, Eb4, F4, G4, Ab4, C5, Eb5, F5, for instance wherein the central note is positioned off-center to make space for the Eb5 and F5 note fields on the interstitial).

Advantageously, the same system can be used to hydroform the bottom shell 120 of the handpan 100 as is used to form the top shell 110 of the handpan 100 (e.g., after substituting a mold 200 for the top shell 110 in place of a mold 200 for the bottom shell 120, or vice versa). In some cases, a bottom shell 120 comprising a port 125 is hydroformed in a mold 200. Optionally, material can be removed from the port to create an opening using one or more of a drill, lathe or laser. In some cases, a blank bottom shell 120 is hydroformed in the absence of a mold 200. In some cases, a lathe is used to form the port 125 in a handpan shell (e.g., a blank handpan bottom shell 120) after hydroforming (e.g., prior to joining with a top shell 110). In some cases, a hydraulic press is used to form the port 125 in a handpan shell (e.g., a blank handpan bottom shell 120) after hydroforming (e.g., prior to joining with a top shell 110). Systems for hydroforming handpans and top and bottom shells thereof are provided herein.

Handpans

In transverse cross-sections of a handpan 100 wherein the cross-section does not comprise a feature (e.g., portions of the shell of the handpan 100 not comprising an intonation feature, such as the rim 130 of the handpan 100), handpans are typically circular or approximately circular. In most cases, the diameter 105 of the handpan 100 is largest at its rim 130 (e.g., flange). Handpans 100 typically have a maximum diameter (e.g., diameter 105 at the rim 130) of from about 18 inches to about 22 inches (e.g., about 48 cm to about 56 cm). In some embodiments, the maximum diameter of a handpan 100 is 40 centimeters (cm) to 60 cm. In some embodiments, the maximum diameter of a handpan 100 is 45 cm to 56 cm. In some embodiments, the maximum diameter of a handpan 100 is 45 cm to 46 cm, 45 cm to 47 cm, 45 cm to 48 cm, 45 cm to 49 cm, 45 cm to 50 cm, 45 cm to 51 cm, 45 cm to 52 cm, 45 cm to 53 cm, 45 cm to 54 cm, 45 cm to 55 cm, 45 cm to 56 cm, 45 cm to 57 cm, 45 cm to 58 cm, 45 cm to 59 cm, 46 cm to 47 cm, 46 cm to 48 cm, 46 cm to 49 cm, 46 cm to 50 cm, 46 cm to 51 cm, 46 cm to 52 cm, 46 cm to 53 cm, 46 cm to 54 cm, 46 cm to 55 cm, 46 cm to 56 cm, 46 cm to 57 cm, 46 cm to 58 cm, 46 cm to 59 cm, 47 cm to 48 cm, 47 cm to 49 cm, 47 cm to 50 cm, 47 cm to 51 cm, 47 cm to 52 cm, 47 cm to 53 cm, 47 cm to 54 cm, 47 cm to 55 cm, 47 cm to 56 cm, 47 cm to 57 cm, 47 cm to 58 cm, 47 cm to 59 cm, 48 cm to 49 cm, 48 cm to 50 cm, 48 cm to 51 cm, 48 cm to 52 cm, 48 cm to 53 cm, 48 cm to 54 cm, 48 cm to 55 cm, 48 cm to 56 cm, 48 cm to 57 cm, 48 cm to 58 cm, 48 cm to 59 cm, 49 cm to 50 cm, 49 cm to 51 cm, 49 cm to 52 cm, 49 cm to 53 cm, 49 cm to 54 cm, 49 cm to 55 cm, 49 cm to 56 cm, 49 cm to 57 cm, 49 cm to 58 cm, 49 cm to 59 cm, 50 cm to 51 cm, 50 cm to 52 cm, 50 cm to 53 cm, 50 cm to 54 cm, 50 cm to 55 cm, 50 cm to 56 cm, 50 cm to 57 cm, 50 cm to 58 cm, 50 cm to 59 cm, 51 cm to 52 cm, 51 cm to 53 cm, 51 cm to 54 cm, 51 cm to 55 cm, 51 cm to 56 cm, 51 cm to 57 cm, 51 cm to 58 cm, 51 cm to 59 cm, 52 cm to 53 cm, 52 cm to 54 cm, 52 cm to 55 cm, 52 cm to 56 cm, 52 cm to 57 cm, 52 cm to 58 cm, 52 cm to 59 cm, 53 cm to 54 cm, 53 cm to 55 cm, 53 cm to 56 cm, 53 cm to 57 cm, 53 cm to 58 cm, 53 cm to 59 cm, 54 cm to 55 cm, 54 cm to 56 cm, 54 cm to 57 cm, 54 cm to 58 cm, 54 cm to 59 cm, 55 cm to 56 cm, 55 cm to 57 cm, 55 cm to 58 cm, or 55 cm to 59 cm, such as 50 cm to 54 cm. In some embodiments, the maximum diameter of a handpan 100 is about 45 cm, 46 cm, 47 cm, 48 cm, 49 cm, 50 cm, 51 cm, 52 cm, 53 cm, 54 cm, 55 cm, or about 56 cm. In some embodiments, the maximum diameter of a handpan 100 is at least 45 cm, 46 cm, 47 cm, 48 cm, 49 cm, 50 cm, 51 cm, 52 cm, 53 cm, 54 cm, or at least 55 cm. In some embodiments, the maximum diameter of a handpan 100 is at most 46 cm, 47 cm, 48 cm, 49 cm, 50 cm, 51 cm, 52 cm, 53 cm, 54 cm, 55 cm, 56 cm, 57 cm, 58 cm, 59 cm, or at most 60 cm. In some cases, a handpan 100 has a maximum diameter of about 18.0 inches (45.72 cm), 18.5 inches (46.99 cm), 19.0 inches (48.26 cm), 19.5 inches (49.53 cm), 20.0 inches (50.80 cm), 20.5 inches (52.07 cm), 21.0 inches (53.34 cm), 21.5 inches (54.61 cm), or about 22.0 inches (55.88 cm).

Typically, a top shell 110 and a bottom shell 120 are sunk to approximately the same depth (e.g., "depth"), resulting in a handpan 100 having a height approximately equal to twice the depth of the top shell 110 (or the depth of the bottom shell 120). In some alternative embodiments, a top shell 110 and a bottom shell 120 may be sunk to different depths to achieve a variety of acoustic effects and aesthetic appearances.

In some embodiments, the depth of a top shell 110 of a handpan 100 is 10 cm to 15 cm. In some embodiments, the depth of a top shell 110 of a handpan 100 is 10 cm to 10.5 cm, 10 cm to 11 cm, 10 cm to 11.5 cm, 10 cm to 12 cm, 10 cm to 12.5 cm, 10 cm to 13 cm, 10 cm to 13.5 cm, 10 cm to 14 cm, 10 cm to 14.5 cm, 10 cm to 15 cm, 10.5 cm to 11 cm, 10.5 cm to 11.5 cm, 10.5 cm to 12 cm, 10.5 cm to 12.5 cm, 10.5 cm to 13 cm, 10.5 cm to 13.5 cm, 10.5 cm to 14 cm, 10.5 cm to 14.5 cm, 10.5 cm to 15 cm, 11 cm to 11.5 cm, 11 cm to 12 cm, 11 cm to 12.5 cm, 11 cm to 13 cm, 11 cm to 13.5 cm, 11 cm to 14 cm, 11 cm to 14.5 cm, 11 cm to 15 cm, 11.5 cm to 12 cm, 11.5 cm to 12.5 cm, 11.5 cm to 13 cm, 11.5 cm to 13.5 cm, 11.5 cm to 14 cm, 11.5 cm to 14.5 cm, 11.5 cm to 15 cm, 12 cm to 12.5 cm, 12 cm to 13 cm, 12 cm to 13.5 cm, 12 cm to 14 cm, 12 cm to 14.5 cm, 12 cm to 15 cm, 12.5 cm to 13 cm, 12.5 cm to 13.5 cm, 12.5 cm to 14 cm, 12.5 cm to 14.5 cm, 12.5 cm to 15 cm, 13 cm to 13.5 cm, 13 cm to 14 cm, 13 cm to 14.5 cm, 13 cm to 15 cm, 13.5 cm to 14 cm, 13.5 cm to 14.5 cm, 13.5 cm to 15 cm, 14 cm to 14.5 cm, 14 cm to 15 cm, or 14.5 cm to 15 cm. In some embodiments, the depth of atop shell 110 of a handpan 100 is about 10 cm, 10.5 cm, 11 cm, 11.5 cm, 12 cm, 12.5 cm, 13 cm, 13.5 cm, 14 cm, 14.5 cm, or about 15 cm. In some embodiments, the depth of a top shell 110 of a handpan 100 is at least 10 cm, 10.5 cm, 11 cm, 11.5 cm, 12 cm, 12.5 cm, 13 cm, 13.5 cm, 14 cm, or at least 14.5 cm. In some embodiments, the depth of a top shell 110 of a handpan 100 is at most 10.5 cm, 11 cm, 11.5 cm, 12 cm, 12.5 cm, 13 cm, 13.5 cm, 14 cm, 14.5 cm, or at most 15 cm. In some cases, atop shell 110 of a handpan 100 has a maximum depth of about 4.0 inches (10.16 cm), 4.5 inches, (11.43 cm), or about 5.0 inches (12.7 cm).

In some embodiments, the depth of a bottom shell 120 of a handpan 100 is 10 cm to 15 cm. In some embodiments, the depth of a bottom shell 120 of a handpan 100 is 10 cm to 10.5 cm, 10 cm to 11 cm, 10 cm to 11.5 cm, 10 cm to 12 cm, 10 cm to 12.5 cm, 10 cm to 13 cm, 10 cm to 13.5 cm, 10 cm to 14 cm, 10 cm to 14.5 cm, 10 cm to 15 cm, 10.5 cm to 11 cm, 10.5 cm to 11.5 cm, 10.5 cm to 12 cm, 10.5 cm to 12.5 cm, 10.5 cm to 13 cm, 10.5 cm to 13.5 cm, 10.5 cm to 14 cm, 10.5 cm to 14.5 cm, 10.5 cm to 15 cm, 11 cm to 11.5 cm, 11 cm to 12 cm, 11 cm to 12.5 cm, 11 cm to 13 cm, 11 cm to 13.5 cm, 11 cm to 14 cm, 11 cm to 14.5 cm, 11 cm to 15 cm, 11.5 cm to 12 cm, 11.5 cm to 12.5 cm, 11.5 cm to 13 cm, 11.5 cm to 13.5 cm, 11.5 cm to 14 cm, 11.5 cm to 14.5 cm, 11.5 cm to 15 cm, 12 cm to 12.5 cm, 12 cm to 13 cm, 12 cm to 13.5 cm, 12 cm to 14 cm, 12 cm to 14.5 cm, 12 cm to 15 cm, 12.5 cm to 13 cm, 12.5 cm to 13.5 cm, 12.5 cm to 14 cm, 12.5 cm to 14.5 cm, 12.5 cm to 15 cm, 13 cm to 13.5 cm, 13 cm to 14 cm, 13 cm to 14.5 cm, 13 cm to 15 cm, 13.5 cm to 14 cm, 13.5 cm to 14.5 cm, 13.5 cm to 15 cm, 14 cm to 14.5 cm, 14 cm to 15 cm, or 14.5 cm to 15 cm. In some embodiments, the depth of a bottom shell 120 of a handpan 100 is about 10 cm, 10.5 cm, 11 cm, 11.5 cm, 12 cm, 12.5 cm, 13 cm, 13.5 cm, 14 cm, 14.5 cm, or about 15 cm. In some embodiments, the depth of a bottom shell 120 of a handpan 100 is at least 10 cm, 10.5 cm, 11 cm, 11.5 cm, 12 cm, 12.5 cm, 13 cm, 13.5 cm, 14 cm, or at least 14.5 cm. In some embodiments, the depth of a bottom shell 120 of a handpan 100 is at most 10.5 cm, 11 cm, 11.5 cm, 12 cm, 12.5 cm, 13 cm, 13.5 cm, 14 cm, 14.5 cm, or at most 15 cm. In some cases, the depth of the top shell 110 of a handpan 100 is from about 4.5 inches to about 5.0 inches and the depth of the bottom shell 120 of the handpan 100 is from 4.0 inches to about 4.5 inches.

In some cases, the diameter 205 of a mold 200 (e.g., the diameter of the shape 220 of the mold 200 that is complementary to the shape of a top shell 110) may be about 2.54 cm (1 inch) smaller than the desired maximum diameter 105 of the handpan shell (e.g., including the rim/flange 130).

In many cases, a handpan 100 comprises features (e.g., intonation features) as part of its surface defining regions of specific acoustical outputs when contacted (e.g., by the user's hand) during use of the handpan 100. Features of a handpan 100 can include dimples 170, domes 180, notes (e.g., note fields 160), and logos 195. One or more portions of the shell of a handpan 100 can be configured to have a precise size, shape, and thickness for generating a specific and reproducible musical sound or set of musical sounds. In some cases, fabrication of a top shell 110 of a handpan 100 comprises forming a plurality of features (concurrently in a single step, or sequentially in a rapid series of connected steps) into the metal of the top shell 110 of the handpan 100. Handpans 100 can also comprise an opening (e.g., a port 125) in a portion of the shell of the handpan 100, e.g., to allow better resonance of the instrument during use and to allow a musician to modulate Helmholtz resonance (e.g., by cupping or partially covering the opening). In many cases, fabrication of a bottom shell 120 of a handpan 100 comprises forming an opening (e.g., a port 125) into the bottom shell 120 of a handpan 100.

In most embodiments, the top shell 110 and the bottom shell 120 of a handpan 100 are fabricated as separate pieces and joined together to form a handpan 100. A top shell 110 or a bottom shell 120 can be formed by one or more of hydroforming into a mold 200, hydroforming into a void or gas medium, spinning, repeatedly striking a sheet of metal (e.g., with a sledge hammer and/or an air hammer) or by using a mechanical press or roller to deform the metal.

In some cases, the top shell 110 and the bottom shell 120 of a handpan 100 are circular or approximately circular (e.g., when viewed perpendicular to the surface of the handpan 100 or, e.g., when viewed perpendicular to a plane defined by the rim 130 or circumference of the handpan shell). In some cases, the top shell 110 and the bottom shell 120 are non-circular. For example, a top shell 110 and a bottom shell 120 can be elliptical.

The top shell 110 of a handpan 100 may comprise one or more intonation features. In many cases, an intonation feature of a handpan 100 is a surface of a handpan 100 (e.g., a portion of a top shell 110 of a handpan 100) shaped to produce a musical tone or series of tones when struck (e.g., with a hand of a performer playing the handpan 100).

In many cases, a top shell 110 of a handpan 100 comprises a plurality of intonation features, e.g., to allow a broader range of different musical notes to be played using a single handpan 100 instrument. For example, a top shell 110 of a handpan 100 can comprise 2, 3, 4, 5, 6, 7, 8, 9, 10, 11, 12, 13, 14, 15 or more than 15 intonation features.

In some cases, an intonation feature is a note 160 (or note field). A note 160 (or note field) can be a flattened portion of the shell (e.g., top shell 110) of a handpan 100 capable of producing a specific musical note (e.g., when struck by a user's hand). In many cases, a flattened portion of a handpan shell comprising a note is circular in shape. In some cases, the flattened portion is oval-shaped. In some cases, the major axis of an (e.g., oval-shaped) intonation feature (e.g., a note) is oriented within 15 degrees, within 10 degrees, or within 5 degrees of a circumferential direction of a handpan shell. In some cases, the major axis of an (e.g., oval-shaped) intonation feature (e.g., a dimple 170) is oriented in a direction within 15 degrees, within 10 degrees, or within 5 degrees of a line perpendicular to a circumferential direction of a handpan shell. In many cases, a handpan comprises seven to ten notes. In some embodiments, the handpan shell has 1 note to 10 notes. In some embodiments, the handpan shell has 1 note to 2 notes, 1 note to 3 notes, 1 note to 4 notes, 1 note to 5 notes, 1 note to 6 notes, 1 note to 7 notes, 1 note to 8 notes, 1 note to 9 notes, 1 note to 10 notes, 2 notes to 3 notes, 2 notes to 4 notes, 2 notes to 5 notes, 2 notes to 6 notes, 2 notes to 7 notes, 2 notes to 8 notes, 2 notes to 9 notes, 2 notes to 10 notes, 3 notes to 4 notes, 3 notes to 5 notes, 3 notes to 6 notes, 3 notes to 7 notes, 3 notes to 8 notes, 3 notes to 9 notes, 3 notes to 10 notes, 4 notes to 5 notes, 4 notes to 6 notes, 4 notes to 7 notes, 4 notes to 8 notes, 4 notes to 9 notes, 4 notes to 10 notes, 5 notes to 6 notes, 5 notes to 7 notes, 5 notes to 8 notes, 5 notes to 9 notes, 5 notes to 10 notes, 6 notes to 7 notes, 6 notes to 8 notes, 6 notes to 9 notes, 6 notes to 10 notes, 7 notes to 8 notes, 7 notes to 9 notes, 7 notes to 10 notes, 8 notes to 9 notes, 8 notes to 10 notes, or 9 notes to 10 notes. In some embodiments, the handpan shell has 1 note, 2 notes, 3 notes, 4 notes, 5 notes, 6 notes, 7 notes, 8 notes, 9 notes, or 10 notes, such as 7 notes. In some embodiments, the handpan shell has at least 1 note, 2 notes, 3 notes, 4 notes, 5 notes, 6 notes, 7 notes, 8 notes, or at least 9 notes. In some embodiments, the handpan shell has at most 2 notes, 3 notes, 4 notes, 5 notes, 6 notes, 7 notes, 8 notes, 9 notes, or at most 10 notes.

In some cases, a plurality of intonation features (e.g., notes, for instance each comprising a note field and a dimple, optionally, wherein one or more of the plurality of note fields and dimples 170 are concentric or substantially concentric) can be arranged around the center 185 of a handpan 100 in a note ring (e.g., as illustrated in FIG. 1A, FIG. 1C, FIG. 14, FIG. 15, and FIG. 16). In some cases, a note ring (e.g., which may be referred to as a "note circle," "tone ring," or "tone circle") of a handpan 100 can comprise 2 notes, 3 notes, 4 notes, 5 notes, 6 notes, 7 notes, 8 notes, 9 notes, 10 notes, or more than 10 notes (e.g., comprising a set of notes disclosed herein, such as in a scale of Table 1, Table 2, or Table 3). In some cases, a note ring of a handpan can have exactly 7 notes, for instance, as shown in FIG. 1C (e.g., wherein the note ring comprises 7 note fields 160 and, optionally, 7 dimples 170 concentric with the note fields) In some cases, a note ring of a handpan can have exactly 8 notes, for instance, as shown in FIG. 16 (e.g., wherein the note ring comprises 8 note fields 160 and, optionally, 8 dimples 170 concentric with the note fields). In some cases, a note ring of a handpan can have exactly 9 notes, for instance, wherein the note ring comprises 9 notes fields 160 and, optionally, 9 dimples 170 concentric with the note fields. In some cases, a note ring of a handpan can have exactly 10 notes, for instance, wherein the note ring comprises 10 notes fields 160 and, optionally, 10 dimples 170 concentric with the note fields. In some cases, a handpan comprising a note ring may lack an intonation feature outside of the note ring. For example, a handpan comprising 7, 8, 9, 10, or more than 10 notes (e.g., arranged in a note ring) may lack a central note and, optionally, may lack a dome (e.g., at the center of the handpan).

In some cases, a note field 160 can be circular or approximately circular (e.g., when viewed perpendicular to the surface of the note field 160). In some cases, a note field 160 can be non-circular. For example, a note field 160 can be elliptical.

In some cases, an intonation feature is a dimple 170. A dimple 170 can be a concave portion of a handpan shell (e.g., a top shell 110). In some cases, a dimple 170 is located in a note field 160 of a handpan shell (e.g., a dimple 170 can be encircled by a note field 160), for example, to reduce high frequencies when the note is played. A dimple 170 can be formed during hydroforming by forming a convex shape complementary to the shape of the desired dimple 170 at the corresponding location on a mold 200. In some cases, a dimple 170 can be circular or approximately circular (e.g., when viewed perpendicular to the surface of the dimple 170 or a note field 160 surrounding the dimple 170). In some cases, a dimple 170 can be non-circular. For example, a dimple 170 can be elliptical.

In some cases, an intonation feature is a central note 150 (e.g., a top note or center note). In some cases, the central note 150 comprises a concave indentation into the surface of the shell. In some cases, a central note 150 comprises a dome 180. A dome 180 can be formed by shaping a portion of the mold 200 into a concave shape complementary to the desired shape of the dome 180 (e.g., at the center bottom of the mold 200). In some cases, a dome 180 can be circular or approximately circular (e.g., when viewed perpendicular to the surface of the dome 180 or a note field 160 surrounding the dome 180). In some cases, a dome 180 can be non-circular. For example, a dome 180 can be elliptical. In some cases, a central note 150 can be located at the apex of a top shell 110 of a handpan 100. In some cases, the central note 150 is shaped to produce the lowest note on the handpan 100. In some cases, the central note 150 is the root note of the scale of the handpan 100. The central note 150 may be centered or off-centered (e.g., relative to a circumference of the handpan shell or a center point 185 of the shell). For example, FIG. 15 shows a handpan shell comprising a central note 150 (and dome 180) that is off-center (e.g., wherein the center of the central note 150 is within 3 cm of the center 185 of the handpan 100). In some cases, positioning a central note 150 in an off-centered position on a handpan shell (e.g., relative to a circumference of the handpan shell or a center point 185 of the shell) can allow a larger number of intonation features to be added to the handpan shell than if the central note 150 is centered on the handpan shell (e.g., relative to a circumference of the handpan shell or a center point 185 of the shell). In some cases, positioning a central note 150 off-center on a handpan shell (e.g., relative to a circumference of the handpan shell or a center point 185 of the shell) makes the handpan more comfortable or easier for a musician to play. In some embodiments, the center of the central note 150 is within 5 cm of the center of the handpan 100, such as within 4 cm, within 3 cm, within 2 cm or within 1 cm of the center of the handpan 100. In some cases, a central note 150 can be circular or approximately circular (e.g., when viewed perpendicular to the surface of the central note 150). In some cases, a central note 150 can be non-circular. For example, a central note 150 can be elliptical (e.g., as shown in FIG. 15).

In some cases, a handpan can comprise one or more additional intonation features (e.g., comprising a note field 160 and, optionally a dimple 170) that are not a central note (e.g., center note) and not part of a note ring (e.g., not disposed at the center point 185 of the handpan shell and not disposed within a note ring). For example, the handpan shell shown in FIG. 15 comprises one central note 150, eight notes in a note ring, and one additional intonation feature comprising a note field 160 and a dimple 170. FIG. 16 shows a handpan shell comprising one central note 150, eight notes in a note ring, and two additional intonation features, each comprising a note field 160 and a dimple 170. In some cases, a handpan can comprise one, two, three, four, five, six, seven, or more than seven such additional intonation features (e.g., each comprising a note field 160 and, optionally, a dimple 170).

In some cases, an intonation feature comprises a portion of the interstitial 190 (e.g., interstitial space) of the handpan 100. An interstitial 190 of a handpan 100 comprises the curved portion of the handpan 100 shell between the notes (e.g., and, optionally, the rim 130, the central note 150, and/or other features of the shell). In some cases, the interstitial surface 190 of the handpan shell is not tuned to a specific musical note. A corresponding curved surface on a mold 200 can be used to form the interstitial 190 of a handpan 100 during a hydroforming process.

In some cases, an intonation feature is a port 125. A handpan shell (e.g., a bottom shell 120) can comprise one port 125 (see FIG. 1C). In some cases, a handpan shell (e.g., a bottom shell 120) comprises no more than one port 125. In some cases, a handpan shell (e.g., a bottom shell 120) comprises a plurality of ports 125. In some cases, a handpan shell (e.g., a bottom shell 120) comprises no more than two ports 125. In many cases, a port 125 of a handpan 100 enhances the resonance of the handpan 100. In some cases, a port 125 can be used to modulate Helmholtz resonance during use of the handpan 100. The port 125 may be centered or off-centered (e.g., relative to a circumference of the handpan shell). In some cases, positioning the port 125 off-center on a handpan shell (e.g., relative to a circumference of the handpan shell) makes the handpan more comfortable or easier for a musician to play. In some embodiments, the center of the port 125 is within 5 cm of the center of the handpan 100, such as within 4 cm, within 3 cm, within 2 cm or within 1 cm of the center of the handpan 100. In some embodiments, the port 125 is circular or approximately circular (e.g., when viewed perpendicular to the surface of the port 125). In some cases, the port 125 is non-circular. For example, a port 125 can be elliptical.

In some cases, a feature is a marking, such as a logo or decorative embellishment 195. A handpan shell can comprise one or more markings. In some embodiments, the marking is introduced in a hydroforming process, wherein the mold 200 comprises a feature complementary to the marking. Any feature described herein, but especially a logo or other marking 195 that comprises sharp, distinct characteristics, may exhibit a pillowed appearance on the hydroformed handpan 100. In other words, if the marking were a single letter or character, the edges of the character that first came into contact with the metal sheet in the mold 200 may appear sharp and crisp, whereas the opposing edge of the character may not be as sharp, as the metal may not fully expand into the deepest corners of the character in the mold 200 at typical pressures used in the present methods.

Materials

A handpan shell (e.g., a top shell 110 and/or a bottom shell 120) can be formed from a metal or a metal alloy. For example, a handpan shell can be fabricated from metals and metal alloys such as steel (e.g., 1008 cold-rolled steel), stainless steel, chrome steel, titanium, bronze, brass, or zinc. Specific metals can be selected for the production of handpan shells based on the physical characteristics of the metal, which can affect the musical qualities of the handpan 100. For example, a metal or metal alloy can be selected based on the malleability of the material, which can determine the timbre, resonances, and/or range of musical tones that can be produced from a handpan 100 formed from the metal or metal alloy. Materials from which a handpan 100 is fabricated can also be selected based on additional considerations, such as durability (e.g., crack resistance), cost, aesthetics, and/or availability.

The top shell 110 and the bottom shell 120 of a handpan 100 can comprise the same metal or metal alloy. In some embodiments, the top shell 110 of a handpan 100 comprises a first metal or first metal alloy, and the bottom shell 120 of a handpan 100 comprises a second metal or second metal alloy. In some cases, the first metal or first metal alloy is the same as the second metal or second metal alloy. In some cases, the first metal or first metal alloy is different from the second metal or second metal alloy.

In some cases, the metal comprises an additive. For example, a metal or metal alloy can comprise carbon, manganese, nickel, chromium, molybdenum, vanadium, silicon, boron, aluminum, cobalt, copper, cerium, niobium, titanium, tin, zinc, lead, bismuth, and/or zirconium. In some cases, an additive to a metal or metal alloy improves corrosion resistance of a metal or metal alloy. For example, a metal or metal alloy comprising copper (e.g., 0.1%-0.4% copper) can exhibit improved corrosion resistance compared to the same base metal or metal alloy that does not comprise copper. In some cases, an additive can improve material hardness. For example, a metal or metal alloy (e.g., steel) comprising carbon (e.g., 0.02% to 0.20% carbon) can exhibit improved hardness compared to the base metal or a metal alloy that does not comprise carbon. A metal or metal alloy comprising vanadium (e.g., 0.15% vanadium) can exhibit improved strength, fracture resistance (e.g., at high temperatures), and/or ductility compared to the base metal or a metal alloy that does not comprise vanadium.

In many cases, a handpan shell is fabricated using steel. In some embodiments, the steel is a cold rolled steel, such as 1008 cold rolled steel, 1010 cold rolled steel, 1018 cold rolled steel, 1026 cold rolled steel, 1045 cold rolled steel, 1141 cold rolled steel, 1144 cold rolled steel, or 12L14 cold rolled steel. In some preferred embodiments, a handpan 100 is formed from 1008 cold rolled steel or 1018 cold rolled steel. In some cases, the steel is stainless steel, such as stainless steel 430. In some cases, stainless steel (e.g., stainless steel 430) does not need to be nitrided, which can be a significant advantage to a handpan method or system comprising the use of stainless steel.

In many embodiments, the metal is formed from a flat sheet of the metal or metal alloy. Sheet metal can be advantageous for use in methods of hydroforming a handpan shell because it can have a constant starting thickness that is relatively close to the desired final thickness (or thicknesses) of the handpan shell, which can reduce the amount of manual manipulation of the thickness (or thicknesses) of the shell's surfaces required to achieve the final shape of the shell needed to produce the desired musical tones. In some cases, a metal or metal alloy (e.g., steel) used to fabricate a handpan shell (e.g., a top shell 110 and/or a bottom shell 120) is 16 gauge, 17 gauge, 18 gauge, 19 gauge, 20 gauge, 21 gauge, 22 gauge, or 23 gauge. In some embodiments of hydroforming methods described herein, it is advantageous to use 18 gauge, 19 gauge, or 20 gauge metal or metal alloy (e.g., steel), for example, to achieve the desired thicknesses of the final handpan shell formed using the process. In some cases, a thickness of a metal or metal alloy used to fabricate a handpan shell (e.g., a top shell 110 and/or a bottom shell 120) is between 0.5 mm and 1.6 mm, such as between 0.6 mm and 1.5 mm, between 0.7 mm and 1.4 mm, between 0.8 mm and 1.3 mm, or between 0.9 and 1.2 mm.

In some embodiments, the thickness of all or a portion of a handpan shell (e.g., a top shell 110 and/or a bottom shell 120) is 0.5 mm to 1.5 mm. In some embodiments, the thickness of all or a portion of a handpan shell (e.g., a top shell 110 and/or a bottom shell 120) is 0.5 mm to 0.6 mm, 0.5 mm to 0.7 mm, 0.5 mm to 0.8 mm, 0.5 mm to 0.9 mm, 0.5 mm to 1 mm, 0.5 mm to 1.1 mm, 0.5 mm to 1.2 mm, 0.5 mm to 1.3 mm, 0.5 mm to 1.4 mm, 0.5 mm to 1.5 mm, 0.6 mm to 0.7 mm, 0.6 mm to 0.8 mm, 0.6 mm to 0.9 mm, 0.6 mm to 1 mm, 0.6 mm to 1.1 mm, 0.6 mm to 1.2 mm, 0.6 mm to 1.3 mm, 0.6 mm to 1.4 mm, 0.6 mm to 1.5 mm, 0.7 mm to 0.8 mm, 0.7 mm to 0.9 mm, 0.7 mm to 1 mm, 0.7 mm to 1.1 mm, 0.7 mm to 1.2 mm, 0.7 mm to 1.3 mm, 0.7 mm to 1.4 mm, 0.7 mm to 1.5 mm, 0.8 mm to 0.9 mm, 0.8 mm to 1 mm, 0.8 mm to 1.1 mm, 0.8 mm to 1.2 mm, 0.8 mm to 1.3 mm, 0.8 mm to 1.4 mm, 0.8 mm to 1.5 mm, 0.9 mm to 1 mm, 0.9 mm to 1.1 mm, 0.9 mm to 1.2 mm, 0.9 mm to 1.3 mm, 0.9 mm to 1.4 mm, 0.9 mm to 1.5 mm, 1 mm to 1.1 mm, 1 mm to 1.2 mm, 1 mm to 1.3 mm, 1 mm to 1.4 mm, 1 mm to 1.5 mm, 1.1 mm to 1.2 mm, 1.1 mm to 1.3 mm, 1.1 mm to 1.4 mm, 1.1 mm to 1.5 mm, 1.2 mm to 1.3 mm, 1.2 mm to 1.4 mm, 1.2 mm to 1.5 mm, 1.3 mm to 1.4 mm, 1.3 mm to 1.5 mm, or 1.4 mm to 1.5 mm. In some embodiments, the thickness of all or a portion of a handpan shell (e.g., a top shell 110 and/or a bottom shell 120) is about 0.5 mm, 0.6 mm, 0.7 mm, 0.8 mm, 0.9 mm, 1 mm, 1.1 mm, 1.2 mm, 1.3 mm, 1.4 mm, or about 1.5 mm. In some embodiments, the thickness of all or a portion of a handpan shell (e.g., a top shell 110 and/or a bottom shell 120) is at least 0.5 mm, 0.6 mm, 0.7 mm, 0.8 mm, 0.9 mm, 1 mm, 1.1 mm, 1.2 mm, 1.3 mm, or at least 1.4 mm. In some embodiments, the thickness of all or a portion of a handpan shell (e.g., a top shell 110 and/or a bottom shell 120) is at most 0.6 mm, 0.7 mm, 0.8 mm, 0.9 mm, 1 mm, 1.1 mm, 1.2 mm, 1.3 mm, 1.4 mm, or at most 1.5 mm. In some embodiments, the thickness of all or a portion of a handpan shell (e.g., a top shell 110 and/or a bottom shell 120) is 0.50 mm to 0.90 mm, 0.5 mm to 0.95 mm, 0.50 mm to 1.00 mm, 0.50 mm to 1.05 mm, 0.50 mm to 1.10 mm, 0.50 mm to 1.15 mm, 0.50 mm to 1.20 mm, 0.50 mm to 1.25 mm, 0.50 mm to 1.30 mm, 0.90 mm to 0.95 mm, 0.90 mm to 1.00 mm, 0.90 mm to 1.05 mm, 0.90 mm to 1.10 mm, 0.90 mm to 1.15 mm, 0.90 mm to 1.20 mm, 0.90 mm to 1.25 mm, 0.90 mm to 1.30 mm, 0.95 mm to 1.00 mm, 0.95 mm to 1.05 mm, 0.95 mm to 1.10 mm, 0.95 mm to 1.15 mm, 0.95 mm to 1.20 mm, 0.95 mm to 1.25 mm, 0.95 mm to 1.30 mm, 1.00 mm to 1.05 mm, 1.00 mm to 1.10 mm, 1.00 mm to 1.15 mm, 1.00 mm to 1.20 mm, 1.00 mm to 1.25 mm, 1.00 mm to 1.30 mm, 1.05 mm to 1.10 mm, 1.05 mm to 1.15 mm, 1.05 mm to 1.20 mm, 1.05 mm to 1.25 mm, 1.05 mm to 1.30 mm, 1.10 mm to 1.15 mm, 1.10 mm to 1.20 mm, 1.10 mm to 1.25 mm, 1.10 mm to 1.30 mm, 1.15 mm to 1.20 mm, 1.15 mm to 1.25 mm, 1.15 mm to 1.30 mm, 1.20 mm to 1.25 mm, 1.20 mm to 1.30 mm, or 1.25 mm to 1.30 mm. In some embodiments, the thickness of all or a portion of a handpan shell (e.g., atop shell 110 and/or a bottom shell 120) is about 0.90 mm, about 0.95 mm, about 1.00 mm, about 1.05 mm, about 1.10 mm, about 1.15 mm, about 1.20 mm, about 1.25 mm, or about 1.30 mm. In some embodiments, the thickness of all or a portion of a handpan shell (e.g., a top shell 110 and/or a bottom shell 120) is at least 0.90 mm, at least 0.95 mm, at least 1.00 mm, at least 1.10 mm, at least 1.15 mm, at least 1.20 mm, at least 1.25 mm, or at least 1.30 mm. In some embodiments, the thickness of all or a portion of a handpan shell (e.g., a top shell 110 and/or a bottom shell 120) is at most 0.90 mm, at most 0.95 mm, at most 1.00 mm, at most 1.10 mm, at most 1.15 mm, at most 1.20 mm, at most 1.25 mm, or at most 1.30 mm.

In some embodiments, the thickness of a plate used to form a handpan shell (e.g., a top shell 110 and/or a bottom shell 120) is 0.50 mm to 0.90 mm, 0.5 mm to 0.95 mm, 0.50 mm to 1.00 mm, 0.50 mm to 1.05 mm, 0.50 mm to 1.10 mm, 0.50 mm to 1.15 mm, 0.50 mm to 1.20 mm, 0.50 mm to 1.25 mm, 0.50 mm to 1.30 mm, 0.90 mm to 0.95 mm, 0.90 mm to 1.00 mm, 0.90 mm to 1.05 mm, 0.90 mm to 1.10 mm, 0.90 mm to 1.15 mm, 0.90 mm to 1.20 mm, 0.90 mm to 1.25 mm, 0.90 mm to 1.30 mm, 0.95 mm to 1.00 mm, 0.95 mm to 1.05 mm, 0.95 mm to 1.10 mm, 0.95 mm to 1.15 mm, 0.95 mm to 1.20 mm, 0.95 mm to 1.25 mm, 0.95 mm to 1.30 mm, 1.00 mm to 1.05 mm, 1.00 mm to 1.10 mm, 1.00 mm to 1.15 mm, 1.00 mm to 1.20 mm, 1.00 mm to 1.25 mm, 1.00 mm to 1.30 mm, 1.05 mm to 1.10 mm, 1.05 mm to 1.15 mm, 1.05 mm to 1.20 mm, 1.05 mm to 1.25 mm, 1.05 mm to 1.30 mm, 1.10 mm to 1.15 mm, 1.10 mm to 1.20 mm, 1.10 mm to 1.25 mm, 1.10 mm to 1.30 mm, 1.15 mm to 1.20 mm, 1.15 mm to 1.25 mm, 1.15 mm to 1.30 mm, 1.20 mm to 1.25 mm, 1.20 mm to 1.30 mm, or 1.25 mm to 1.30 mm. In some embodiments, the thickness of a plate used to form a handpan shell (e.g., a top shell 110 and/or a bottom shell 120) is about 0.90 mm, about 0.95 mm, about 1.00 mm, about 1.05 mm, about 1.10 mm, about 1.15 mm, about 1.20 mm, about 1.25 mm, or about 1.30 mm. In some embodiments, the thickness of a plate used to form a handpan shell (e.g., a top shell 110 and/or a bottom shell 120) is at least 0.90 mm, at least 0.95 mm, at least 1.00 mm, at least 1.10 mm, at least 1.15 mm, at least 1.20 mm, at least 1.25 mm, or at least 1.30 mm. In some embodiments, the thickness of a plate used to form a handpan shell (e.g., a top shell 110 and/or a bottom shell 120) is at most 0.90 mm, at most 0.95 mm, at most 1.00 mm, at most 1.10 mm, at most 1.15 mm, at most 1.20 mm, at most 1.25 mm, or at most 1.30 mm.

In some cases, a portion, e.g., a top shell 110 of a handpan 100 has a hardness within a range from 260 megapascals (MPa) to 420 MPa. In some embodiments, the hardness of a handpan top shell 110 is 250 MPa to 500 MPa. In some embodiments, the hardness of a handpan top shell 110 is 250 MPa to 260 MPa, 250 MPa to 300 MPa, 250 MPa to 325 MPa, 250 MPa to 350 MPa, 250 MPa to 375 MPa, 250 MPa to 400 MPa, 250 MPa to 420 MPa, 250 MPa to 450 MPa, 250 MPa to 475 MPa, 250 MPa to 500 MPa, 260 MPa to 300 MPa, 260 MPa to 325 MPa, 260 MPa to 350 MPa, 260 MPa to 375 MPa, 260 MPa to 400 MPa, 260 MPa to 420 MPa, 260 MPa to 450 MPa, 260 MPa to 475 MPa, 260 MPa to 500 MPa, 300 MPa to 325 MPa, 300 MPa to 350 MPa, 300 MPa to 375 MPa, 300 MPa to 400 MPa, 300 MPa to 420 MPa, 300 MPa to 450 MPa, 300 MPa to 475 MPa, 300 MPa to 500 MPa, 325 MPa to 350 MPa, 325 MPa to 375 MPa, 325 MPa to 400 MPa, 325 MPa to 420 MPa, 325 MPa to 450 MPa, 325 MPa to 475 MPa, 325 MPa to 500 MPa, 350 MPa to 375 MPa, 350 MPa to 400 MPa, 350 MPa to 420 MPa, 350 MPa to 450 MPa, 350 MPa to 475 MPa, 350 MPa to 500 MPa, 375 MPa to 400 MPa, 375 MPa to 420 MPa, 375 MPa to 450 MPa, 375 MPa to 475 MPa, 375 MPa to 500 MPa, 400 MPa to 420 MPa, 400 MPa to 450 MPa, 400 MPa to 475 MPa, 400 MPa to 500 MPa, 420 MPa to 450 MPa, 420 MPa to 475 MPa, 420 MPa to 500 MPa, 450 MPa to 475 MPa, 450 MPa to 500 MPa, or 475 MPa to 500 MPa. In some embodiments, the hardness of a handpan top shell 110 is about 250 MPa, 260 MPa, 300 MPa, 325 MPa, 350 MPa, 375 MPa, 400 MPa, 420 MPa, 450 MPa, 475 MPa, or about 500 MPa. In some embodiments, the hardness of a handpan top shell 110 is at least 250 MPa, 260 MPa, 300 MPa, 325 MPa, 350 MPa, 375 MPa, 400 MPa, 420 MPa, 450 MPa, or at least 475 MPa. In some embodiments, the minimum hardness of a handpan top shell 110 is at least 250 MPa, 260 MPa, 300 MPa, 325 MPa, 350 MPa, 375 MPa, 400 MPa, 420 MPa, 450 MPa, or at least 475 MPa. In some embodiments, the maximum hardness of a handpan top shell 110 is at least 250 MPa, 260 MPa, 300 MPa, 325 MPa, 350 MPa, 375 MPa, 400 MPa, 420 MPa, 450 MPa, 475 MPa, or at least 500 MPa. In some embodiments, the hardness of a handpan top shell 110 is at most 260 MPa, 300 MPa, 325 MPa, 350 MPa, 375 MPa, 400 MPa, 420 MPa, 450 MPa, 475 MPa, or at most 500 MPa. In some embodiments, the hardness of a handpan shell formed by a hydroforming method described herein is within a range from 300 MPa to 500 MPa, wherein the maximum hardness of the shell is at least 450 MPa. In some embodiments, the hardness values provided in this paragraph represent the hardness of a hydroformed handpan shell prior to any post-hydroforming hardening process, such as nitriding. Nitriding a hydroformed handpan top shell 110 may further increase the hardness of the shell, such as by at least 250 MPa or more. In some embodiments, the hardness values provided in this paragraph represent the hardness of a hydroformed handpan shell after a post-hydroforming hardening process, such as nitriding.

In some cases, a portion, e.g., a bottom shell 120 of a handpan 100 has a hardness within a range from 260 MPa to 420 MPa. In some embodiments, the hardness of a handpan bottom shell 120 is 250 MPa to 500 MPa. In some embodiments, the hardness of a handpan bottom shell 120 is 300 MPa to 900 MPa. In some embodiments, the hardness of a handpan bottom shell 120 is 250 MPa to 260 MPa, 250 MPa to 300 MPa, 250 MPa to 325 MPa, 250 MPa to 350 MPa, 250 MPa to 375 MPa, 250 MPa to 400 MPa, 250 MPa to 420 MPa, 250 MPa to 450 MPa, 250 MPa to 475 MPa, 250 MPa to 500 MPa, 260 MPa to 300 MPa, 260 MPa to 325 MPa, 260 MPa to 350 MPa, 260 MPa to 375 MPa, 260 MPa to 400 MPa, 260 MPa to 420 MPa, 260 MPa to 450 MPa, 260 MPa to 475 MPa, 260 MPa to 500 MPa, 300 MPa to 325 MPa, 300 MPa to 350 MPa, 300 MPa to 375 MPa, 300 MPa to 400 MPa, 300 MPa to 420 MPa, 300 MPa to 450 MPa, 300 MPa to 475 MPa, 300 MPa to 500 MPa, 325 MPa to 350 MPa, 325 MPa to 375 MPa, 325 MPa to 400 MPa, 325 MPa to 420 MPa, 325 MPa to 450 MPa, 325 MPa to 475 MPa, 325 MPa to 500 MPa, 350 MPa to 375 MPa, 350 MPa to 400 MPa, 350 MPa to 420 MPa, 350 MPa to 450 MPa, 350 MPa to 475 MPa, 350 MPa to 500 MPa, 375 MPa to 400 MPa, 375 MPa to 420 MPa, 375 MPa to 450 MPa, 375 MPa to 475 MPa, 375 MPa to 500 MPa, 400 MPa to 420 MPa, 400 MPa to 450 MPa, 400 MPa to 475 MPa, 400 MPa to 500 MPa, 420 MPa to 450 MPa, 420 MPa to 475 MPa, 420 MPa to 500 MPa, 450 MPa to 475 MPa, 450 MPa to 500 MPa, or 475 MPa to 500 MPa. In some embodiments, the hardness of a handpan bottom shell 120 is about 250 MPa, 260 MPa, 300 MPa, 325 MPa, 350 MPa, 375 MPa, 400 MPa, 420 MPa, 450 MPa, 475 MPa, or about 500 MPa. In some embodiments, the hardness of a handpan bottom shell 120 is at least 250 MPa, 260 MPa, 300 MPa, 325 MPa, 350 MPa, 375 MPa, 400 MPa, 420 MPa, 450 MPa, 475 MPa, or at least 500 MPa. In some embodiments, the minimum hardness of a handpan bottom shell 120 is at least 250 MPa, 260 MPa, 300 MPa, 325 MPa, 350 MPa, 375 MPa, 400 MPa, 420 MPa, 450 MPa, or at least 475 MPa. In some embodiments, the maximum hardness of a handpan bottom shell 120 is at least 250 MPa, 260 MPa, 300 MPa, 325 MPa, 350 MPa, 375 MPa, 400 MPa, 420 MPa, 450 MPa, or at least 475 MPa. In some embodiments, the maximum hardness of a handpan bottom shell 120 is at most 500 MPa, such as at most 475 MPa, 450 MPa, 425 MPa, 400 MPa, 375 MPa, or 350 MPa. In some embodiments, the minimum hardness of a handpan bottom shell 120 is at most 260 MPa, 270 MPa, 280 MPa, 290 MPa, 300 MPa, 325 MPa, 350 MPa, 375 MPa, 400 MPa, 420 MPa, 450 MPa, 475 MPa, or at most 500 MPa. In some embodiments, the hardness of a bottom shell 120 formed by a hydroforming method described herein is within a range from 300 MPa to 500 MPa, wherein the maximum hardness of the shell is at least 450 MPa. In some embodiments, the hardness values provided in this paragraph represent the hardness of a bottom shell 120 prior to any hardening process, such as nitriding. Nitriding a handpan bottom shell 120 may further increase the hardness of the shell, such as by at least 250 MPa or more. In some embodiments, the hardness values provided in this paragraph represent the hardness of a bottom shell 120 after a hardening process, such as nitriding.

The present inventor has found that the hardness of a handpan shell formed into a mold 200 according to the hydroforming methods of the present disclosure is greater than the hardness of a handpan 100 formed via alternative methods. For example, a handpan shell formed from 19-gauge 1008 cold rolled steel (yield strength=261 MPa) is expected to have a hardness ranging from about 305 MPa to about 485 MPa after the hydroforming process, where the maximum hardness can be expected at the top of the central note 150 of the handpan top shell 110, in some cases. In contrast, a blank handpan shell hydroformed from the same material into a void may be expected to have a hardness ranging from about 280 MPa to about 400 MPa, in some cases, where the hardness at the center of the shell is expected to be only about 330 MPa. In this simulation, the maximum hardness of 400 MPa was only observed at the outer rim 130 of the shell at the point where the plate contacts the clamp that secures it in place. Accordingly, if the hardness at the outer rim 130 of this shell is ignored, the hardness of the material is expected to be relatively uniform, ranging from about 280 MPa to 330 MPa. Advantageously, a handpan shell formed into a mold 200 according to the hydroforming methods of the present disclosure is expected to exhibit a maximum hardness at the central note 150 of the handpan shell of 150 MPa greater than a central note 150 of a handpan 100 formed from the same material according to alternative methods in the art. The increased hardness may positively impact the quality and performance of the handpan 100, such as by improving the timbre relative to a handpan 100 formed by alternative methods.

Thus, in some embodiments, the hardness of the material comprising the dome 180 of the central note 150 of the top shell 110 of a handpan 100 is at least 100 MPa greater, such as at least 120 MPa, 140 MPa, 160 MPa, 180 MPa, 200 MPa, 220 MPa, or at least 240 MPa greater than the hardness or yield strength of the material prior to deforming the material into the top shell 110 of the handpan 100. In some embodiments, the maximum hardness of the top shell 110 of the handpan 100 is at least 420 MPa, 430 MPa, 440 MPa, 450 MPa, 460 MPa, 470 MPa, 480 MPa, 490 MPa, or at least 500 MPa. In some embodiments, the maximum hardness of the dome 180 of the central note 150 of the top shell 110 of a handpan 100 is at least 420 MPa, 430 MPa, 440 MPa, 450 MPa, 460 MPa, 470 MPa, 480 MPa, 490 MPa, or at least 500 MPa.

A handpan shell (e.g., a top shell 110 and/or a bottom shell 120) produced according to a hydroforming method described herein may be further treated to increase the hardness of the handpan shell, optionally by a nitriding process. In some embodiments, the hardening treatment (e.g., nitriding) increases the hardness of the handpan shell by at least 50 MPa, such as at least 75 MPa, at least 100 MPa, at least 125 MPa, at least 150 MPa, at least 175 MPa, at least 200 MPa, at least 225 MPa, at least 250 MPa, at least 275 MPa, at least 300 MPa, at least 325 MPa, at least 350 MPa, at least 375 MPa, or at least 400 MPa, such as by at least 250 MPa. Thus, a nitride-hardened (e.g., nitrided) hydroformed handpan 100 may exhibit a hardness within a range from 300 megapascals (MPa) to 820 MPa. In some cases, a nitride-hardened handpan 100 may exhibit a hardness within a range from 300 MPa to 900 MPa. In some embodiments, the hardness of a nitride-hardened handpan top shell 110 is 500 MPa to 900 MPa. In some embodiments, the hardness of a nitride-hardened handpan top shell 110 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the minimum hardness of a nitride-hardened handpan top shell 110 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the maximum hardness of a nitride-hardened handpan top shell 110 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the hardness of a nitride-hardened handpan bottom shell 120 is 500 MPa to 900 MPa. In some embodiments, the hardness of a nitride-hardened handpan bottom shell 120 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the minimum hardness of a nitride-hardened handpan bottom shell 120 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the maximum hardness of a nitride-hardened handpan bottom shell 120 is at least 500 MPa, 525 MPa, 550 MPa, 575 MPa, 600 MPa, 625 MPa, 650 MPa, 675 MPa, 700 MPa, 725 MPa, 750 MPa, 775 MPa, 800 MPa, 825 MPa, 850 MPa, 875 MPa, or at least 900 MPa. In some embodiments, the hardness of a nitride-hardened handpan shell formed by a hydroforming method described herein is within a range from 600 MPa to 900 MPa, wherein the maximum hardness of the shell is at least 750 MPa.

In some embodiments, provided herein is a handpan 100 comprising a top shell 110 produced according to a hydroforming method described herein and a bottom shell 120 produced by a method other than hydroforming into a mold 200. The maximum hardness of the top shell 110 of the handpan 100 may be at least 50 MPa greater than the maximum hardness of the bottom shell 120, such as at least 75 MPa, at least 100 MPa, at least 125 MPa, or at least 150 MPa. The minimum hardness of the top shell 110 of the handpan 100 may be at least 10 MPa greater than the minimum hardness of the bottom shell 120, such as at least 15 MPa, at least 20 MPa, at least 25 MPa, or at least 30 MPa.

Systems

A system for molded hydroforming can comprise a mold 200, as described herein. For example, a system for molded hydroforming can comprise a mold 200 having a shape complementary to or substantially complementary to a shape (e.g., an intended shape) of a top shell 110 of a handpan 100. In some cases, a system for molded hydroforming can comprise a mold 200 having a shape complementary to or substantially complementary to a shape (e.g., an intended shape, for instance, with the exception of the port 125) of a bottom shell 120 of a handpan 100. In many cases, the mold 200 comprises one or more (e.g., a plurality) of shapes 220 (e.g., features) complementary to the shapes (e.g., features) intended to be formed in the handpan shell (e.g., a top shell 110 or a bottom shell 120) during hydroforming, such as dimples 170, domes 180, notes 160, markings 195 and company logos 195. In some embodiments, the mold is complementary to a top shell 110 of a handpan having a diameter within a range from 40 cm to 60 cm, such as 48 cm to 55 cm. In some embodiments, the mold is complementary to a top shell 110 of a handpan having a depth within a range from 10 cm to 15 cm. The mold may be complementary to a top shell 110 of a handpan comprising seven to ten notes. In some cases, a mold 200 for a bottom shell 120 comprises a shape 220 complementary to a port 125 intended to be formed in the bottom shell during hydroforming. In some embodiments, the mold is complementary to a bottom shell 120 of a handpan having a diameter within a range from 40 cm to 60 cm, such as 48 cm to 55 cm. In some embodiments, the mold is complementary to a bottom shell 120 of a handpan having a depth within a range from 10 cm to 15 cm.

In some cases, the mold 200 comprises a means of securing the mold 200 to a clamping system (e.g., a ring clamp). For example, the mold 200 can comprise a plurality of bolt holes corresponding to the positions of bolt holes in a clamping plate (e.g., a steel plate, which can be at least 1 inch, at least 1.5 inches, or at least 2 inches thick). In some cases, the mold 200 is bolted directly to the clamping plate. In some cases, a portion of the mold 200 comprising bolt holes is disposed between the clamping plate and a ring clamp during hydroforming. Bolts (e.g., having a diameter of 1.5 inches and a length of 6 inches) can be used to secure the clamping plate to the mold 200 (e.g., with a metal plate to be formed into a handpan shell between them). In some cases, the mold 200 has been hardened, optionally by a nitriding process. The surface of the mold 200 may comprise nitrides. In some cases, the mold 200 comprises breathing holes, e.g., to allow air to escape as the metal sheet is deformed into the mold 200 by the pressurized fluid.

In some cases, a system for molded hydroforming of a handpan 100 comprises a gasket or o-ring. In some cases, the gasket is a neoprene gasket (e.g., 0.125 inches thick). The gasket or o-ring can be placed between the clamping plate and the metal sheet to be formed into a handpan shell prior to sealing the clamping plate to the ring clamp (e.g., mold 200). In many cases, the gasket, o-ring and/or the clamping plate comprises an inlet to allow the fluid to enter between the clamping plate and the sheet of metal to be formed into a handpan shell.

Systems for molded hydroforming of handpan shells can comprise hydraulic equipment. For instance, a system for hydroforming handpan shells using a mold 200 can comprise high pressure tubing. In some cases, a system for molded hydroforming comprises a means of pressurizing a fluid (e.g., a power washer), connected to the high pressure tubing. A system can also include a manometer for monitoring fluid pressure within the system. Outlets or exhausts can be included in the systems to allow fluid (e.g., water and/or air) to be purged from the system.

EXAMPLES

Example 1: Formation of a Handpan Mold

An exemplary handpan top shell 110 was laser scanned and converted to a 3-dimensional CAD file. The CAD file was digitally manipulated to smooth surfaces, remove tooling marks and introduce a logo 195, then resized to account for the material thickness and inverted to produce a digital representation of a mold 200 complementary to the exemplary handpan top shell 110. This file was converted to instructions for a 4-axis CNC system.

An 80 cm×80 cm×16 cm steel block was placed in the CNC system and milled in accordance with these instructions to produce a mold 200 complementary to the exemplary handpan top shell 110. Breathing holes were introduced into the mold 200 and the mold surface was treated with nitride.

Example 2: Hydroforming a Handpan Top Shell into a Mold

Figure 3B:
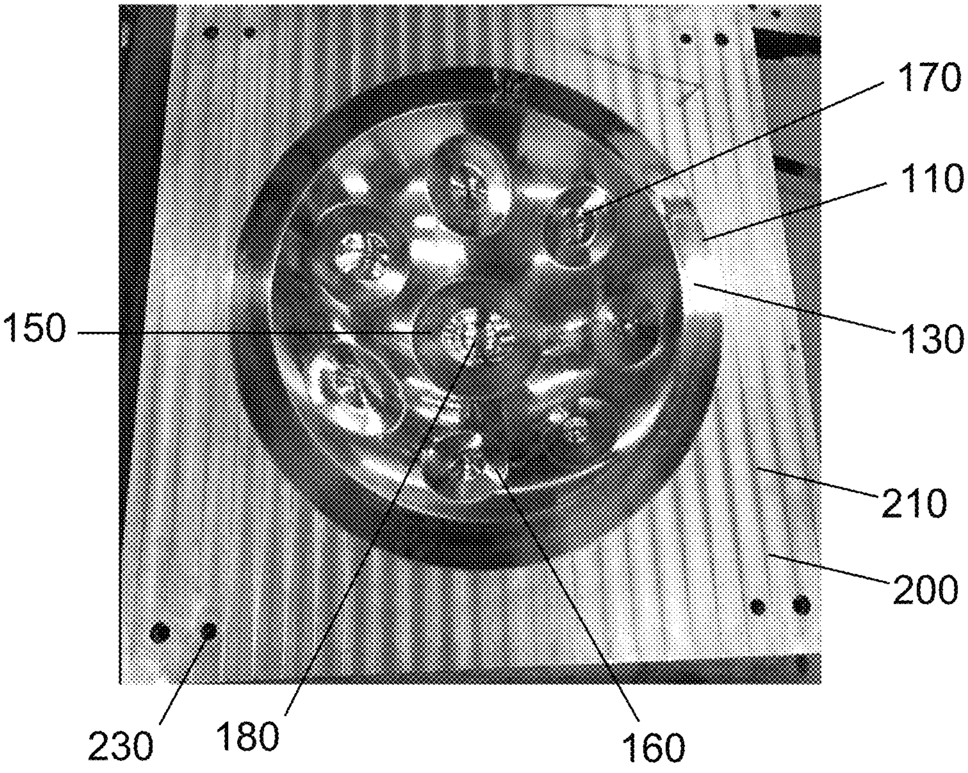
FIG. 3B is a photograph of a top shell of a handpan in a hydroforming mold, according to embodiments herein.

A blank of 19-gauge 1008 cold rolled steel was clamped by two rings to a mold 200 (e.g., the mold of Example 1), then pressure was applied via a pressure pillow to establish clamping pressure and closing forces which were uniformly distributed throughout. Water/forming fluid was then introduced and forming pressures of up to 4,000 bar were established. The sheet metal stretched evenly into the cavity, then rested against the mold surface without potentially damaging friction. Pressure was released from the system, the clamps were removed (e.g., as shown in FIG. 3B) and the fully formed handpan top shell 110 was removed from the mold 200. Test results of material properties of the handpan top shell 110, as evaluated by computer simulations, are provided in Example 3.

Example 3: Material Properties of a Hydroformed Handpan Shell

Results of computer simulations summarized below indicate that handpan top shells 110 formed according to the method described in Example 2 demonstrate improved mechanical and structural characteristics that are superior to handpans made using conventional or manual processes.

Figure 4:
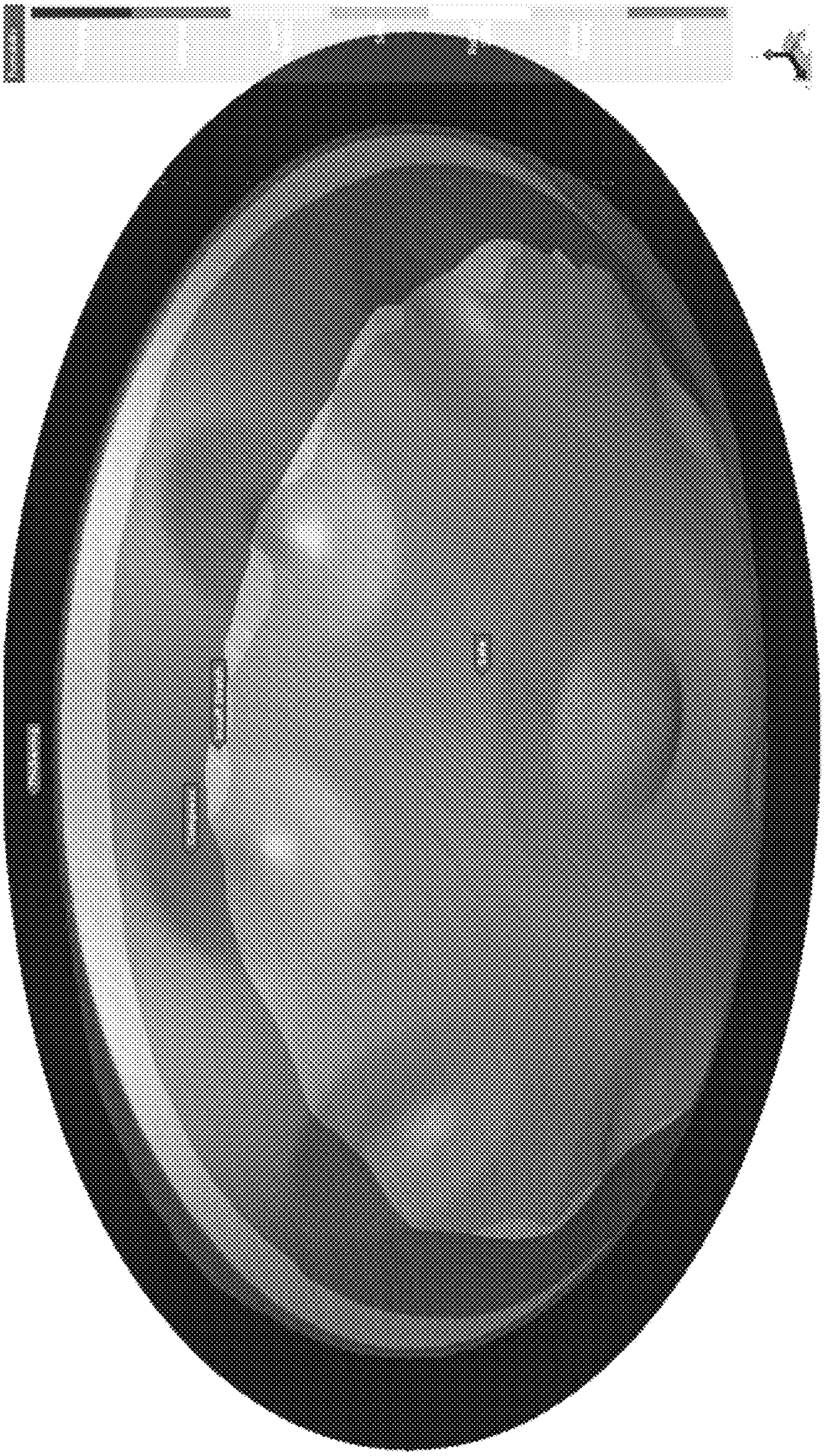
FIG. 4 shows data from simulations predicting formability of a top shell formed by hydroforming with a mold, according to embodiments herein.

FIG. 4 shows formability data from simulations of 1008 steel hydroformed into a handpan top shell using a mold 200. The results from the simulations show that formability of all parts of the handpan shell are within the material capabilities.

Figure 5:
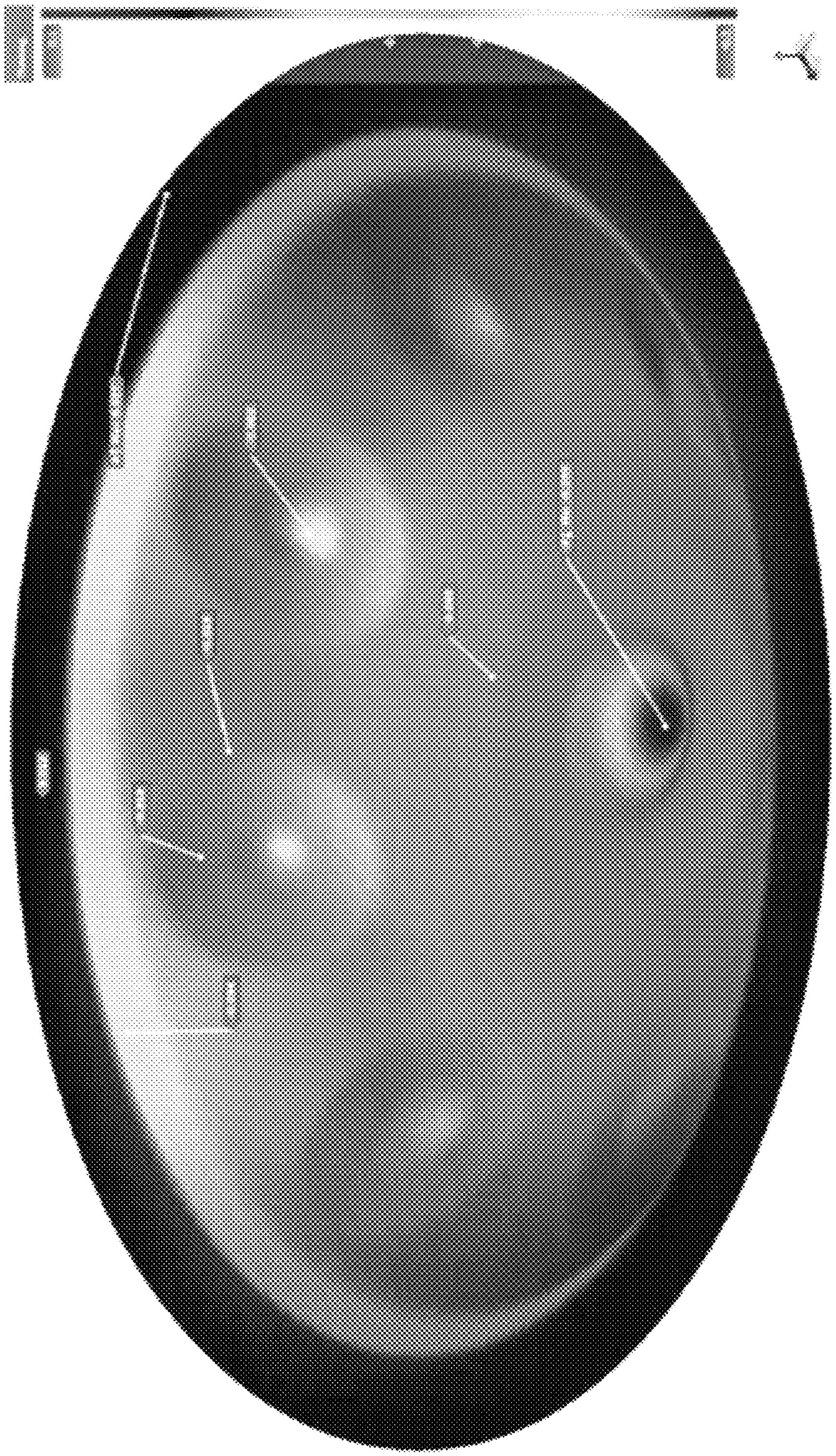
FIG. 5 shows data from simulations predicting material thickness of a top shell after hydroforming with a mold, according to embodiments herein.
Figure 6:
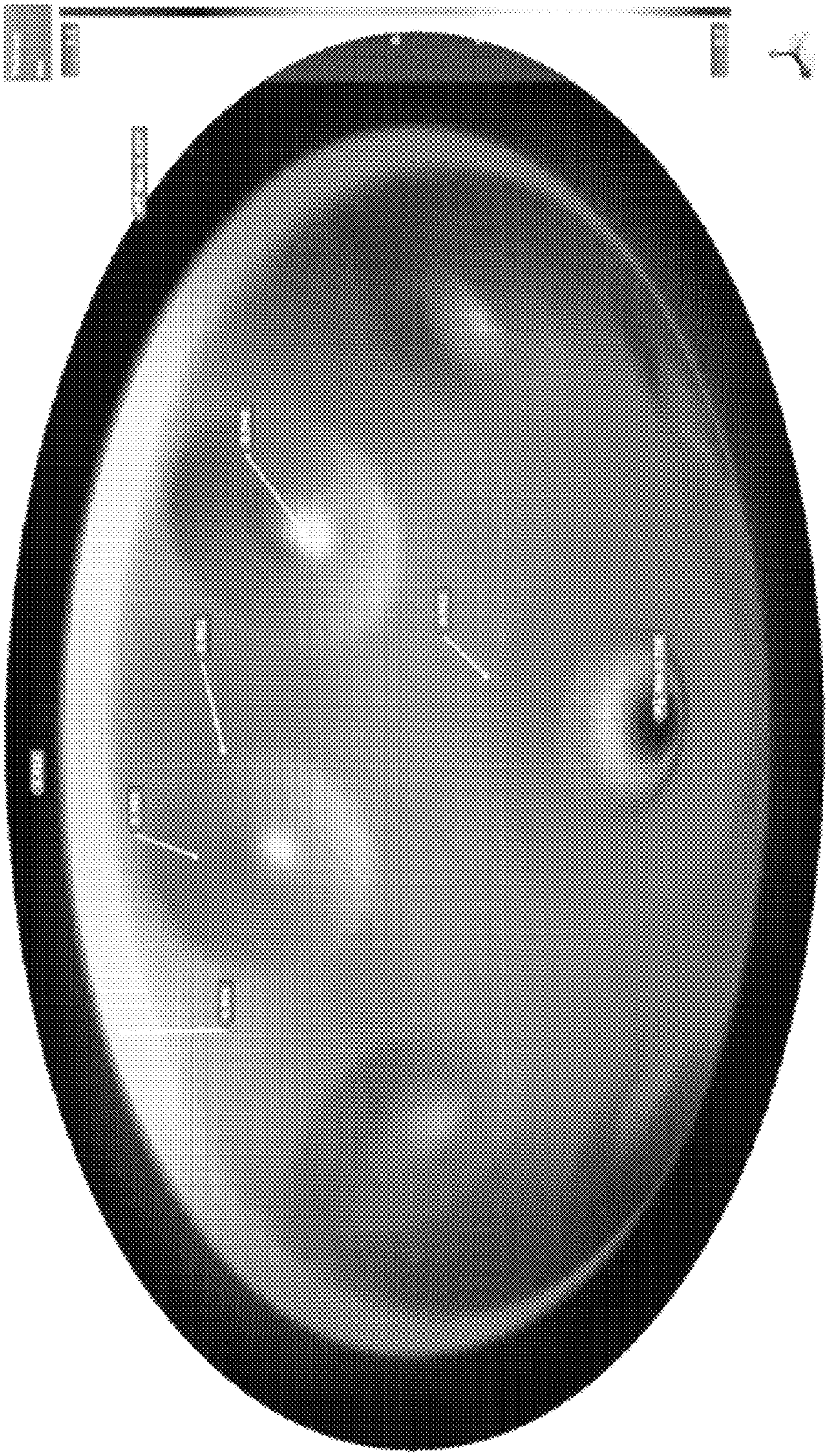
FIG. 6 shows data from a second simulation predicting material thickness of a top shell after hydroforming with a mold, according to embodiments herein.

FIG. 5 and FIG. 6 show simulation results evaluating expected material thickness variation and thinning in handpan shells hydroformed from 1008 steel with a mold 200. Thinning was found to be maximal in the rim 130 of the handpan shells. The apex of the central note was found to have the least steel thinning during hydroforming with a mold 200.

Figure 7:
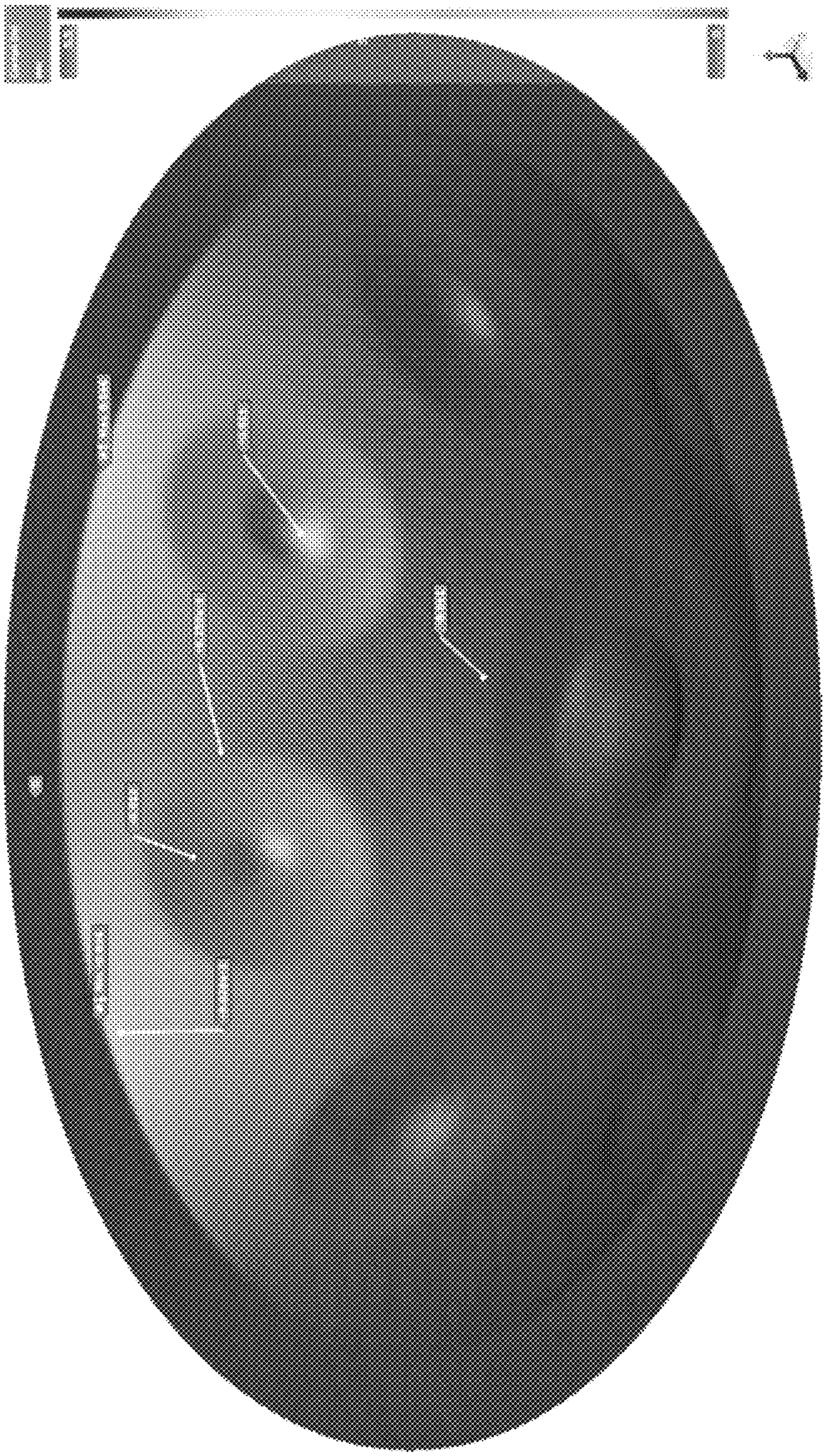
FIG. 7 shows contact distance measurements from simulations of atop shell hydroformed with a mold, according to embodiments herein.

FIG. 7 shows simulation results for contact distance over the surface of a handpan shell hydroformed with a mold 200 from 1008 steel. Results showed a contact distance of zero at all points on the surface of the handpan shell, indicating that the surface is substantially uniform and the shell is fully formed after hydroforming with a mold 200.

Figure 8:
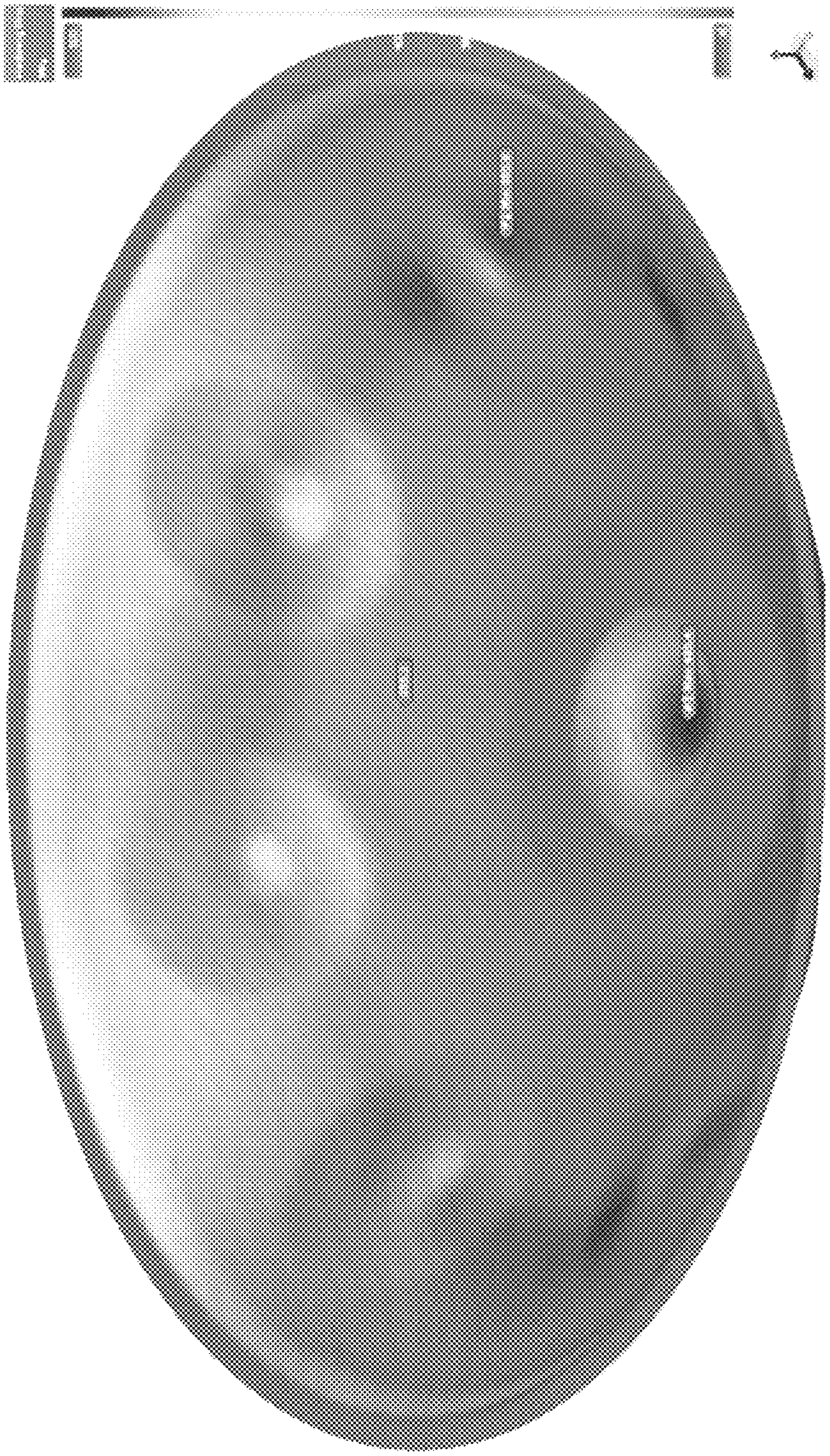
FIG. 8 shows data from simulations predicting hardening stresses after hydroforming with a mold, according to embodiments herein.

FIG. 8 shows simulation results evaluating the hardening of 1008 steel over the course of the steel being formed into a handpan shell. Results show that the material starts with a uniform strength of 261 MPa and achieves a hardness range of about 300 MPa to about 480 MPa after hydroforming in a mold 200.

Figure 9:
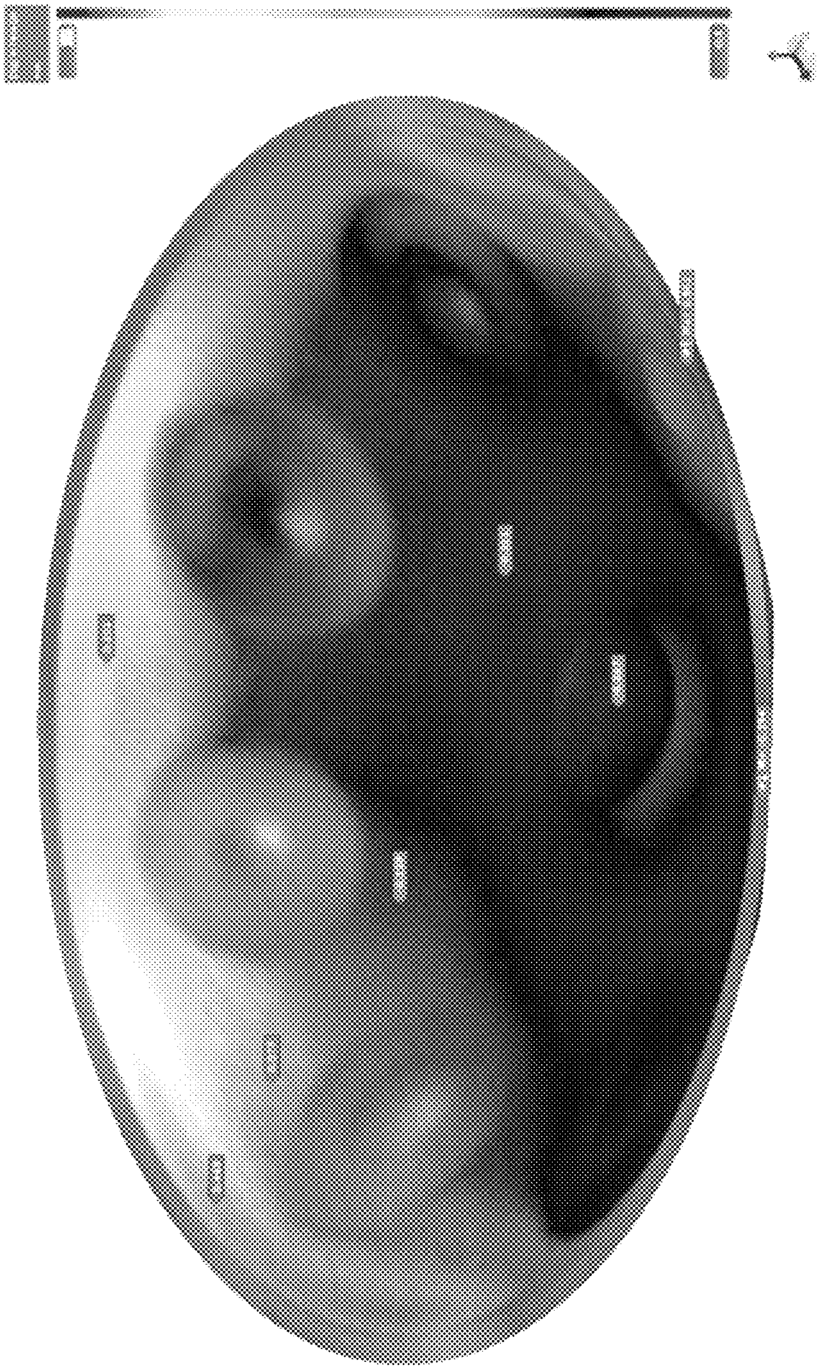
FIG. 9 shows data from simulations predicting springback after trimming of a top shell hydroformed with a mold, according to embodiments herein.

FIG. 9 shows results of simulations run to the spring-back resulting from laser trimming of the rim 130 of a handpan shell hydroformed from 1008 steel using a mold 200. Results showed that spring-back is minimal (between −0.4 mm and +0.6 mm) in a direction normal to the surface of the handpan 100, and that the spring-back is only expected to be −0.2 mm to +0.2 mm for most of the playing surface of the handpan shell.

Figure 10:
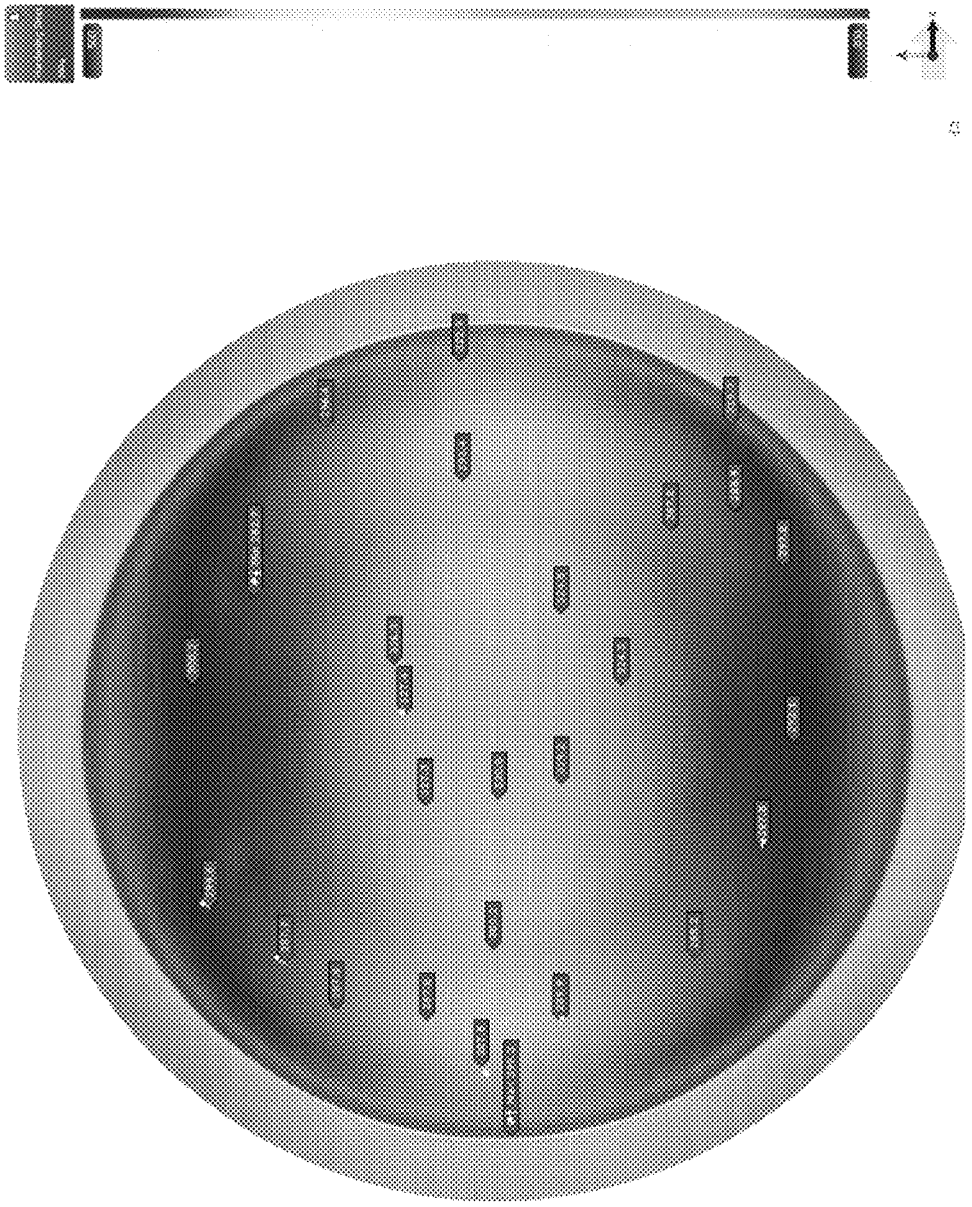
FIG. 10 shows hardness values of a handpan shell without impacting a mold, according to embodiments herein.
Figure 11:
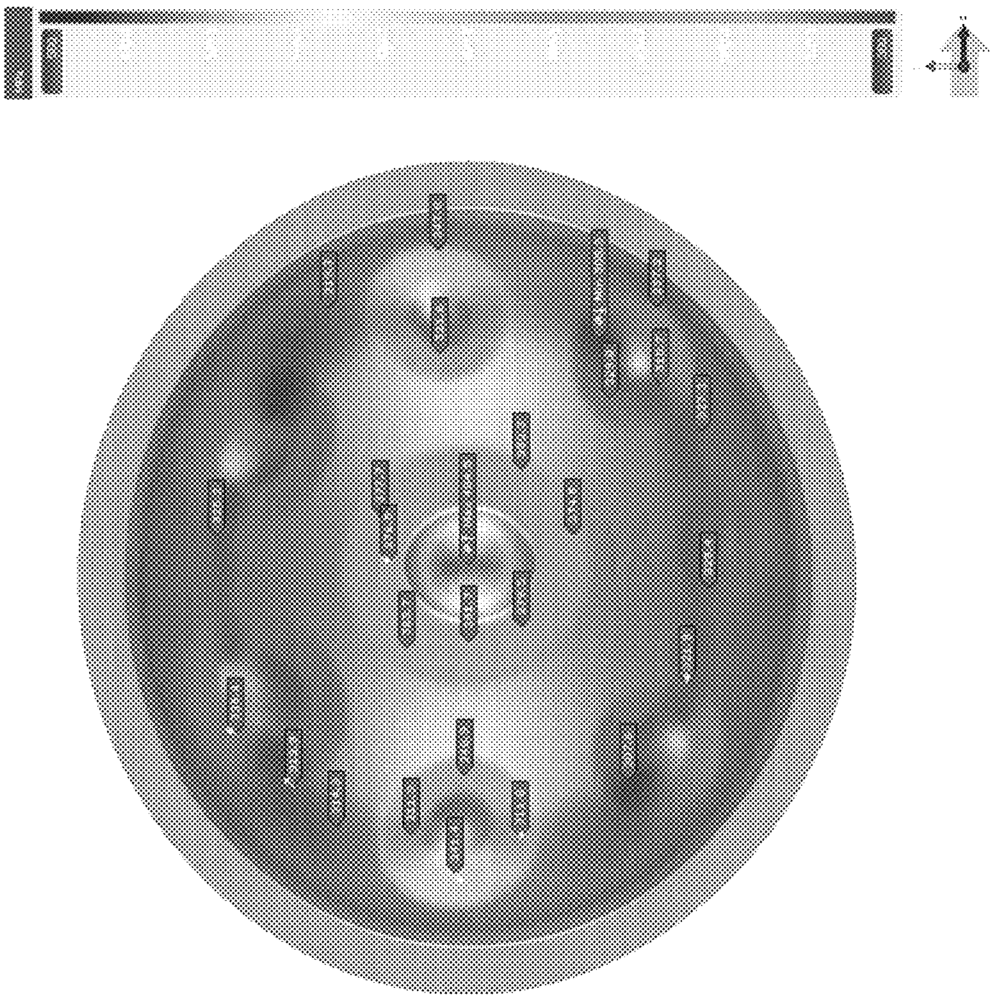
FIG. 11 shows hardness values of a handpan shell with impacting a mold, according to embodiments herein.

FIG. 10 shows results of simulations run to test the hardness of a handpan shell hydroformed from 1008 steel without contact with a mold 200. Hardness values ranged from 282.7 MPa to 330.8 MPa within the playing surface of the shell. FIG. 11 shows results of simulations run to test the hardness of a handpan shell hydroformed from 1008 steel with contact with a mold 200. Hardness values ranged from 305.3 MPa to 484.5 MPa within the playing surface of the shell. Simulations show that hydroforming handpan shells with a mold 200 increases the hardness of the hydroformed shell.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for forming a top shell of a handpan, comprising:

a. providing a mold having a mold shape complementary to an intended shape of the top shell of the handpan;

b. providing a plate in proximity to the mold;

c. applying a pressurized fluid to a surface of the plate, thereby causing the plate to deform into the mold, until the plate has deformed into the intended shape, thereby forming the top shell of the handpan;

d. removing the top shell of the handpan from the mold; and e. adjusting a central note of the handpan, thereby tuning a musical scale of the handpan.

2. The method of claim 1, wherein the intended shape comprises one or more members selected from the group consisting of: dimples, domes, notes, and logos.

3. The method of claim 1, wherein the plate comprises a metal or metal alloy.

4. The method of claim 3, wherein the plate comprises one or more members selected from the group consisting of: 1008 cold rolled steel, 1018 cold rolled steel, and stainless steel 430.

5. The method of claim 3, wherein the plate comprises one or more members selected from the group consisting of: 18 gauge steel, 19 gauge steel, and 20 gauge steel.

6. The method of claim 1, wherein the thickness of the plate is from 0.8 mm to 1.3 mm.

7. The method of claim 1, wherein the pressurized fluid comprises water.

8. The method of claim 1, wherein the pressurized fluid has a pressure within a range from 20 bars to 4,000 bars.

9. The method of claim 1, wherein the intended shape has a diameter within a range from 40 centimeters (cm) to 60 cm.

10. The method of claim 1, wherein the top shell has a depth within a range from 10 cm to 15 cm.

11. The method of claim 1, wherein the top shell comprises a hardness within a range from 300 megapascals (MPa) to 500 MPa.

12. The method of claim 11, wherein the maximum hardness of the top shell is at least 450 MPa.

13. The method of claim 11, wherein the minimum hardness of the top shell is at least 300 MPa.

14. The method of claim 1, wherein the handpan comprises seven to ten notes.

15. The method of claim 1, further comprising trimming the top shell, wherein the trimming comprises using a laser.

16. The method of claim 1, further comprising nitriding the top shell, wherein the nitriding is gas nitriding.

17. The method of claim 16, wherein the maximum hardness of the top shell after the nitriding is at least 700 MPa.

18. The method of claim 16, wherein the minimum hardness of the top shell after the nitriding is at least 550 MPa.

19. The method of claim 1, further comprising determining a material and/or a thickness of the plate based on desired musical scales of the handpan.

20. The method of claim 1, wherein adjusting the central note comprises adjusting a shape of the central note.

21. The method of claim 1, wherein tuning the musical scale of the handpan comprises tuning up or tuning down one or more musical half-steps.

22. The method of claim 1, further comprising adding one or more additional notes to the handpan, thereby tuning the musical scale of the handpan.

* * * * *